(12) United States Patent
Velagapudi

(10) Patent No.: US 12,371,257 B2
(45) Date of Patent: Jul. 29, 2025

(54) SYSTEMS AND METHODS FOR PROCESSING OBJECTS INCLUDING PAYLOAD POSITIONABLE MOBILE CARRIERS AND INTERMEDIATE PROCESSING SYSTEMS

(71) Applicant: Berkshire Grey Operating Company, Inc., Bedford, MA (US)

(72) Inventor: Prasanna Velagapudi, Pittsburgh, PA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 285 days.

(21) Appl. No.: 17/698,586

(22) Filed: Mar. 18, 2022

(65) Prior Publication Data

US 2022/0297936 A1 Sep. 22, 2022

Related U.S. Application Data

(60) Provisional application No. 63/256,395, filed on Oct. 15, 2021, provisional application No. 63/163,342, filed on Mar. 19, 2021.

(51) Int. Cl.
*B65G 1/04* (2006.01)
*B65G 1/137* (2006.01)
(Continued)

(52) U.S. Cl.
CPC ......... *B65G 1/0492* (2013.01); *B65G 1/0435* (2013.01); *B65G 1/0471* (2013.01);
(Continued)

(58) Field of Classification Search
CPC .................................. B65G 1/0492
See application file for complete search history.

(56) References Cited

U.S. PATENT DOCUMENTS

| 5,595,263 A | 1/1997 | Pignataro |
| 6,946,612 B2 | 9/2005 | Morikawa |

(Continued)

FOREIGN PATENT DOCUMENTS

| CN | 116981633 A | 10/2023 |
| CN | 116981634 A | 10/2023 |

(Continued)

OTHER PUBLICATIONS

Notification Concerning Transmittal of International Preliminary Report on Patentability and the International Preliminary Report on Patentability issued by The International Bureau of WIPO in related International Application No. PCT/US2022/020924 on Sep. 28, 2023, 16 pages.

(Continued)

*Primary Examiner* — Saul Rodriguez
*Assistant Examiner* — Willie W Berry, Jr.
(74) *Attorney, Agent, or Firm* — Gesmer Updegrove LLP

(57) ABSTRACT

A method of providing transfer between a remotely actuatable carrier and a container support structure is disclosed, the method including providing a remotely actuatable carrier including a plurality of support ridges proximate the support structure and providing sensor output information regarding alignment of the remotely actuatable carrier and the container support structure, the container support structure including a plurality of support structure protrusions; and passing the plurality of support ridges of the remotely actuatable carrier between the plurality of support structure protrusions responsive to the sensor output information.

40 Claims, 43 Drawing Sheets

(51) Int. Cl.
  *B65G 61/00* (2006.01)
  *B66F 9/075* (2006.01)
  *B66F 9/12* (2006.01)
  *G05D 1/00* (2006.01)

(52) U.S. Cl.
  CPC ............ *B65G 1/1376* (2013.01); *B65G 61/00* (2013.01); *B66F 9/0755* (2013.01); *B66F 9/12* (2013.01); *G05D 1/0027* (2013.01); *B66F 9/07581* (2013.01)

(56) References Cited

U.S. PATENT DOCUMENTS

| | | | |
|---|---|---|---|
| 8,989,918 | B2 | 3/2015 | Sturm |
| 9,020,632 | B2 | 4/2015 | Naylor |
| 9,120,622 | B1 | 9/2015 | Elazary et al. |
| 9,517,899 | B2 | 12/2016 | Watt et al. |
| 10,611,614 | B2 | 4/2020 | High et al. |
| 2005/0123387 | A1* | 6/2005 | Pollack ............ H01L 21/68785 414/936 |
| 2010/0316469 | A1 | 12/2010 | Lert et al. |
| 2011/0014021 | A1* | 1/2011 | Reid ...................... B65H 31/30 414/389 |
| 2011/0061995 | A1 | 3/2011 | Huff et al. |
| 2011/0308918 | A1 | 12/2011 | Schwardt et al. |
| 2012/0328397 | A1 | 12/2012 | Yamashita |
| 2013/0166108 | A1 | 6/2013 | Sturm |
| 2014/0277692 | A1 | 9/2014 | Buzan et al. |
| 2014/0277693 | A1 | 9/2014 | Naylor |
| 2015/0098775 | A1 | 4/2015 | Razumov |
| 2015/0353282 | A1* | 12/2015 | Mansfield ............ B65G 1/0492 700/214 |
| 2016/0083196 | A1 | 3/2016 | Dugat |
| 2016/0107848 | A1 | 4/2016 | Baker |
| 2016/0236867 | A1 | 8/2016 | Brazeau et al. |
| 2016/0304281 | A1 | 10/2016 | Elazary et al. |
| 2016/0355337 | A1 | 12/2016 | Lert et al. |
| 2017/0166400 | A1 | 6/2017 | Hoffman |
| 2017/0283171 | A1 | 10/2017 | High et al. |
| 2017/0305668 | A1 | 10/2017 | Bestic et al. |
| 2018/0105363 | A1 | 4/2018 | Lisso et al. |
| 2018/0146618 | A1 | 5/2018 | Elazary et al. |
| 2018/0186572 | A1* | 7/2018 | Issing .................. B65G 1/1375 |
| 2019/0176323 | A1 | 6/2019 | Coady et al. |
| 2019/0256298 | A1 | 8/2019 | Jarr et al. |
| 2019/0295591 | A1 | 9/2019 | Pajevic et al. |
| 2020/0242544 | A1 | 7/2020 | Galluzzo et al. |
| 2020/0283229 | A1* | 9/2020 | Edwards ................. B66F 9/063 |
| 2021/0090001 | A1 | 3/2021 | Glass et al. |
| 2022/0297937 | A1 | 9/2022 | Velagapudi |
| 2022/0297942 | A1 | 9/2022 | Velagapudi |

FOREIGN PATENT DOCUMENTS

| | | |
|---|---|---|
| CN | 117098713 A | 11/2023 |
| EP | 3269590 A1 | 1/2018 |
| EP | 3375734 A1 | 9/2018 |
| EP | 3715313 A1 | 9/2020 |
| WO | 2009089159 A2 | 6/2009 |
| WO | 2016023869 A2 | 2/2016 |
| WO | 2016090245 A1 | 6/2016 |
| WO | 2022198032 A1 | 9/2022 |
| WO | 2022198042 A1 | 9/2022 |
| WO | 2022198047 A1 | 9/2022 |

OTHER PUBLICATIONS

Notification Concerning Transmittal of International Preliminary Report on Patentability and the International Preliminary Report on Patentability issued by The International Bureau of WIPO in related International Application No. PCT/US2022/020941 on Sep. 28, 2023, 15 pages.

Notification Concerning Transmittal of International Preliminary Report on Patentability and the International Preliminary Report on Patentability issued by The International Bureau of WIPO in related International Application No. PCT/US2022/020947 on Sep. 28, 2023, 15 pages.

Communication pursuant to rules 161(1) and 162 EPC issued by the European Patent Office in related European Patent Application No. 22715284.0 on Oct. 26, 2023, 3 pages.

Communication pursuant to rules 161(1) and 162 EPC issued by the European Patent Office in related European Patent Application No. 22715839.1 on Oct. 26, 2023, 3 pages.

Communication pursuant to rules 161(1) and 162 EPC issued by the European Patent Office in related European Patent Application No. 22715285.7 on Oct. 26, 2023, 3 pages.

Notification of Transmittal of the International Search Report and the Written Opinion of the International Searching Authority, the International Search Report and the Written Opinion of the International Searching Authority issued by the European Patent Office, as the International Searching Authority, in related International Application No. PCT/US2022/020941 on Jul. 1, 2022, 21 pages.

Notification of Transmittal of the International Search Report and the Written Opinion of the International Searching Authority, the International Search Report and the Written Opinion of the International Searching Authority issued by the European Patent Office, as the International Searching Authority, in related International Application No. PCT/US2022/020947 on Jul. 1, 2022, 21 pages.

Notification of Transmittal of the International Search Report and the Written Opinion of the International Searching Authority, the International Search Report and the Written Opinion of the International Searching Authority issued by the European Patent Office, as the International Searching Authority, in related International Application No. PCT/US2022/020924 on Jun. 24, 2022, 22 pages.

\* cited by examiner

SYSTEMS AND METHODS FOR PROCESSING OBJECTS INCLUDING PAYLOAD POSITIONABLE MOBILE CARRIERS AND INTERMEDIATE PROCESSING SYSTEMS

PRIORITY

The present application claims priority to each of U.S. Provisional Patent Application Ser. No. 63/163,342 filed Mar. 19, 2021 and U.S. Provisional Patent Application Ser. No. 63/256,395 filed Oct. 15, 2021, the disclosures of each of which are hereby incorporated by reference in their entireties.

BACKGROUND

The invention generally relates to object processing systems, and relates in particular to robotic and other object processing systems for, e.g., sorting objects, for storing and retrieving objects, and for redistributing objects for a variety of purposes where the systems are intended to be used in dynamic environments requiring the systems to accommodate the processing of a wide variety of objects.

Current distribution center processing systems, for example, generally assume an inflexible sequence of operations whereby a disorganized stream of input objects is first singulated into a single stream of isolated objects presented one at a time to a scanner that identifies the object. An induction element (e.g., a conveyor, a tilt tray, or manually movable bins) transport the objects to the desired destination or further processing station, which may be a bin, a chute, a bag or a conveyor etc.

In certain sortation systems for example, human workers or automated systems typically retrieve parcels in an arrival order, and sort each parcel or object into a collection bin based on a set of given heuristics. For instance, all objects of like type might go to a collection bin, or all objects in a single customer order, or all objects destined for the same shipping destination, etc., may be similarly processed. The human workers or automated systems might be required to receive objects and to move each to their assigned collection bin. If the number of different types of input (received) objects is large, a large number of collection bins is required.

Such systems have inherent inefficiencies as well as inflexibilities since the desired goal is to match incoming objects to assigned collection bins. Such systems may require a large number of collection bins (and therefore a large amount of physical space, large capital costs, and large operating costs) in part, because sorting all objects to all destinations at once is not clearly straightforward or efficient. In particular, when automating sortation of objects, there are a few main things to consider: 1) the overall system throughput (parcels sorted per hour), 2) the number of diverts (i.e., number of discrete locations to which an object can be routed), 3) the total area of sortation system (square feet), and 4) the annual costs to run the system (man-hours, electrical costs, cost of disposable components).

Current state-of-the-art sortation systems rely on human labor to some extent. Most solutions rely on a worker that is performing sortation, by scanning an object from an induction area (chute, table, etc.) and placing the object in a staging location, conveyor, or collection bin. When a bin is full or the controlling software system determines that it needs to be emptied, another worker empties the bin into a bag, box, or other container, and sends that container on to the next processing step. Such a system has limits on throughput (i.e., how fast can human workers sort to or empty bins in this fashion) and on number of diverts (i.e., for a given bin size, only so many bins may be arranged to be within efficient reach of human workers).

Other partially automated sortation systems involve the use of recirculating conveyors and tilt trays, where the tilt trays receive objects by human sortation, and each tilt tray moves past a scanner. Each object is then scanned and moved to a pre-defined location assigned to the object. The tray then tilts to drop the object into the location. Further, partially automated systems, such as the bomb-bay style recirculating conveyor, involve having trays with floors that open (doors) on the bottom of each tray where the doors open at the time that the tray is positioned over a predefined chute, and the object is then dropped from the tray into the chute. Again, the objects are scanned while in the tray, which assumes that any identifying code is visible to the scanner.

Such partially automated systems are lacking in key areas. As noted, these conveyors have discrete trays that can be loaded with an object; they then pass through scan tunnels that scan the object and associate it with the tray in which it is riding. When the tray passes the correct bin, a trigger mechanism causes the tray to dump the object into the bin. A drawback with such systems however, is that every divert requires an actuator, which increases the mechanical complexity and the cost per divert can be very high.

An alternative is to use human labor to increase the number of diverts, or collection bins, available in the system. This decreases system installation costs, but increases the operating costs. Multiple cells may then work in parallel, effectively multiplying throughput linearly while keeping the number of expensive automated diverts at a minimum. Such diverts do not identify a bin and cannot divert it to a particular spot, but rather they work with beam breaks or other sensors to seek to ensure that indiscriminate bunches of objects get appropriately diverted. The lower cost of such diverts coupled with the low number of diverts keep the overall system divert cost low.

Unfortunately, these systems don't address the limitations regarding the total number of system bins. The system is simply diverting an equal share of the total objects to each parallel manual cell. Thus, each parallel sortation cell must have all the same collection bin designations; otherwise an object might be delivered to a cell that does not have a bin to which that object is mapped.

Other systems provide access to a wide variety of input objects via a storage and retrieval system. Automated storage and retrieval systems (AS/RS), for example, generally include computer-controlled systems for automatically storing (placing) and retrieving items from defined storage locations. Traditional AS/RS typically employ totes (or bins), which are the smallest unit of load for the system. In these systems, the totes are brought to people who pick individual items out of the totes. When a person has picked the required number of items out of the tote, the tote is then re-inducted back into the AS/RS.

In these systems, the totes are brought to a person, and the person may either remove an item from the tote or add an item to the tote. The tote is then returned to the storage location. Such systems may be used in libraries and warehouse storage facilities. The AS/RS involves no processing of the items in the tote, as a person processes the objects when the tote is brought to the person. This separation of jobs allows any automated transport system to do what it is good at—moving totes—and the person to do what the person is better at—picking items out of cluttered totes. It also means the person may stand in one place while the transport system brings the person totes, which increases the rate at which the person can pick goods. There are limits however, on such conventional systems in terms of the time and resources required to move totes toward and then away from each person, as well as how quickly a person can process totes in this fashion in applications where each person may be required to process a large number of totes.

While automated carrier systems exist for moving shelves, boxes or objects, such systems may not be sufficiently flexible in their abilities to efficiently and economically interact with existing equipment such as conveyors or other processing equipment in certain applications. There remains a need for a more efficient and more cost-effective object sortation system that sorts objects of a variety of sizes and weights into appropriate collection bins or trays of fixed sizes, yet is efficient in handling objects of such varying sizes and weights.

SUMMARY

In accordance with an aspect, the invention provides a method of providing transfer between a remotely actuatable carrier and a container support structure. The method includes providing a remotely actuatable carrier including a plurality of support ridges proximate the support structure and providing sensor output information regarding alignment of the remotely actuatable carrier and the container support structure, the container support structure including a plurality of support structure protrusions; and passing the plurality of support ridges of the remotely actuatable carrier between the plurality of support structure protrusions responsive to the sensor output information.

In accordance with another aspect, the invention provides a method of providing transfer between a remotely actuatable carrier and a container support structure. The method includes providing a remotely actuatable carrier proximate the support structure, providing at least one sensor on any of the carrier and a floor under the support structure that provides sensor output information regarding an alignment of the remotely actuatable carrier and the support structure, said container support structure including a plurality of support structure protrusions, and passing a portion of the remotely actuatable carrier between the plurality of support structure protrusions responsive to the sensor output information.

In accordance with a further aspect, the invention provides a method of providing transfer between a remotely actuatable carrier and a container support structure. The method includes providing a remotely actuatable carrier proximate the support structure, providing at least one sensor on any of the carrier and the support structure that provides sensor output information regarding an alignment of the remotely actuatable carrier and the support structure, the container support structure including a plurality of support structure protrusions, and passing a portion of the remotely actuatable carrier between the plurality of support structure protrusions responsive to the sensor output information.

In accordance with a further aspect, the invention provides a processing system for providing transfer between a remotely actuatable carrier and a container support structure, said system comprising a remotely actuatable carrier including a plurality of support ridges proximate the support structure and a sensor for providing sensor output information regarding an alignment of the remotely actuatable carrier and the container support structure, said container support structure including a plurality of support structure protrusions; wherein the plurality of support ridges of the remotely actuatable carrier may pass between the plurality of support structure protrusions responsive to the sensor output information when aligned.

BRIEF DESCRIPTION OF THE DRAWINGS

The following description may be further understood with reference to the accompanying drawings in which.

The drawings are shown for illustrative purposes only.

DETAILED DESCRIPTION

The invention generally relates, in certain aspects, to object processing systems in which objects are carried in initial containers (e.g., boxes, bins, totes etc.) in a preprocessed state and are carried in processed containers (e.g., boxes, bins, totes etc.) in a post processed state by a variety of automated carriers that are able to move freely within an environment. In accordance with further embodiments, the systems may provide that objects themselves (e.g., boxes, bagged goods, shipping bags etc.) are directly carried by automated carriers (as disclosed below with reference to FIGS. 14-26, 43, 44). The carriers may each include a multi-functional payload for receiving a container (e.g., a box, bin or tote) that permits the container to be moved onto and off of a conveyor or other processing equipment using cost efficient processing systems. A container shelf and retrieval mechanism associated with each automated carrier provides that totes or boxes are carried by each carrier, which has a tote storage area payload.

Figure 1:
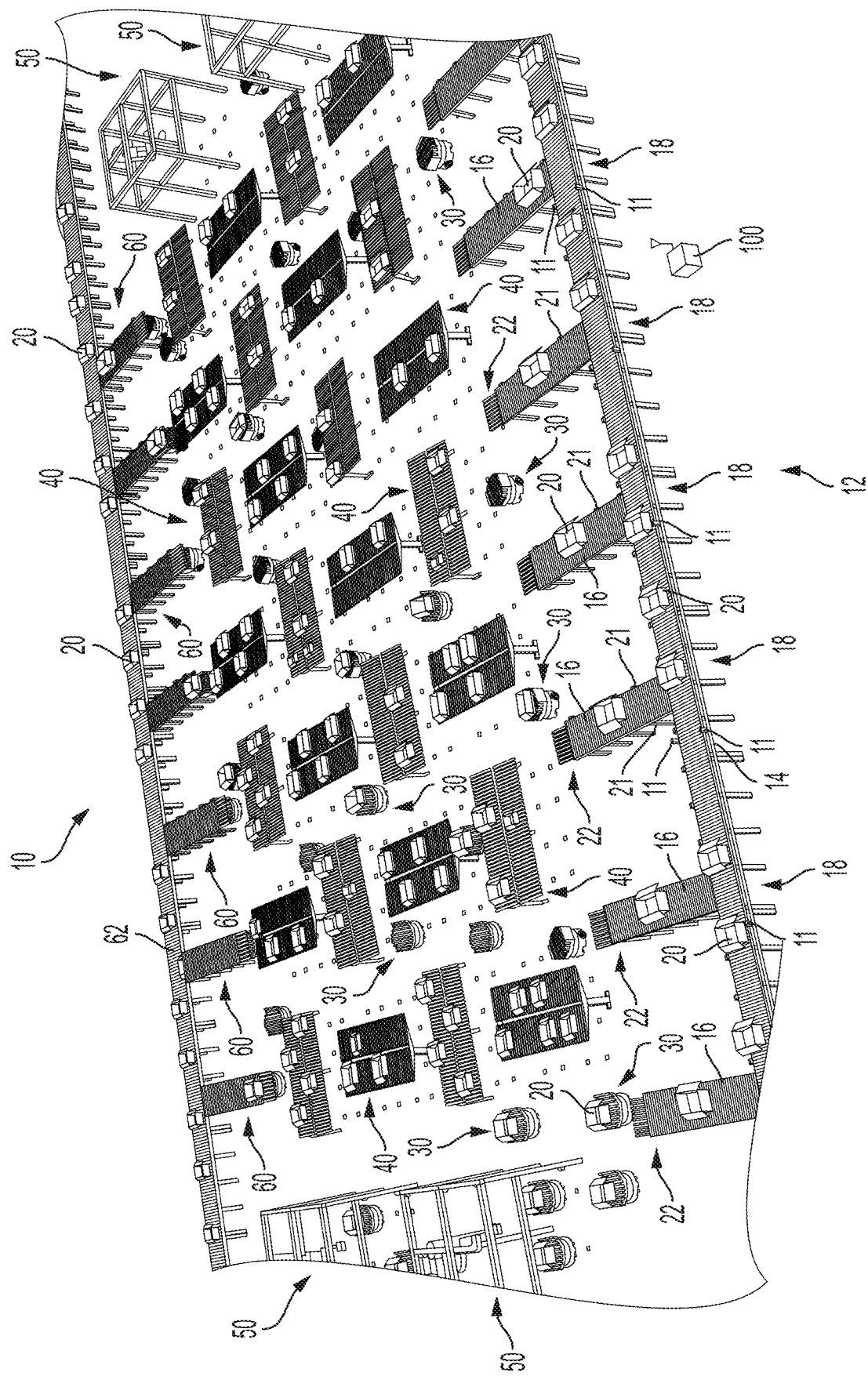
FIG. 1 shows an illustrative diagrammatic view of an object processing system in accordance with an aspect of the present invention.

FIG. 1, for example, shows an object processing system 10 that includes an input conveyance system 12 that includes an input conveyor 14 that selectively diverts containers 20 (e.g., boxes, bins, totes or trays of varying sizes) toward any of a variety of input stations 16 at bi-directional converters 18. Each input station 16 includes a terminating support structure 22 that includes a plurality of protrusions 24 (discussed in more detail below). A plurality of automated mobile carriers 30 may be engaged to move containers from any of a plurality of input stations 16, among any of a plurality of intermediate shelf locations 40, among any of a plurality of object processing locations 50, and ultimately to any of a plurality of output stations 60 of an output conveyance system 62. The system may dynamically move containers 20 along the input conveyor 14 that include both empty containers as well as containers that include objects to be processed.

The objects may be either homogenous (all the same type of objects) within a container or may be heterogeneous (including different types of objects) within a container. The system moves containers 20 onto any of the plurality of intermediate shelf locations, noting where each container is positioned. The system dynamically assigns certain containers to have one or more objects transferred out of the respective containers, and assigns other containers to receive objects, in the end satisfying an object assignment manifest. For example, a container of a set of input objects may include objects that are to be processed by placing each into specific assigned destination containers of the plurality of objects. Assigned destination containers need not be empty when objects begin to be assigned to the respective container. Again, for example, a container that includes one or more objects that are to be included in an assigned destination container, may be assigned the respective destination container assignment such that the one or more objects may simply remain in the container. When the processing of a container is complete, the completed container is moved to an output station 60 of an output conveyance system 62, where it may be further processed, e.g., for shipping. In this way, objects may be introduced into the system in the same containers that will ultimately be used for shipping. Each container includes a unique identification marking (e.g., 23 discussed below), and the content of each container may be known at the outset. The system essentially moves objects among the containers, and as each container becomes full or completed for shipping, the container is directed to the output station 60 for further processing.

Figure 2:
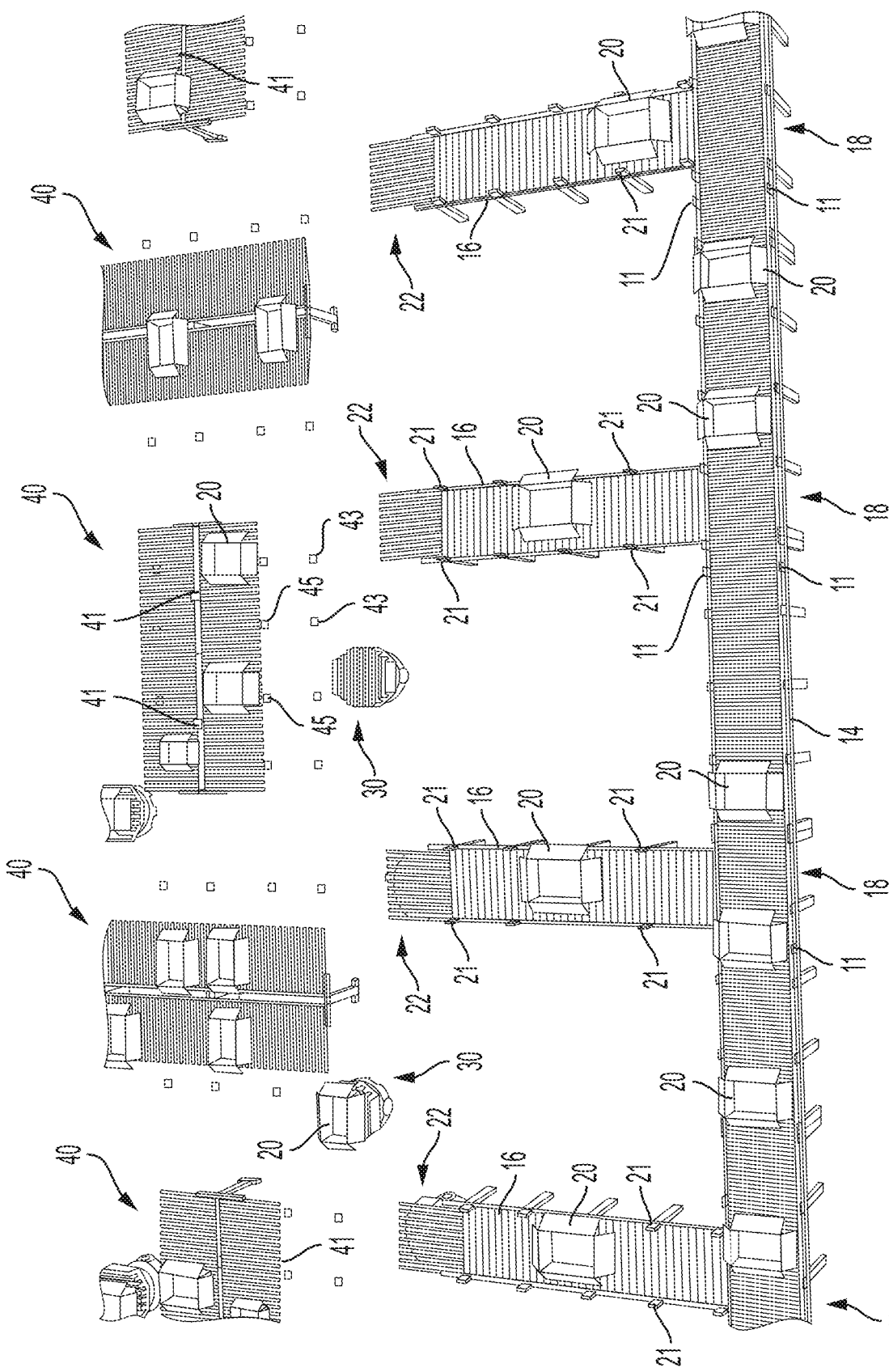
FIG. 2 shows an illustrative diagrammatic enlarged view of a portion of the object processing system of FIG. 1 including the input conveyor and the input stations.

The movement of each of the containers within the system is monitored, and the movement of each object between the containers is monitored. Each container 20 may be marked on each of its vertical sides with a unique identifying marking 23, and each of the input conveyance system 12, the mobile carriages 30, the storage shelves 40, the programmable motion devices 50, and the output conveyance system 62 may include respectively associated detection units 11, 21, 31, 41, 51 and 61 respectively for monitoring locations of all containers (as discussed further herein) by detecting the identifying marking 23 (shown in FIGS. 3A-3F). FIG. 2 shows an enlarged view of a portion of the system 10 of FIG. 1, showing in more detail the terminating support structures 22 of the input stations 16, as well as the intermediate shelf locations 40 that include the detection units 41. The system is controlled by one or more processing systems 100 that communicate (e.g., via wires or wirelessly) with each conveyor, mobile carrier, intermediate shelf location, processing station, and output conveyance system.

Systems and methods of various embodiments of the invention may be used in a wide variety of object processing systems such as sortation systems, automated storage and retrieval systems, and distribution and redistribution systems. For example, in accordance with further embodiments, the invention provides systems that are capable of automating the outbound process of a processing system. The system may provide a novel goods-to-picker system that uses a fleet of small mobile carriers to carry individual inventory totes and outbound containers to and from picking stations. In accordance with an aspect, the system includes an automated picking station that picks eaches from inbound containers and loads them into outbound containers. The containers may be dynamically assigned inbound and outbound designations. The system involves combining machine vision, task and motion planning, control, error detection and recovery, and artificial intelligence grounded in a sensor-enabled, hardware platform to enable a real-time and robust solution for singulating items out of cluttered containers.

Figure 3A:
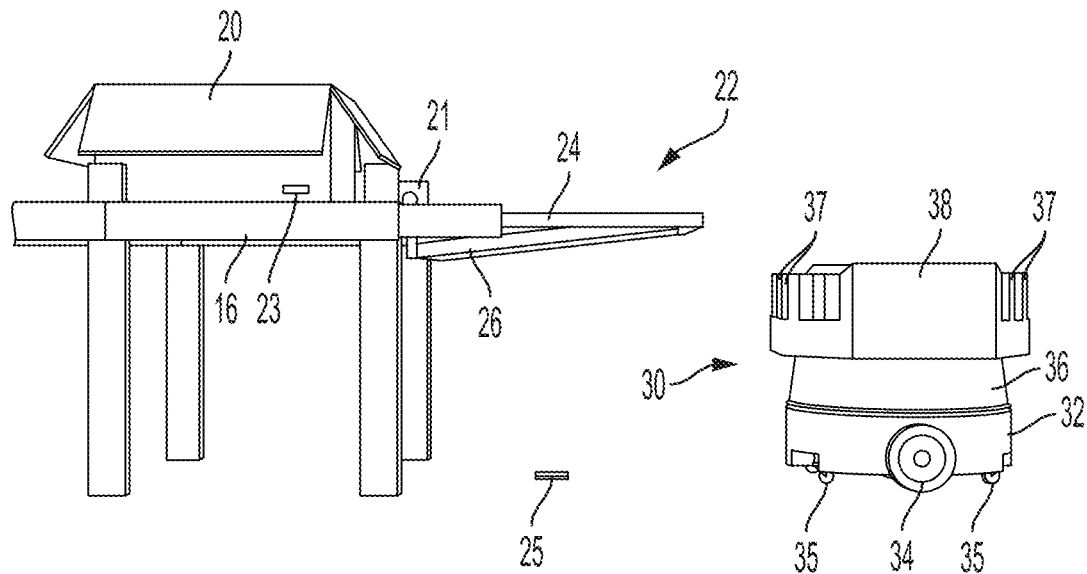
FIGS. 3A-3F show illustrative diagrammatic side views of an input station of the system of FIG. 1, showing a carrier aligning with a support structure (FIG. 3A), confirming alignment with the support structure (FIG. 3B), the support structure receiving an object (FIG. 3C), the carrier payload engaging the object (FIG. 3D), the carrier moving the object off of the support structure (FIG. 3E), and the carrier lowering the payload and object or transport (FIG. 3F)
Figure 3B:
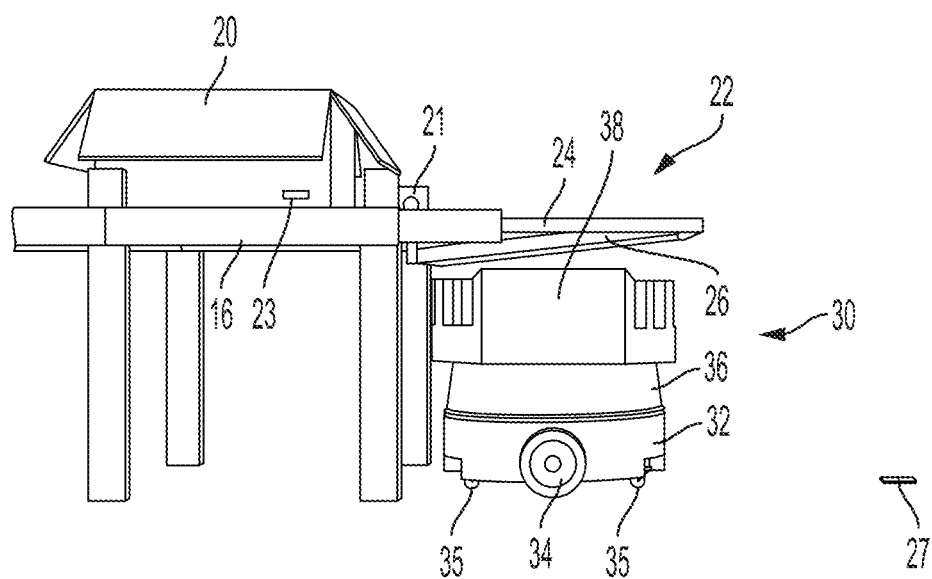

FIGS. 3A-3F show side views of a container 20 being moved from an input station 16 onto a carrier 30. With reference to FIGS. 3A and 3B, a carrier 30 is moved under a support structure 22 of the input station 16. The support structure 22 includes a plurality of protrusions 24 (as also shown in FIGS. 4A and 4B), each of which is supported by a bracket 26. As noted above, perception units 11 capture unique identifying indicia 21 on each of the containers 20 (and the identifying indicia for each container may be provided on all sides of the container). Each of the perception units (11, 21, 31, 41, 51, 61) identify containers, confirming their locations at all times in the system.

Figure 44:
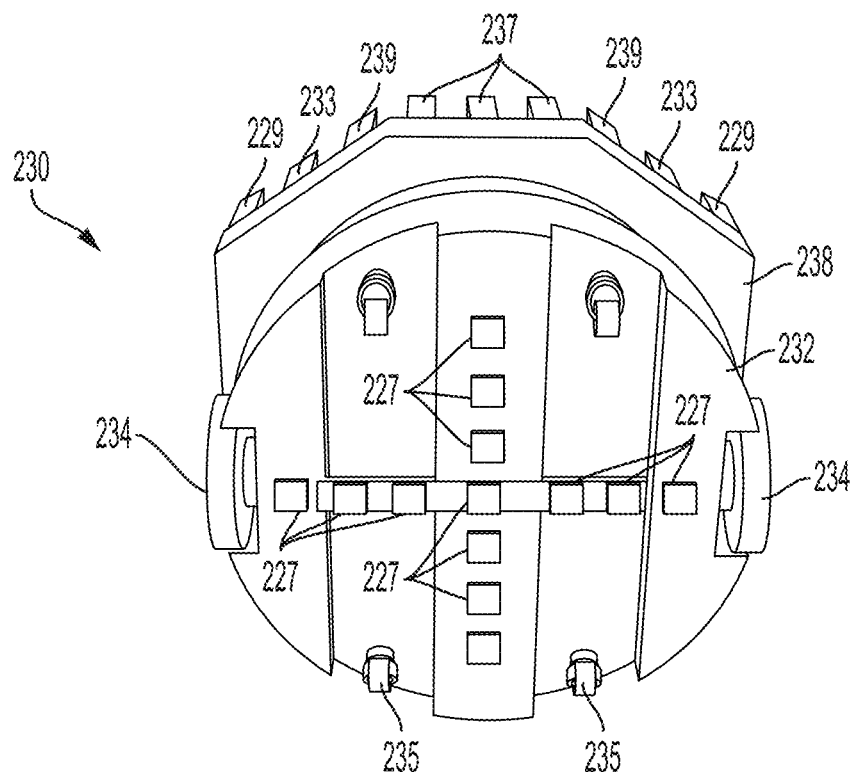
FIG. 44 shows an illustrative diagrammatic enlarged bottom isometric view of an automated mobile carrier of the system of FIG. 40.

In particular, and again with reference to 3A, when a carrier moves near a support structure 22, the carrier finds/confirms its location via a location marker 27 (shown in FIGS. 3B-3D) using a perception unit 29 on the underside of the carrier 30 (shown in FIG. 26) or plural perception units 227 on the underside of carrier 230 as shown in FIG. 44. If the carrier is not sufficiently positioned over the marker 27 with the desired orientation, the carrier may drive away from the support structure. In accordance with other aspects, the carrier may move forward toward the support structure in a way that steers the carrier to adjust the lateral position of the carrier with respect to the support structure, e.g., by moving one of the two wheels 34 faster than the other (to turn the carrier) then moving the other of the two wheels 34 faster than the first (to oppositely turn the carrier so that it again is directed to the support structure). The carrier may later return to the support structure in an attempt to become better positioned over the marker 27 with the proper carrier position and orientation with respect to the support structure. Once the perception unit on the underside of the carrier 30 is properly positioned over the location marker 27, the carrier 30 is confirmed to have the desired orientation with respect to the support structure 22. The system then moves the carrier 30 under the support structure 22 if not already there. The carrier 30 moves until the perception unit 29 on the underside of the carrier 30 confirms that the carrier 30 is centered over the location marker 25 as shown in FIG. 3B. While the system may know the position and orientation of each carrier 30 at all times, the use of the markers (e.g., 25, 27) and perception units 29 confirms the precise location and orientation of each carrier 30 in the environment under the support structure 22.

Figure 3C:
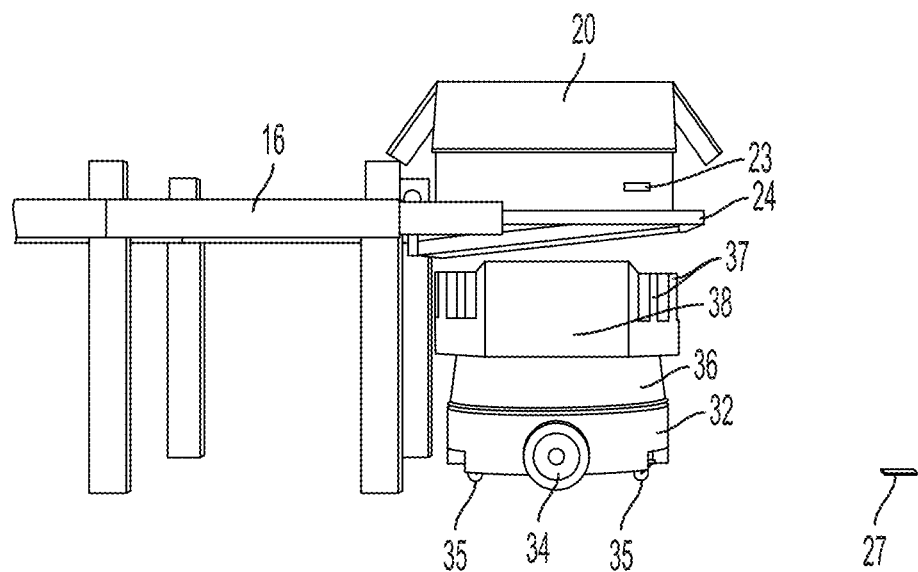
Figure 4A:
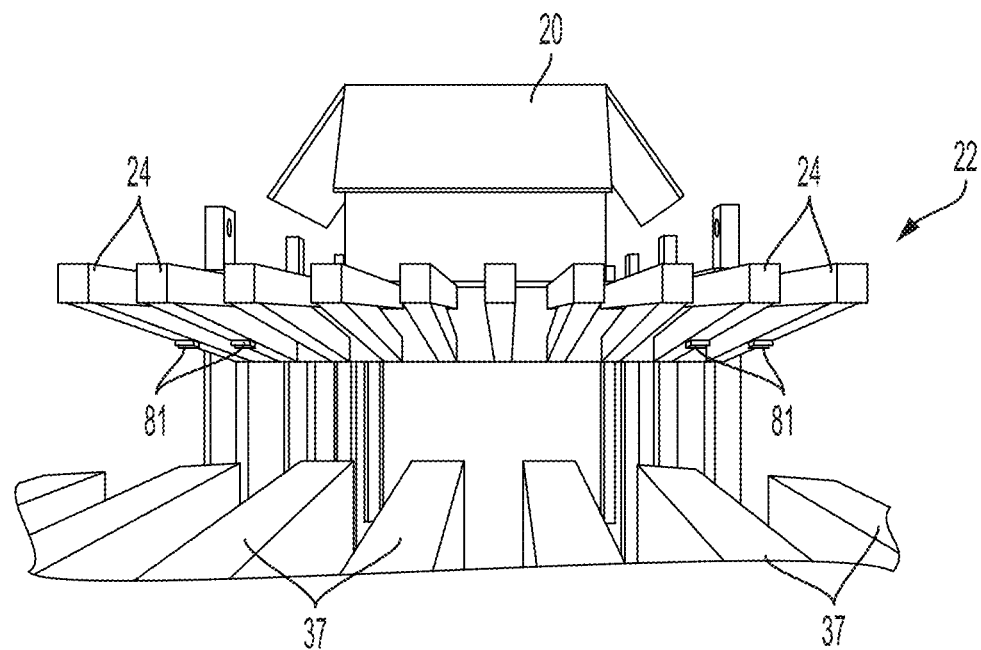
FIGS. 4A-4D show illustrative diagrammatic front views of the support structure and carrier, showing the carrier approaching the support structure (FIG. 4A), under the support structure (FIG. 4B), the support structure receiving an object (FIG. 4C), and the payload of the carrier engaging the object (FIG. 4D)
Figure 4B:
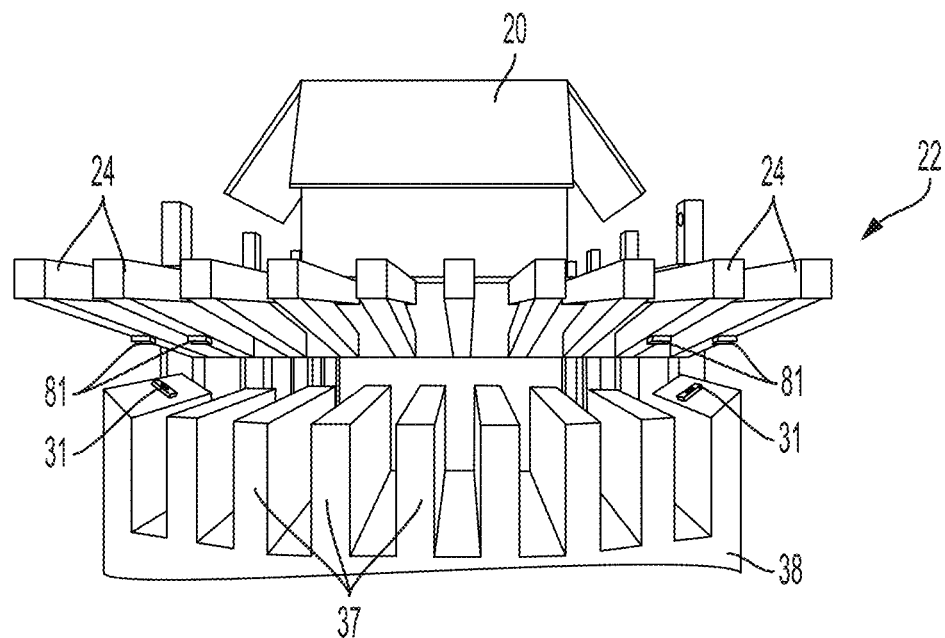

With reference to FIG. 3C, a container 20 is then moved along the input station 16 and then onto the support structure 22, which includes protrusions 24 that are supported by braces 26. Each carrier 30 includes a base 32 with a pair of drive wheels 34 that may be independently drive (in the same or opposite rotational directions and at varying speeds) to cause the carrier to move in linear and rotational directions about the floor work surface. Two sets of casters 35 may also be provided on the underside of each carrier 30 (on sides orthogonal to the sides that include the drive wheels 34) to maintain a generally level orientation of each carrier 30. In accordance with other aspects, one caster may be provided at each end of the carrier in place of each pair.

Figure 3D:
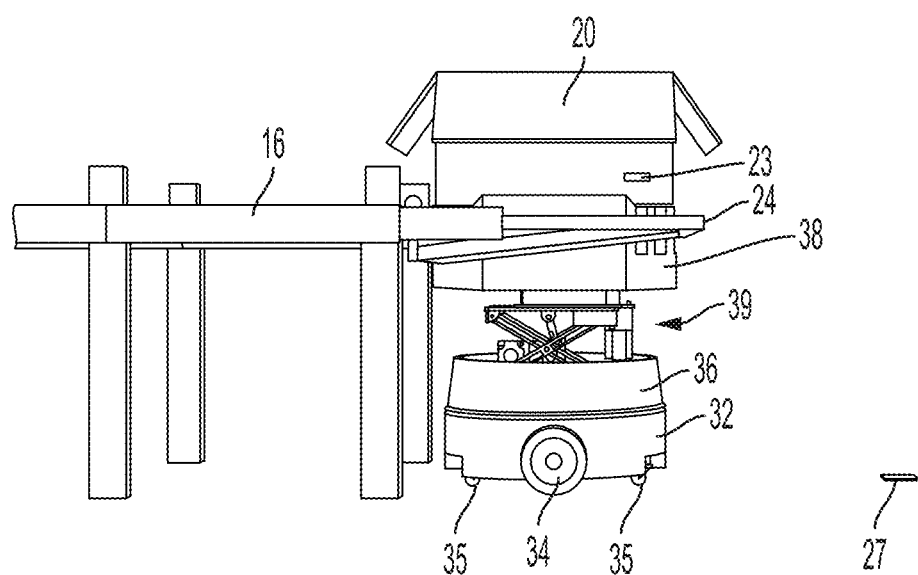
Figure 3E:
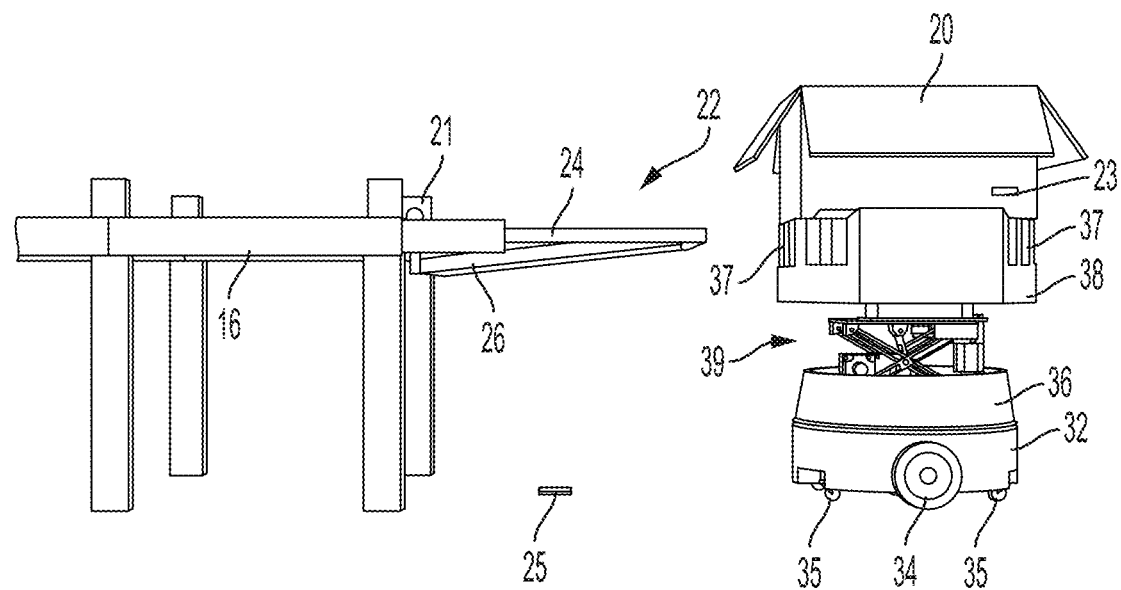
Figure 3F:
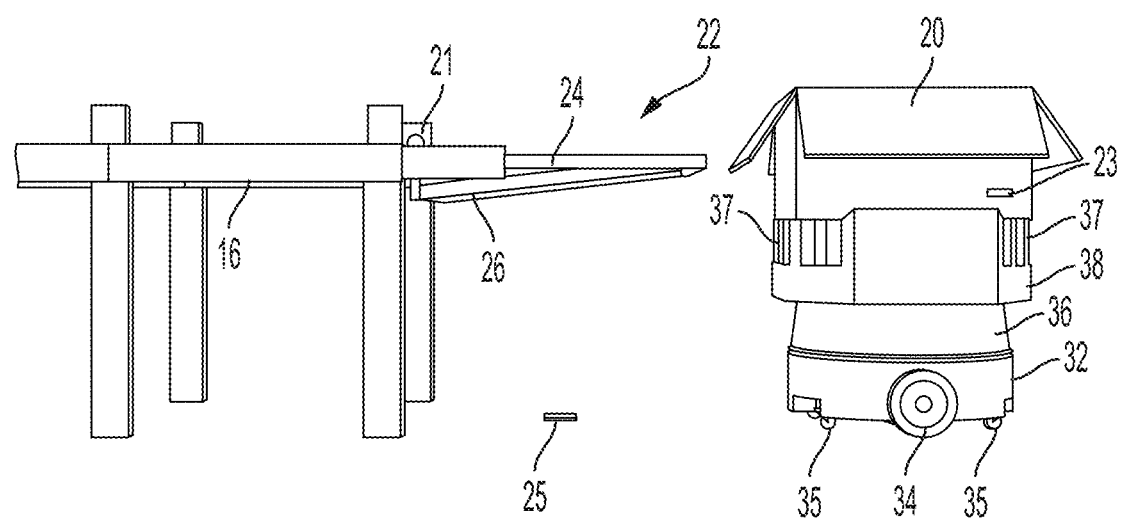

Each carrier 30 also includes a mid-section 36 and a payload 38 that includes a plurality of support ridges 37 that extend upward. The support ridges 37 are sized and spaced such that when aligned with the protrusions 24 of the support structure 22, the support ridges 37 pass between the protrusions when the payload 38 is raised from below the support structure 22. The use of the markers 25, 27 and perception units 29 (again, shown in FIG. 26), permits the carrier to accurately confirm alignment with the support structure 22. With reference to FIG. 3D, the payload 38 is raised with respect to the base 32 using an actuatable elevation system 39 as discussed in more detail below. With reference to FIGS. 3C and 3D, the container 20 is moved onto the support structure 22 (FIG. 3C, e.g., by gravity from the input station conveyor 17 or using active belts as discussed below), and the payload is lifted under the support structure (when aligned) as shown in FIG. 3D. The raised payload engages the container, and then drives away from the input station 16 as shown in FIG. 3E. The carrier 30 may then lower the elevation system 39 to return the payload (and now the container) to a lowered position on the carrier as shown in FIG. 3F.

If the payload 38 of the carrier 30 is not aligned with the protrusions when the carrier is above the marker 27, the carrier will either seek to correct the lateral orientation of the payload as the carrier is moved to marker 25, or the carrier may move away from the support structure 22 entirely (and move to a different location or try again at the current location). The lateral orientation of the carrier may be corrected as the carrier moves between the marker 27 and the marker 25 by powering each of the wheels 34 on the carrier differently (first on one side and then on the other).

In accordance with further aspects, the detection units 31 may also be used for confirming alignment with the protrusions 24 of the support structure 22 by detecting markers 81 on the underside of some of the protrusions 24 as shown in FIGS. 4A and 4B. FIG. 4A shows the carrier approaching the support structure, and FIG. 4B shows the carrier positioned under the support structure, with the detection units 31 aligned between respective pairs of markers 81, which may be reflective markers or illumination sources such as LEDs. When the detection units 31 are each positioned between a respective pair of markers 81, the carrier is aligned with the support structure.

Figure 4C:
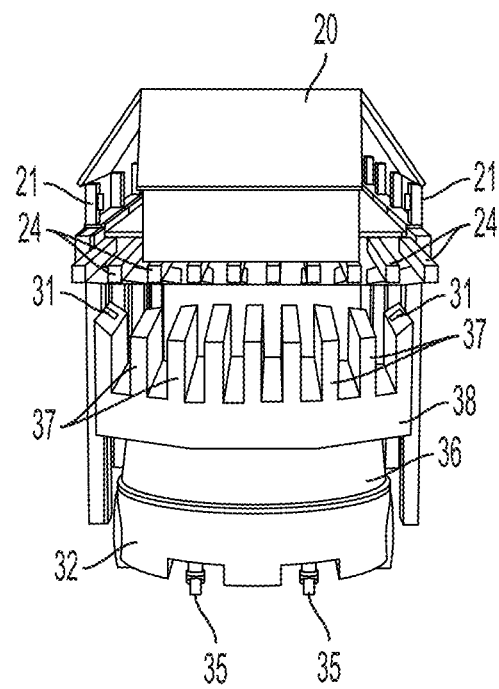
Figure 4D:
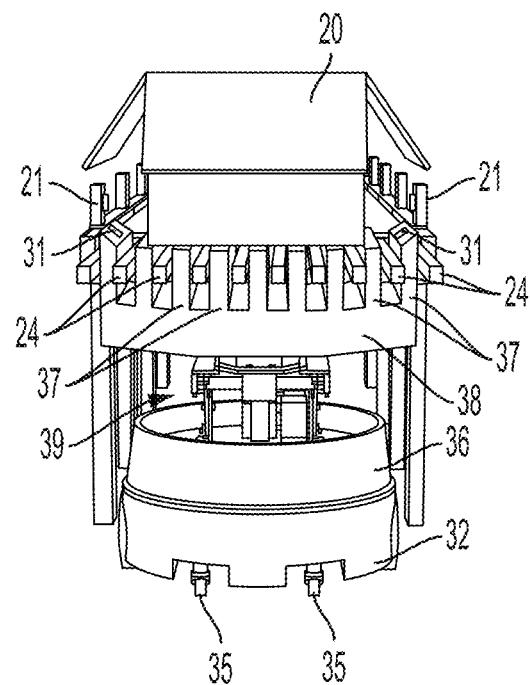

FIGS. 4C and 4D show the payload 38 aligned with the support structure 22 (as shown in FIG. 4C) such that the support ridges 37 alternate with the protrusions 24 of the support structure 22, permitting the support ridges 37 to pass between the protrusions 24 when the payload is lifted. Near the end of the lift range (as shown in FIG. 4D), the container 20 is lifted off of the support structure 22, and becomes supported instead by the support ridges 37 of the payload 38. The central regions of the two outermost support ridges may also employ the perception units 31 (in addition to the above marker detection) for detecting any indicia 23 on the container 20, again, confirming the identity of the container 20.

Figure 5:
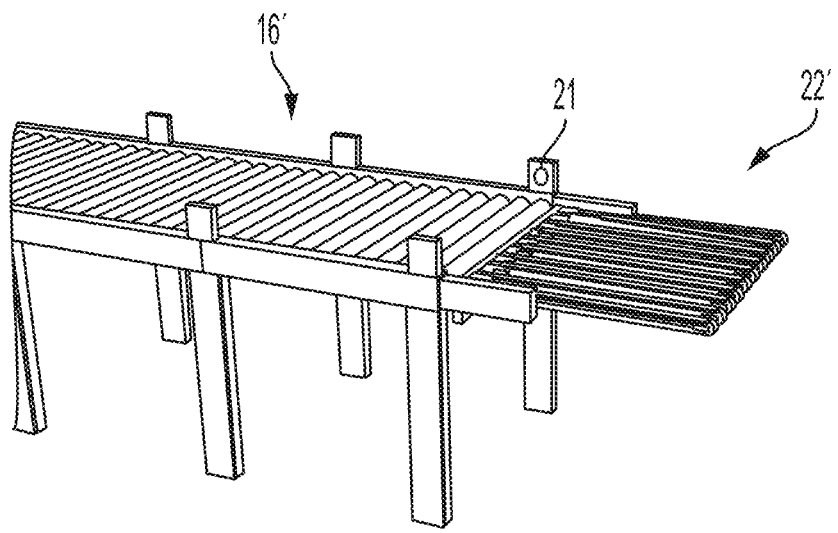
FIG. 5 shows an illustrative diagrammatic view of an input station in accordance with another aspect of the present invention that includes narrow conveyor belts as protrusions.
Figure 6:
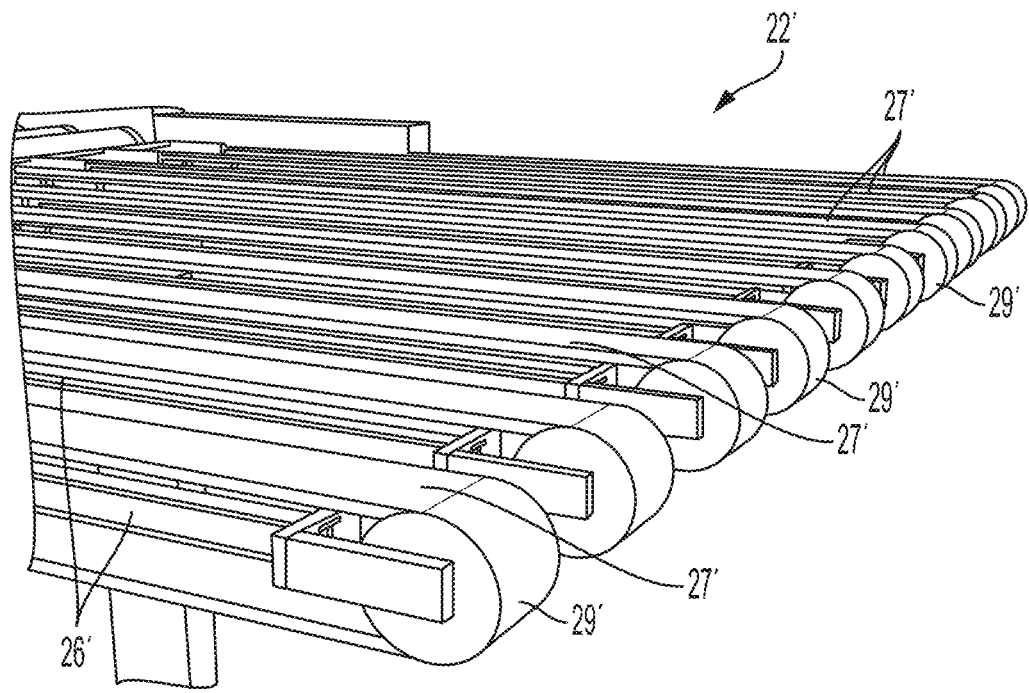
FIG. 6 shows an illustrative diagrammatic enlarged view of the conveyor belt protrusions of the input station of FIG. 5.
Figure 7:
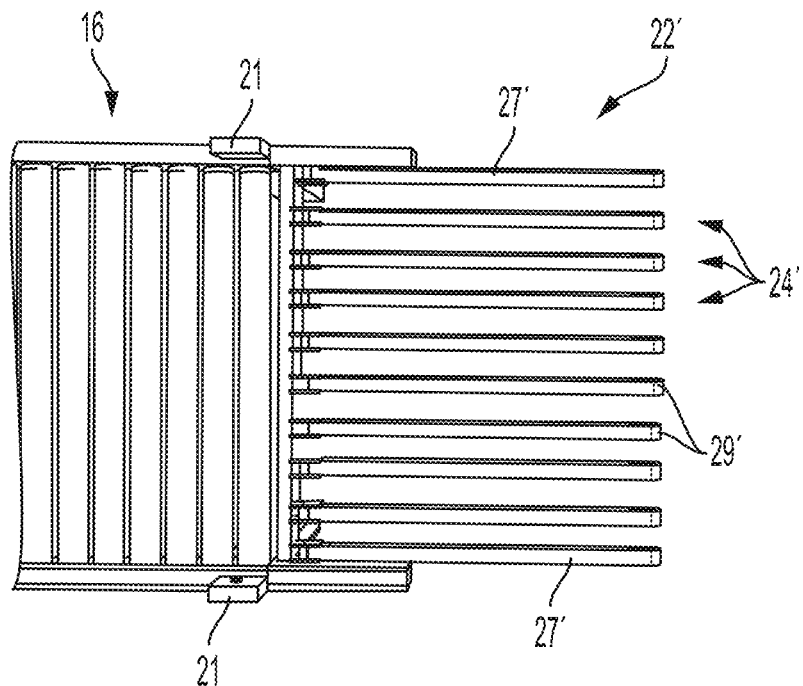
FIG. 7 shows an illustrative diagrammatic plan view of the input conveyor belt protrusions of the input station of FIG. 5.
Figure 8:
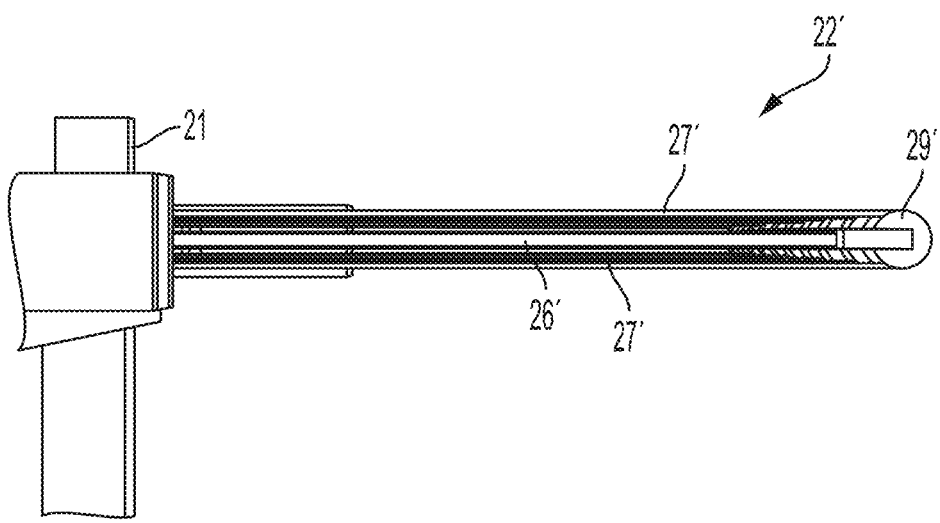
FIG. 8 shows an illustrative diagrammatic side view of the input conveyor belt protrusions of the input station of FIG. 5.

As noted above, the input station 16 may include an input station conveyor that is angled downward to provide the container 20 onto the support structure using gravity. In accordance with a further aspect, a support structure 22' may instead include protrusions formed of narrow conveyors belts as shown in FIGS. 5-8 with the conveyor belts drawing objects toward the open end of each support structure. In particular, FIG. 5 shows the support structure 22' extending at the end of input station conveyor 17 of input station 16, and as shown at the enlarged area of FIG. 6, each protrusion 24' includes a narrow conveyor belt 27' that travels over a pair of rollers 29', and the rollers are supported by an (e.g., I-beam) support bracket 26' (shown in FIG. 6). With reference to FIG. 7, each protrusion 24' is sized and spaced (shown in FIG. 7) such that the support ridges 37 of a carrier may pass between the protrusions 24' when a payload is raised from under the support structure 22'. Each support bracket 26' is positioned within the loop of each belt 27' as shown in FIGS. 6 and 8. The actuatable belts 27' may facilitate moving a container onto the support structure 22' (and in accordance with further aspects discussed below, may facilitate moving a container onto an output station conveyor of an output station). As discussed above with reference to FIGS. 3A-3F, any alignment correction between the carrier and the support structure 22' may be provided by adjusting the power independently to the wheels 34 as the carrier is moved from marker 27 to marker 25 (again, first by applying more power on one side and then on the other side). Further, the perception units 31 may be employed to detect the belts 27' of the protrusions 24' when the belts 27' are formed of a highly reflective material to thereby confirm alignment of the payload on the carrier with the support structure.

Figure 9A:
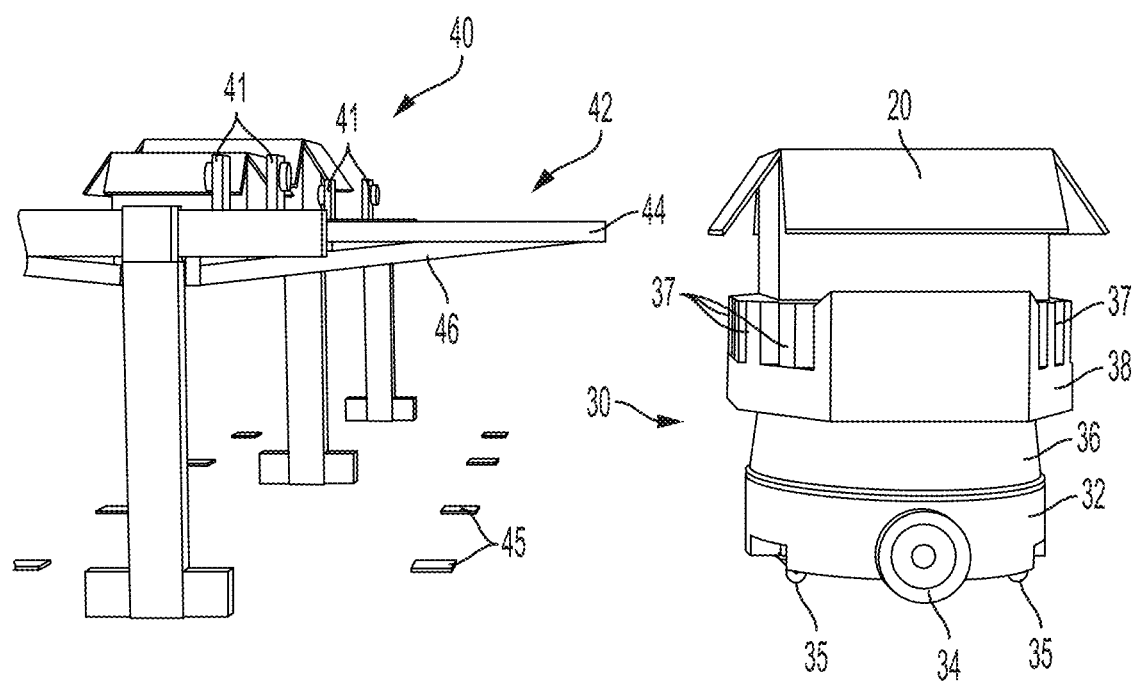
FIGS. 9A-9D show illustrative diagrammatic views of an intermediate shelf location of the system of FIG. 1, showing a carrier with an object on its payload aligning with a support structure (FIG. 9A), the carrier lifting the payload and the object (FIG. 9B), the carrier having moved the payload among the protrusions of the shelf location (FIG. 9C), and the carrier having lowered the payload to place the object onto the protrusions of the shelf location (FIG. 9D)
Figure 9B:
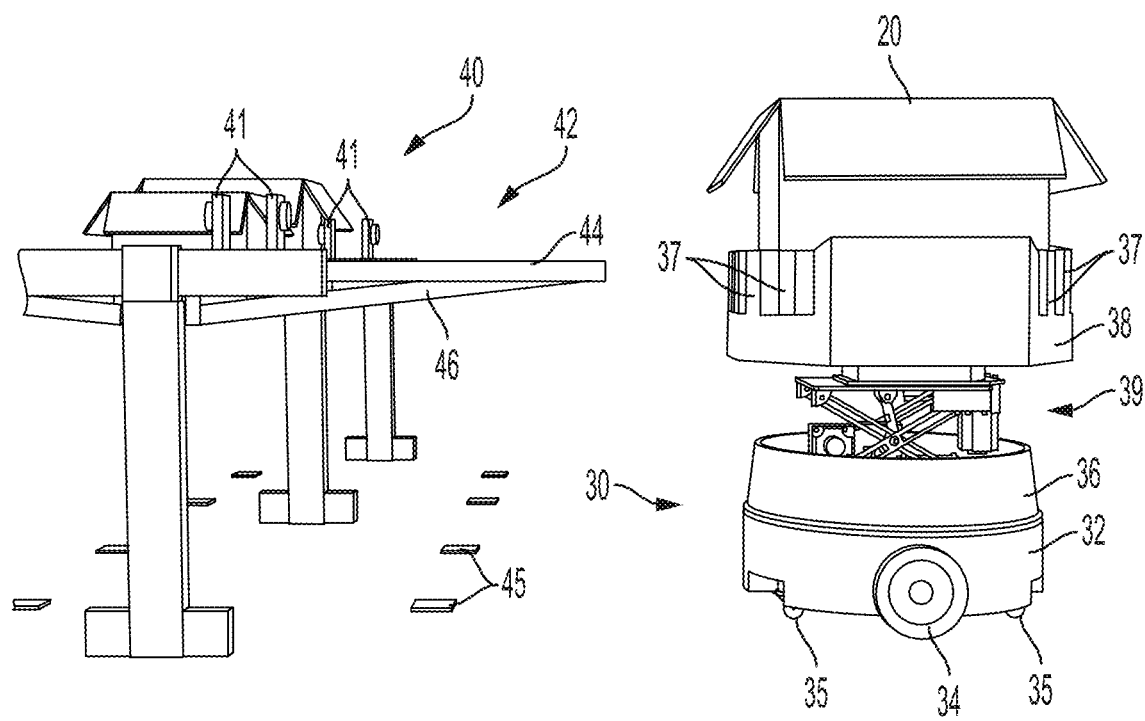
Figure 9C:
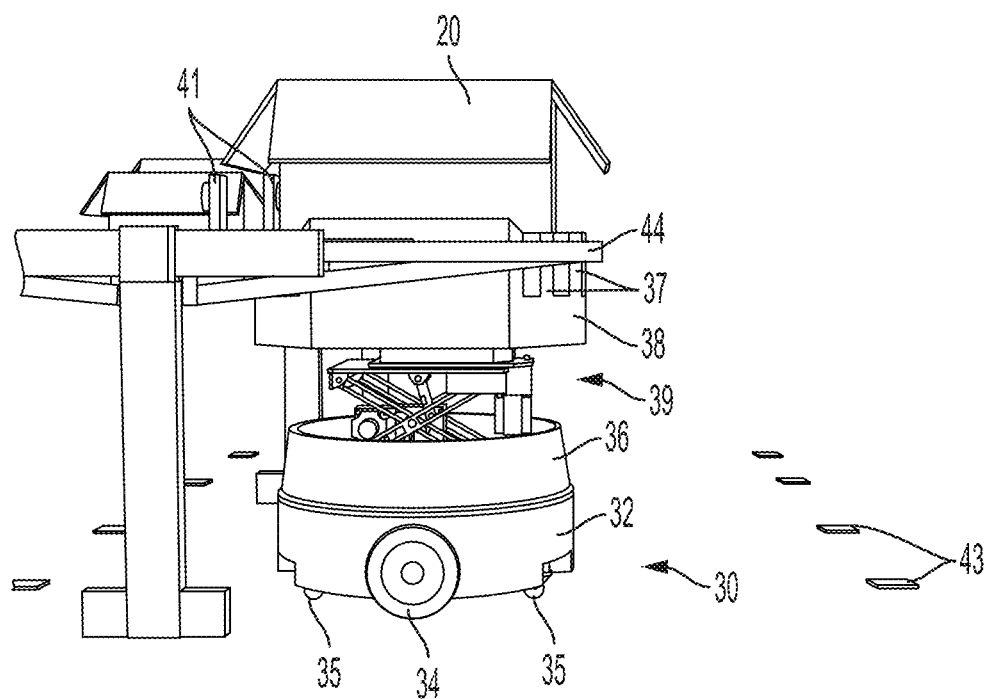
Figure 9D:
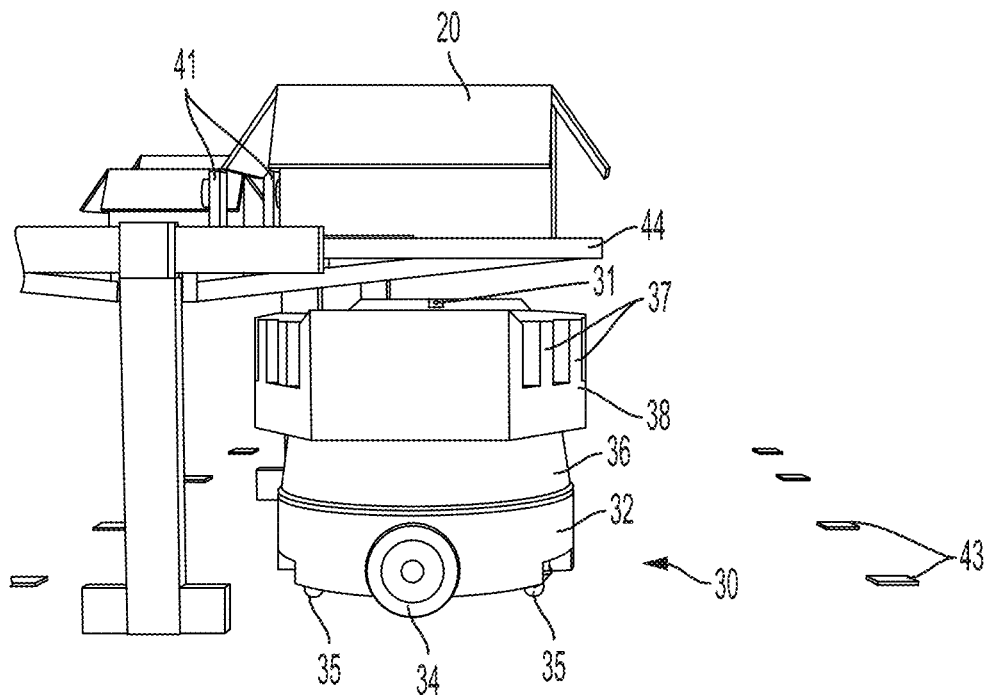
Figure 10A:
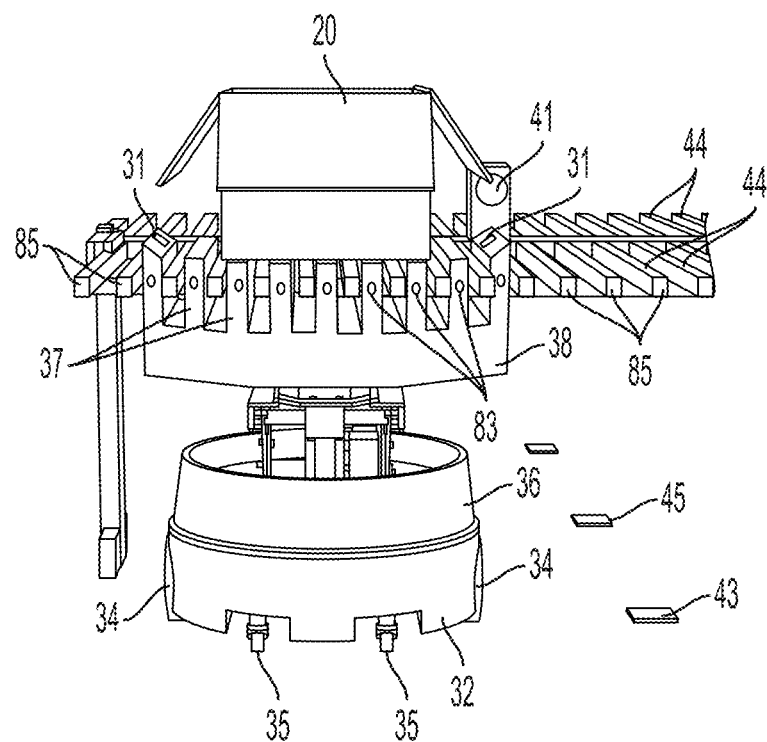
FIGS. 10A and 10B show illustrative diagrammatic front views of the carrier having moved the payload among the protrusions of the shelf location (FIG. 10A), and the carrier having lowered the payload to place the object onto the protrusions of the shelf location (FIG. 10B)
Figure 10B:
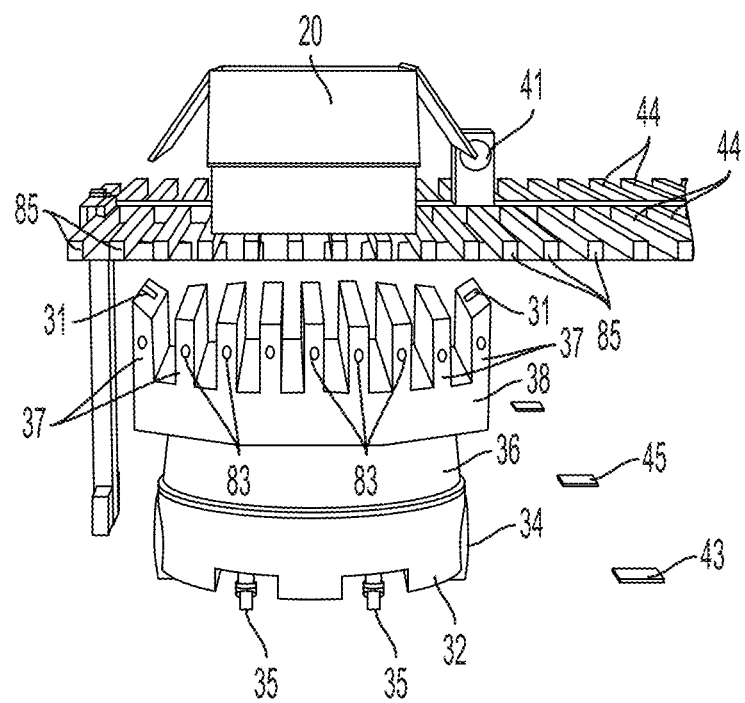

A container 20 may be moved from a carrier 30 onto an intermediate shelf location 40 including one or more container support structures 42. With reference to FIGS. 9A and 9B, a payload for a carrier 30 is raised and moved toward a support structure 42 of the intermediate shelf location, and the elevation system 39 may be engaged to raise the payload and the container as shown in FIG. 9B. The support structure 42 includes a plurality of protrusions 44 (as also shown in FIGS. 10A and 10B), each of which is supported by a bracket 46. When the carrier 30 drives toward the support structure 42, a perception unit 29 on the underside of the carrier 30 (again, shown in FIG. 26) finds a location marker 43 on the floor near the support structure 22 (as shown in FIGS. 9C and 9D). While the system may know the position and orientation of each carrier 30 at all times, the use of the markers 43 and perception units 29 confirms the precision location and orientation of each carrier 30 near a support structure 42.

Again, each carrier 30 also includes a payload 36 that includes a plurality of support ridges 37 that extend upward. The support ridges 37 are sized and spaced such that when aligned with the protrusions 44 of the support structure 42, the support ridges 37 pass between the protrusions when the payload 38 is moved into the support structure 42 as shown in FIG. 9C. The use of the markers 25 and perception units 29 (again, shown in FIG. 25), permits the carrier to confirm accurate alignment with the support structure 42. The payload 38 is lowered with respect to the base 34 using a remotely actuatable elevation system 38 as discussed above. With reference to FIG. 9D, the container 20 is deposited onto the support structure 42 (FIG. 9D), and the carrier 30 then drives away from the input station 16, leaving the container on the intermediate shelf location.

In accordance with further aspects, each of the protrusions 44 may include markers 81 on the undersides thereof for detection by the perception units 31 as discussed above with reference to FIGS. 4A-4C when removing an object from a shelf location. Each shelf location may also include highly reflective material 85 at the ends of each of the protrusions 44 as shown in FIGS. 10A and 10B. Each payload 38 may also include detection units 83 (shown in FIGS. 10A and 10B) on each end of each of the support ridges 37, and using the detection units 83, the system may also confirm alignment of a respective carrier with respect to the shelf location when advancing toward the shelf location with the payload in an elevated position with an object on the payload.

FIGS. 10A and 10B show the payload 38 aligned with the support structure 42 (as shown in FIG. 10A) such that the support ridges 37 alternate with the protrusions 44 of the support structure 42, permitting the support ridges 37 to pass between the protrusions 24 when the payload is moved among the support structure 42. The payload is then lowered away from the support structure 42, and the container 20 becomes supported instead by the support structures 42 of the intermediate shelf location (as shown in FIG. 10B). As noted above, perception units 41 (shown in FIG. 2) capture unique identifying indicia 21 on each of the containers 20 (and the identifying indicia for each container may be provided on all sides of the container). Each of the perception units (11, 31, 41, 51, 61) identify containers, confirming their locations at all times in the system.

If the payload 38 of the carrier 30 is not aligned with the protrusions 44 when the carrier is above the marker 43, the carrier will either seek to correct the lateral orientation of the payload as the carrier is moved to marker 45, or the carrier may move away from the shelf location 40 entirely (and move to a different location or try again at the current location). The lateral orientation of the carrier may also be corrected as the carrier moves between the marker 43 and the marker 45 by powering each of the wheels 34 on the carrier differently (first on one side and then on the other).

The automated picking system perceives the contents of the containers using a multi-modal perception unit and uses a robotic arm equipped with an automated programmable motion gripper and integrated software in processing systems to pick eaches from inbound and processing containers and place them into outbound containers. These systems are in communication with work cells that interface with the automated mobile carriers to keep the automated picking system fed with a continual supply of containers. The automated carriers can remove or replace a container from or onto a storage location readily. Since a carrier only carries one container at a time, it can be smaller, lighter, and draw less power than a larger robot, while being much faster. These features improve cost to performance metrics.

Unlike shuttle- or crane-based goods-to-picker systems where the mobile component of the system is constrained to a single aisle, the carriers can move forward, backward, left or right to drive around each other and reach any location in the system. This flexibility allows the carriers to serve multiple roles in the system by transporting (a) inventory totes to picking stations, (b) outbound containers to picking stations, (c) inventory totes to and from bulk storage, (d) full outbound containers to discharge lanes, and (e) empty outbound containers into the system. Additionally, the carriers may be added incrementally as needed to scale with facility growth.

Figure 11:
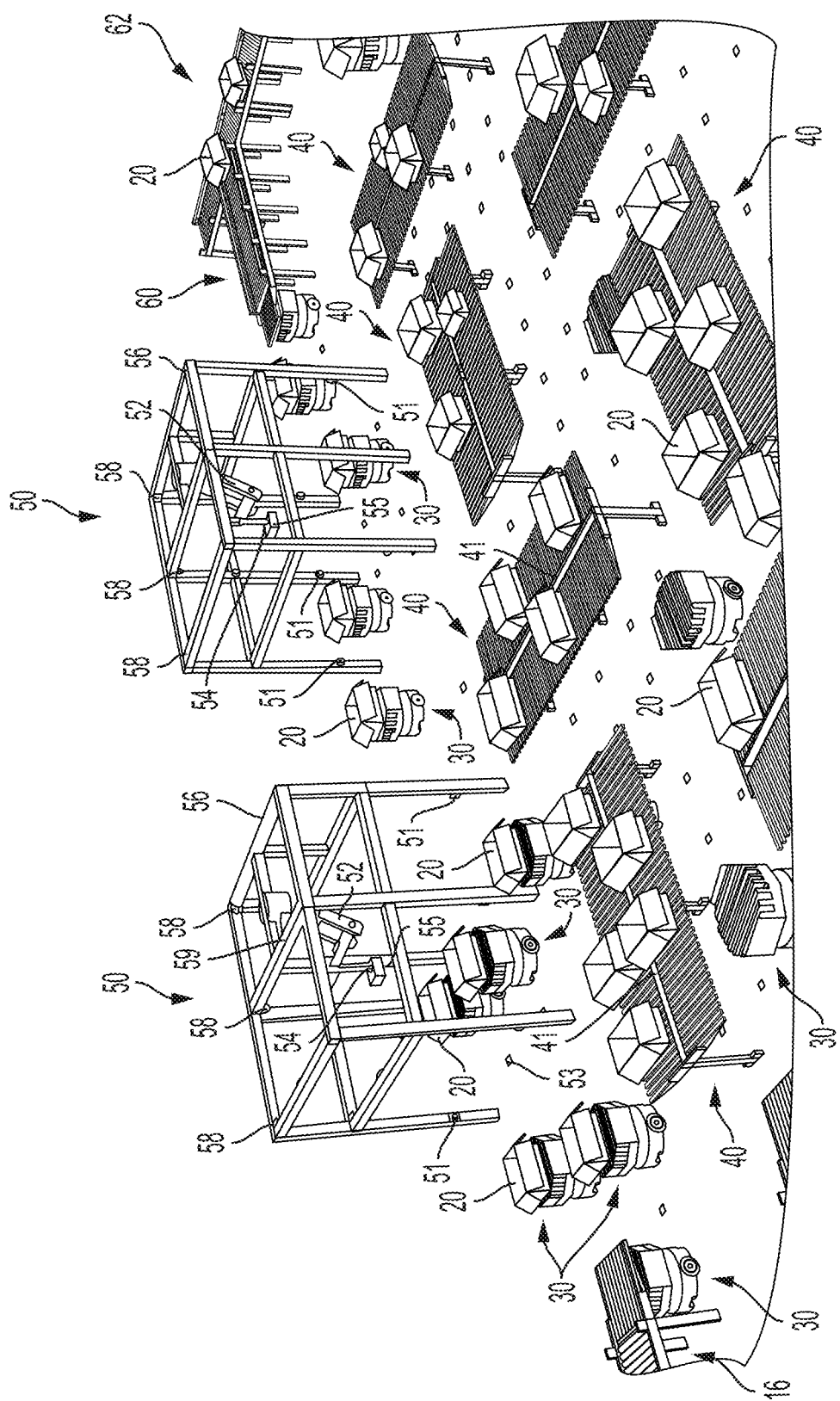
FIG. 11 shows an illustrative diagrammatic enlarged view of a portion of the system of FIG. 1 showing object processing locations.

FIG. 11 for example, shows object processing locations 50 including programmable motion devices 52 with end effectors 54 for grasping objects 55. Each programmable motion device may be floor mounted or may be suspended from a programmable motion device support 56. A plurality of perception units 51, 58 may be employed to monitor the movement of carriers 30 within a field of view of the perception units, and for guiding the end effector 54 to selected positions and move an object from one container to another container. Again, perception systems 51 may also identify/confirm the identities of the containers 20. The system operates under the control, for example, of one more computer processing system(s) 100, e.g., wirelessly.

A picking order is a request to transfer a specified quantity of a SKU from an inventory tote into an outbound container. An outbound container may contain SKUs from many different picking orders that are destined for similar locations in a store and have mutually compatible transportation requirements. For example, a picking order may request two packs of X brand body washes, one pack of Y brand soap, and twelve other items to be placed into an outbound container intended to replenish the soap aisle in a particular store.

A sequencing order is a request to sequentially deliver a group of containers to an in-feed station to be assembled into a cart. A cart is assembled from a mixture of VCPs (for SKUs that are replenished in full-case quantity) and outbound containers (filled by picking orders) that are used to replenish nearby sort points within a store. For example, a sequencing order may request two other outbound containers, and five VCPs to be loaded onto a cart destined for the health & beauty department of a particular store.

Figure 12:
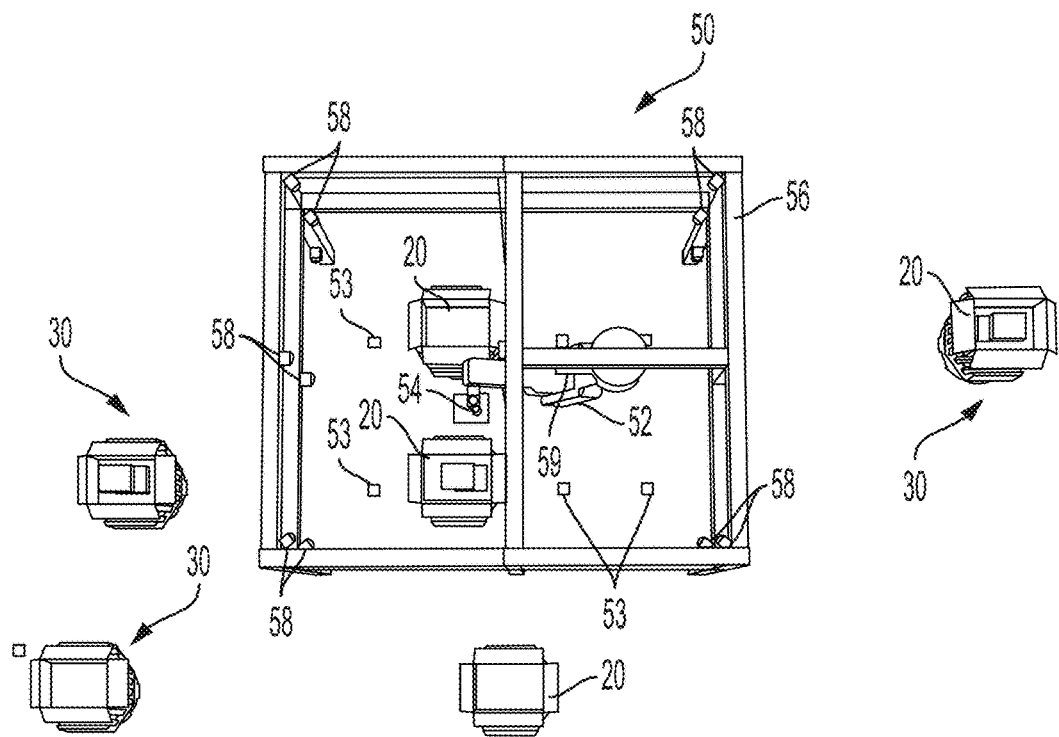
FIG. 12 shows an illustrative diagrammatic plan view of an object processing location of FIG. 11.
Figure 13:
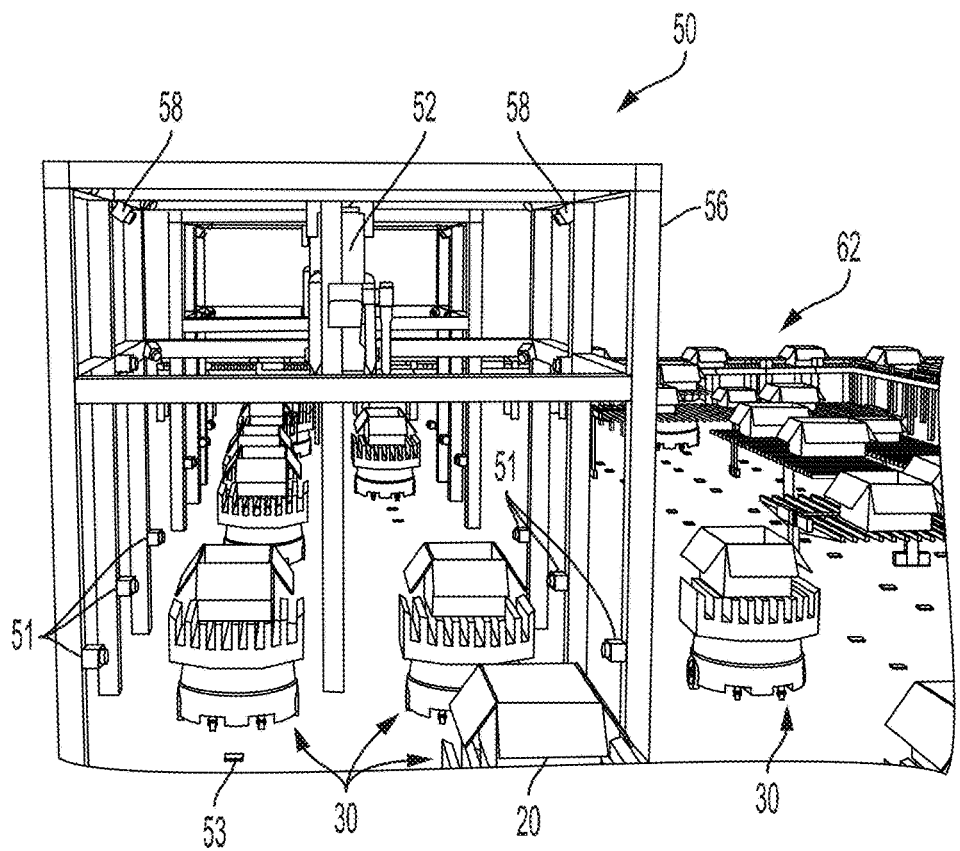
FIG. 13 shows an illustrative diagrammatic side elevational view of the object processing location of FIG. 12.
Figure 26:
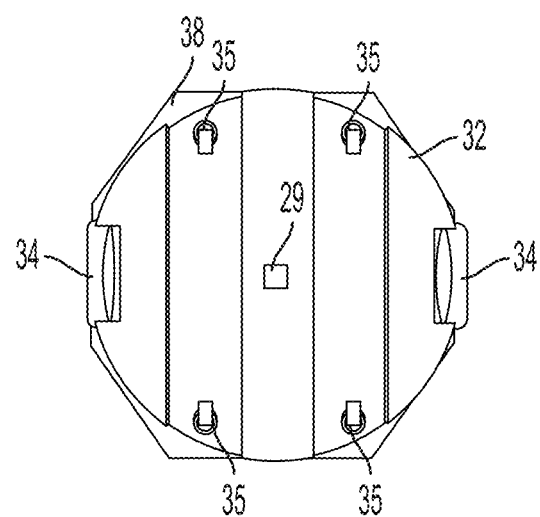
FIG. 26 shows an illustrative diagrammatic bottom view of the automated mobile carrier of FIG. 14.

The carriers 30 move such that two chosen carriers at a time are presented below the articulated arm 52 of the processing station 50 as further shown in FIG. 12 (which shows a top view) and FIG. 13 (which shows an end view). The carriers are chosen so that a specified object (e.g., 55) in one container on a carrier, is designated to be moved to a container on the other carrier of the two. In this way, objects are moved among containers on carriers in order to provide completed containers in accordance with an overall manifest. Again, containers may be introduced into the system including one or more homogenous or heterogenous groups of objects, and further, empty containers may be introduced into the system when additional containers are required. As each container and each carrier is uniquely identified, the system knows the content and position of each container and each carrier at all times. The detection units 29 on the underside of the carriers 30 (as shown in FIG. 26) may confirm alignment of the carriers over location markers 53, the detection units 51 may confirm the presence of known containers 20 on the carriers 30, detection unit 59 may be used to assist the programmable motion device in locating and grasping objects, and detection units 58 may be used to confirm grasps of objects as well as the locations of the containers 20 proximate the programmable motion device.

All orders that are required to fill a trailer form a wave that must be completed by that trailer's cut time. Each wave begins inducting the necessary inventory containers and VCPs from bulk storage into modules. Those containers remain on carriers until the wave is complete, at which point they are either (i) sequenced onto the output conveyance system 62, (ii) returned to bulk storage, or (iii) retained for use in a future wave. Multiple waves are processed concurrently and seamlessly: one wave may be inducting inventory while two waves are processing picking orders and a fourth wave is being sequenced. The operation for inducting inventory into the system, fulfilling picking orders, and sequencing output, may further include the following: Inventory is inducted into the system at in-feed stations bordering the external bulk storage solution. Items intended to go through the each-based process must be decanted and de-trashed into inventory containers that contain homogeneous eaches before being loaded into the system. VCPs intended to pass through the system must be either compatible with carrier transport or placed in a compatible container, e.g. a tray. Each container is scanned during induction to determine its identity, which is used to identify its contents and track its location within the module system. Once all picking orders that require an infeed container are complete—and no upcoming waves are projected to require it—the container is discharged from the system by completing the induction process in reverse.

Picking orders are processed by automated picking stations and manual picking stations. Each picking order is completed by requesting two carriers to meet at a pick station: one carrying an inventory container of the requested SKU and the second carrying the desired outbound container. Once both carriers arrive, the picking station transfers the requested quantity of eaches from the inventory container to the outbound container. At this point, the carriers may carry the containers back into storage or to their next destination. The system scheduling software optimizes the assignment of storage locations sequence of orders, scheduling of arrival times, and queuing of carriers to keep pick stations fully utilized, and to optimize scheduling and usage of the grid so as to avoid traffic jams and collisions. Orders that are not amenable to automated handling are assigned to a manual picking station. Inventory and outbound containers are stored near the picking stations that are assigned to process those orders. When possible, multiple orders that require the same container are collated to minimize the storage and retrieval operations. Once all containers required to build an order are available, i.e., the requisite VCPs have been inducted and picking orders are completed, those containers are eligible to be sequenced. Containers are sequenced by requesting carriers to transport containers from their current location to any of a plurality of programmable motion devices.

Alignment of each carrier (and payload) with each output station 60 may also be confirmed using markers on the floor as discussed above with reference to FIGS. 3A-3F and 9A-10B, as well as by using perception units 83 on the support ridges 37 of the payload together with highly reflective tape on the ends of each protrusion of the support structure of each output station as discussed above with reference to FIGS. 10A and 10B. Further, the protrusions of each output station may include conveyor belt protrusions as discussed above with reference to FIGS. 5-8, with the conveyor belts drawing objects away from the open end of each support structure.

Figure 14:
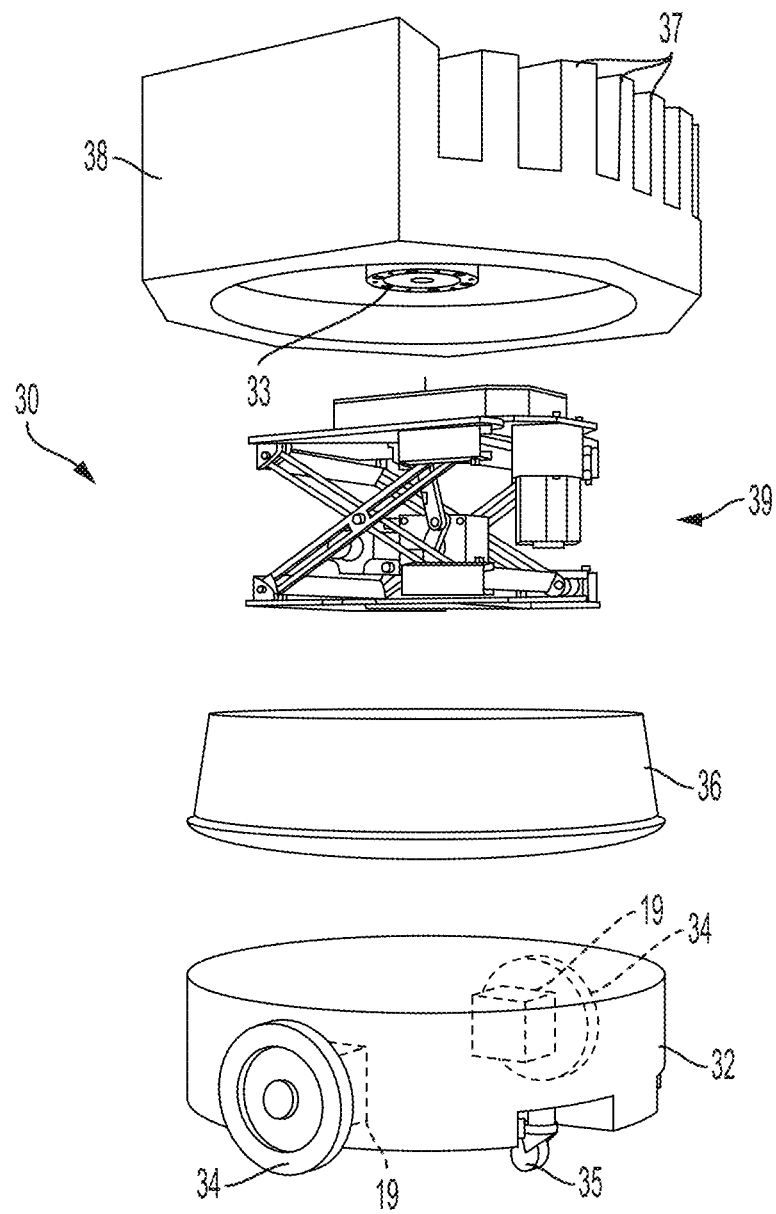
FIG. 14 shows an illustrative diagrammatic exploded view of an automated mobile carrier of the system of FIG. 1.
Figure 15:
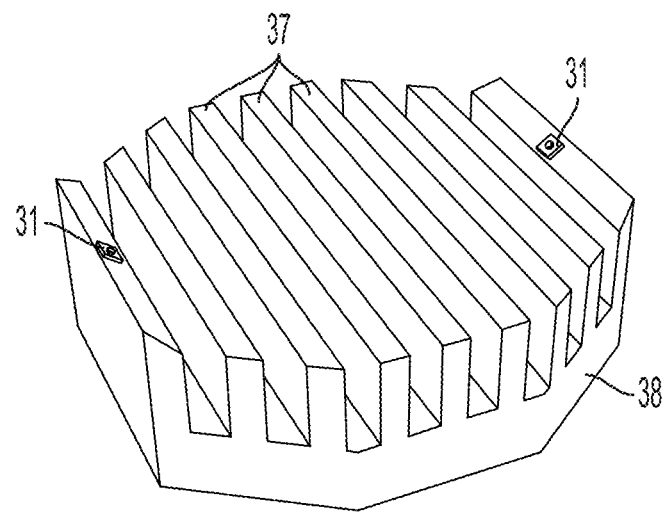
FIG. 15 shows an illustrative diagrammatic isometric view of the top of a payload of the carrier of FIG. 14.
Figure 16:
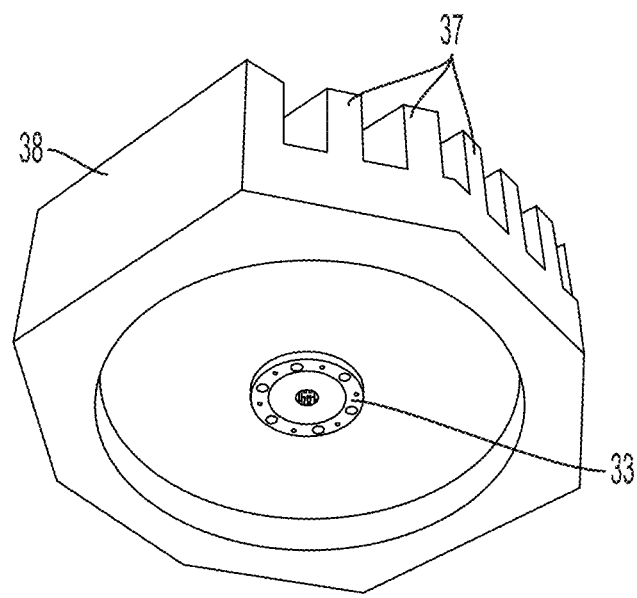
FIG. 16 shows an illustrative diagrammatic isometric view of the bottom of the payload of the carrier of FIG. 14.

FIG. 14 shows an exploded view of a carrier 30 that includes the base 32, wheels 34 (one is shown), casters 35, mid-section 36, position control system 39, and payload 38 including the support ridges 37. The position control system 39 is mounted on top of the base 32 and is protected by the mid-section 36 in the form of a shroud. The underside of the payload 38 includes a mounting disc 33 for attachment to a rotation system drive as discussed in more detail below, the mounting disc optionally being provided within a recessed region. FIG. 15 shows a top view of the payload 38 including the support ridges 37 and detection units 31, and FIG. 16 shows an underside view of the payload including a rotor attachment unit 33 for coupling to a drive rotor of the rotation system discussed below. The rotor attachment unit may be optionally provided within a recess of the underside surface.

Figure 17:
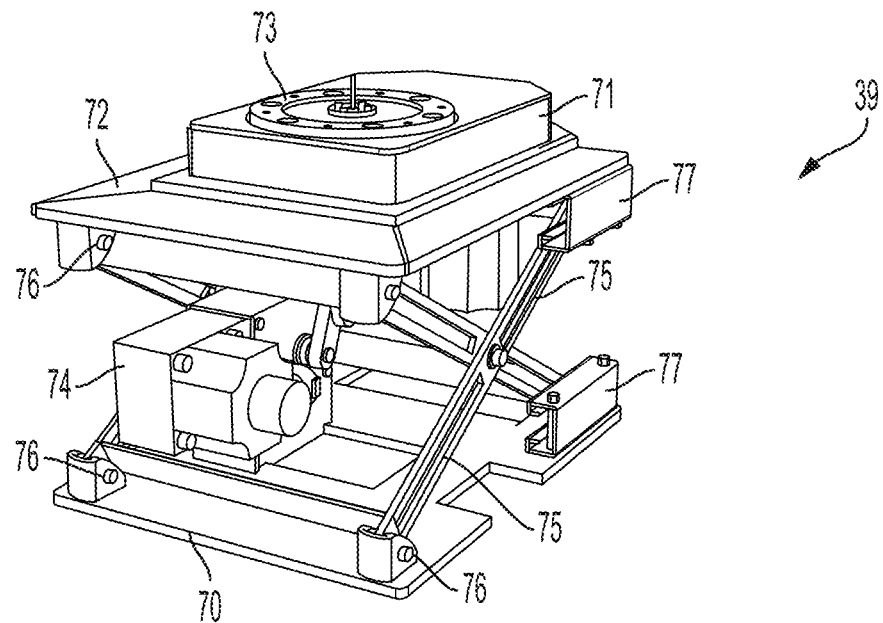
FIG. 17 shows an illustrative diagrammatic isometric first side view of the position control system of the carrier of FIG. 14.
Figure 18:
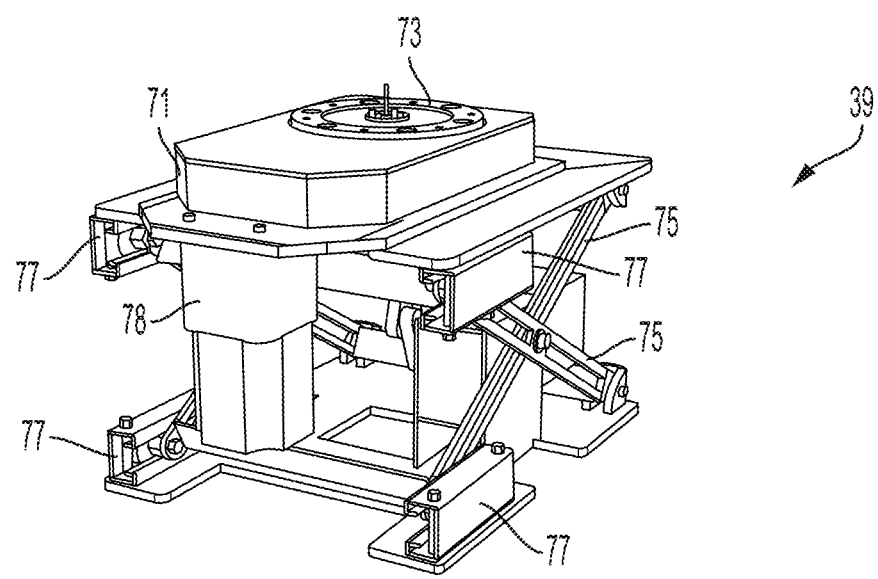
FIG. 18 shows an illustrative diagrammatic isometric second side view of the position control system of the carrier of FIG. 14.

FIGS. 17 and 18 show mutually opposing views of the position control system 39, showing the bottom plate 70, top plate 72 and scissor stabilizing arms 75 that are connected at one end to pivot mounts 76 and other respective ends to slide mounts 77. Lifting action of the top plate 72 with respect to the bottom plate 70 is accomplished by an elevation motor 74 (shown in FIG. 17) that is mounted on the bottom plate 70 and the output shaft of which is coupled to the top plate 72 via linkage arms are discussed further below with reference to FIGS. 23A and 23B. This elevation control system further includes two pairs of the scissor stabilizing arms 75 that move with the top plate 72 with respect to the bottom plate 70.

Figure 19:
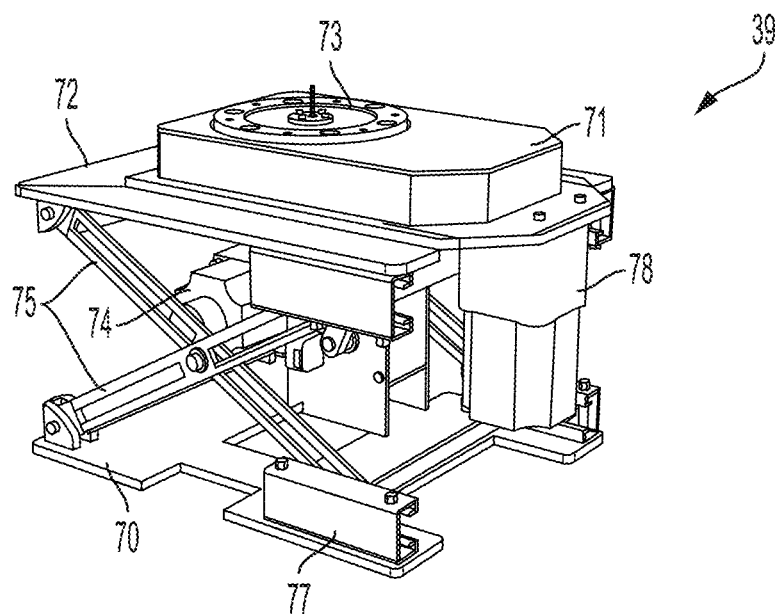
FIG. 19 shows an illustrative diagrammatic isometric third side view of the position control system of the carrier of FIG. 14.
Figure 20:
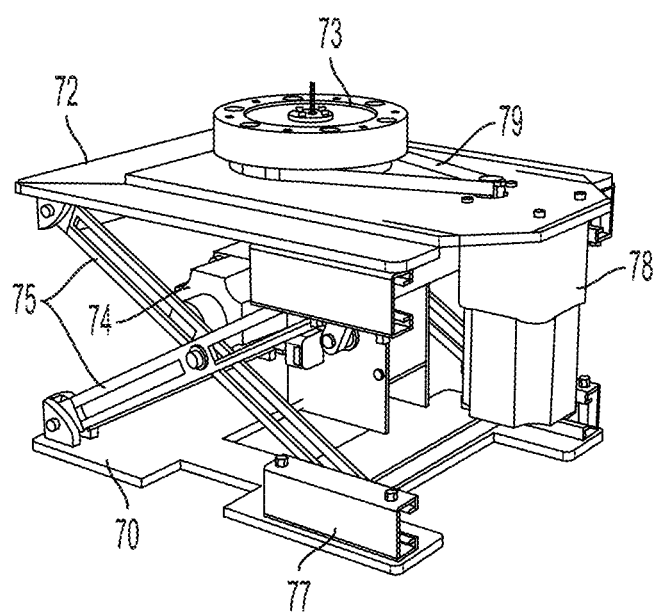
FIG. 20 shows an illustrative diagrammatic isometric third side view of the position control system of the carrier of FIG. 19 with the rotor belt housing removed.
Figure 21A:
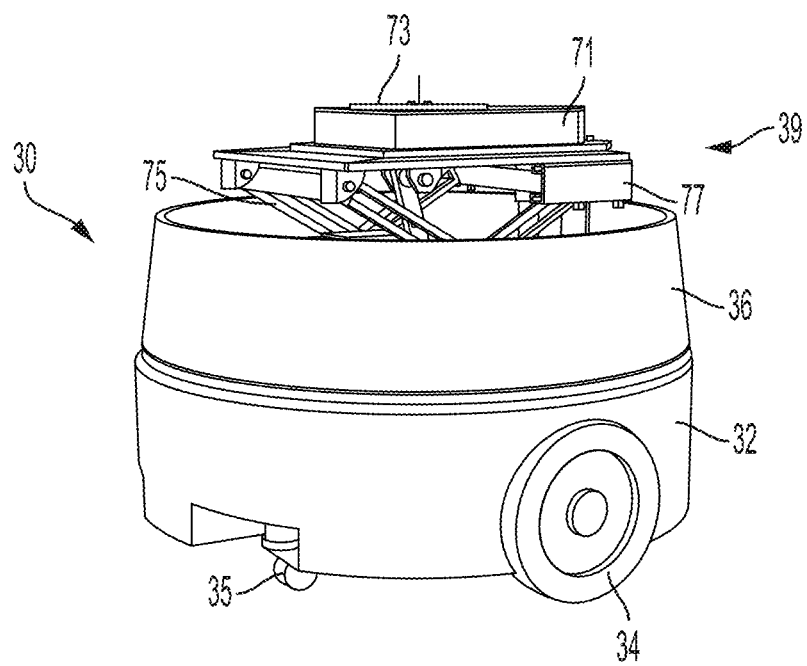
FIGS. 21A and 21B show illustrative diagrammatic views of the position control system within the carrier of FIG. 14 without the payload, showing the position control system in an elevated position (FIG. 21A) and a lowered position (FIG. 21B)
Figure 21B:
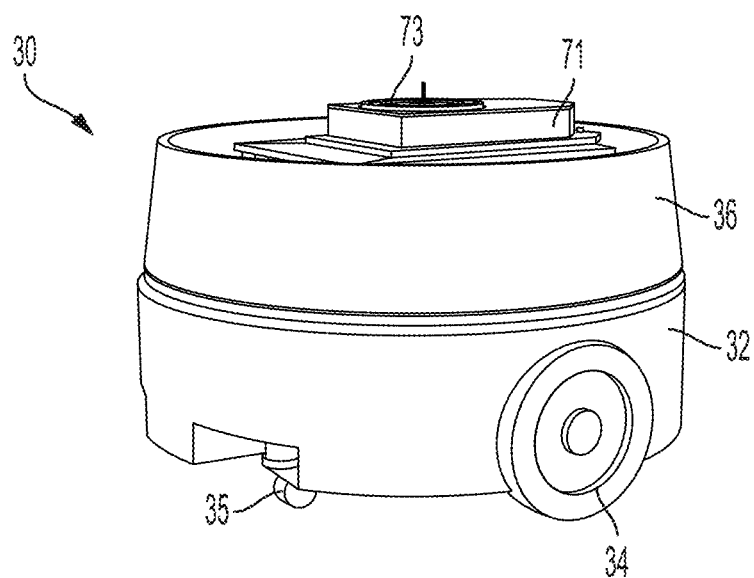
Figure 22A:
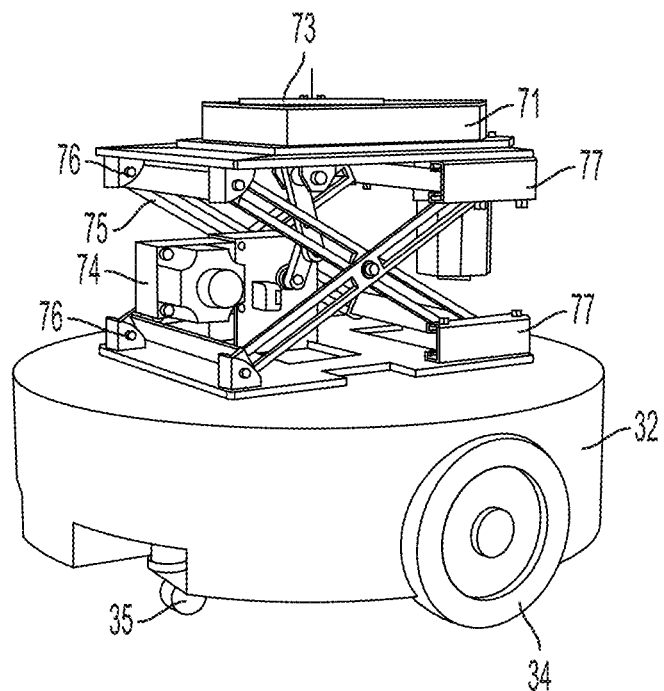
FIGS. 22A and 22B show illustrative diagrammatic views of the position control system within the carrier of FIG. 14 without the payload and without the mid-section, showing the position control system in an elevated position (FIG. 22A) and a lowered position (FIG. 22B)
Figure 22B:
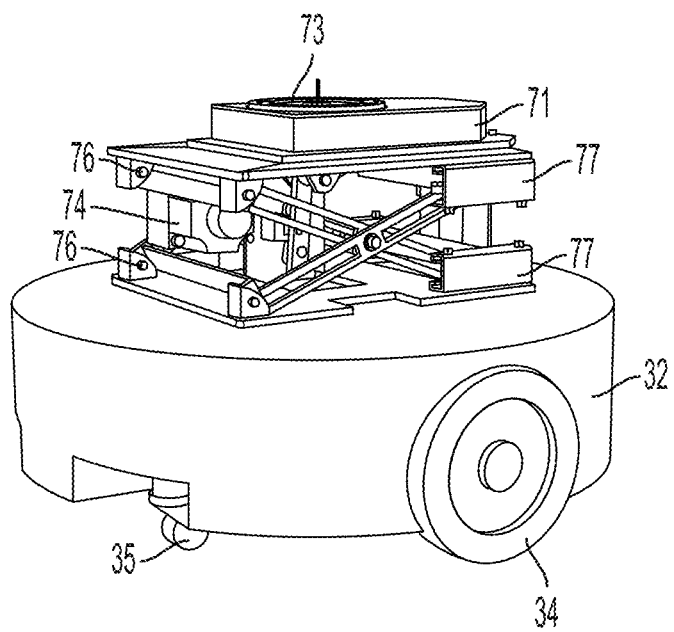

The position control system 39 also includes a rotation control system that includes a rotation motor 78 (shown in FIGS. 18, 19 and 20) that controls rotational movement of the drive rotor 73 with respect to the top plate 72. With further reference to FIGS. 19 and 20, the output shaft of the rotation motor 78 is coupled to a drive portion of the drive rotor 73 via a belt (as shown in FIG. 20 wherein the rotor belt housing 71 of FIG. 19 is removed). The elevation control system may be operated independent of the rotation control system. FIGS. 21A and 21B show the carrier 30 with the elevation system engaged to raise the top plate 72 (FIG. 21A) and engaged to lower the top plate 72 (FIG. 21). FIGS. 22A and 22B show the carrier 30 with the elevation system similarly engaged respectively with the mid-section shroud 33 removed.

Figure 23A:
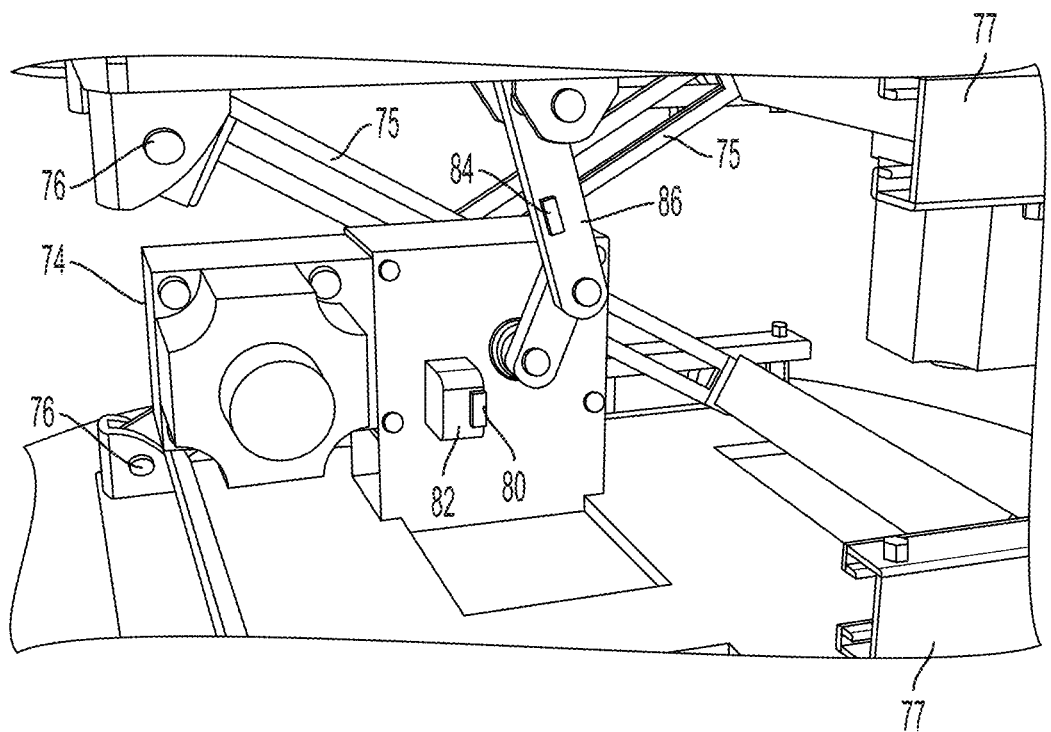
FIGS. 23A and 23B show illustrative diagrammatic views of an enlarged portion of the position control system of FIGS. 22A and 22B, showing the position control system in an elevated position (FIG. 23A) and a lowered position (FIG. 23B)
Figure 23B:
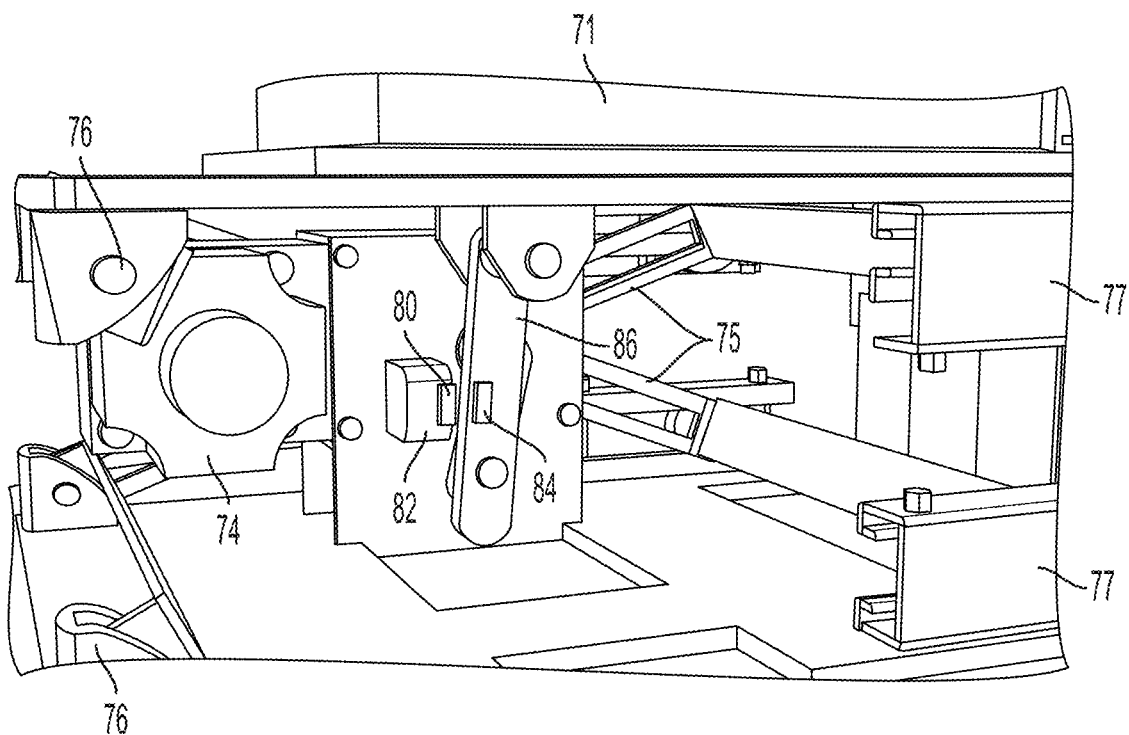

As noted above, the elevation control system includes linkage arms 86, 88 as shown in FIGS. 23A and 23B, and the linkage arms are drive by an output shaft of the elevation motor 74 to either lift the top plate with respect to the bottom plate (as shown in FIG. 22A), or to lower the top plate toward the bottom plate (as shown in FIG. 22B). In particular, as the rotor shaft rotates in a first direction, the linkage arms extend (as shown in FIG. 23A), driving the top plate upwards. Rotation in the opposite direction permits the linkage arms to return to the lower portion (shown in FIG. 23B) in which a linkage arm 86 is adjacent a fixed mount element 82. One portion 80 of a sensor system (e.g., a Hall effect sensor) may be mounted on the fixed mount element 82, and a second portion 84 of the sensor system (e.g., a magnet) may be mounted on a linkage arm (e.g., 86). When the linkage arm is moved to be near the fixed mount 82, the sensor system will detect that the presence of the portion 84 being near the portion 80, indicating that the top plate is in the lowered position.

Figure 24A:
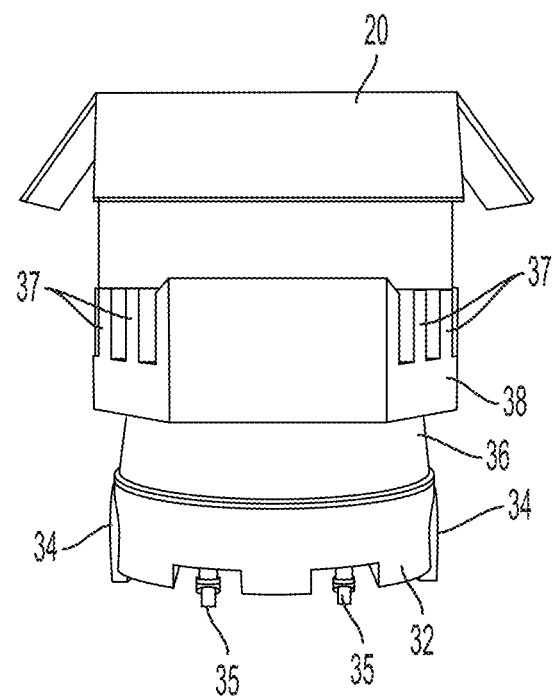
FIGS. 24A and 24B show illustrative diagrammatic views of the carrier of FIG. 14 with the payload and an object thereon in a first rotational position (FIG. 24A) and a second rotational position (FIG. 24B)
Figure 24B:
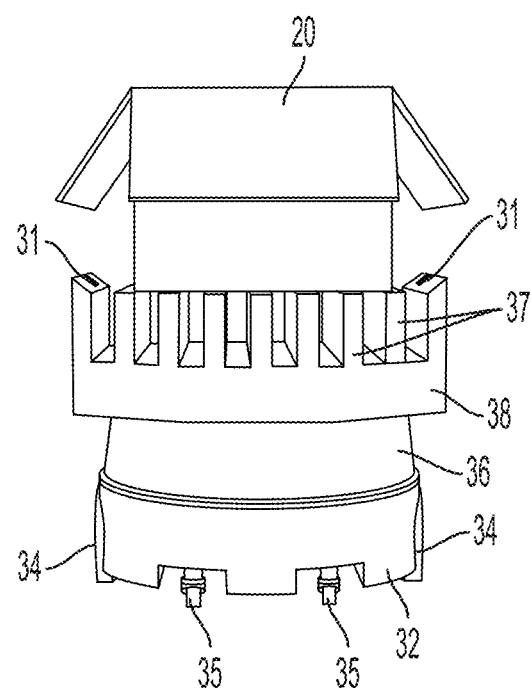
Figure 25:
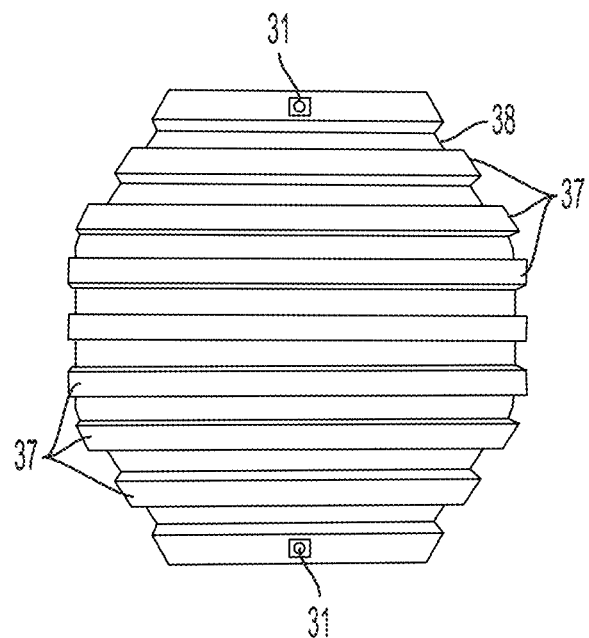
FIG. 25 shows an illustrative diagrammatic top view of the automated mobile carrier of FIG. 14.

FIG. 24A shows the carrier 30 including the payload 38 and container 20 on one rotational position, and FIG. 24B shows the carrier 30 with the payload 38 and container 20 in a rotated position (90 degrees) using the rotational system. FIG. 25 shows a top view of the payload 38 with the support ridges 37 and the perception units 31, and FIG. 26 shows a bottom view of the base 32 of the carrier 30 showing the dive wheels 34, casters 35 and the perception unit 29 discussed above.

In addition to the nominal modes of operation, the systems of the invention are designed with consideration for the following exceptions. Picking orders that contain SKUs that are not amenable to automated handling, e.g. violate the weight and dimension criteria, are routed to manual picks for manual processing. Inside the manual picks station, a team member transfers the desired number of eaches from an inventory container to an outbound container. Any VCPs that are incompatible with carrier transport, e.g. violate the weight and dimension criteria, bypass the track system. A container that is detected to be out of place, unexpectedly empty, or prematurely full is automatically flagged as an exception. When such an exception occurs, the work management system is notified of the fault and the container can be routed to an in-feed station for special processing.

During use, containers may be introduced into the system at the input conveyance system, and when emptied, these containers may then be assigned output designations and use as output containers. Empty containers may be introduced into the system or removed from the system as needed to maintain a ready and reasonable supply of available containers. In accordance with further aspects, the system may employ input totes and output boxes, each of which may be moved by the carriers and support structures discussed above. Maintenance of static system components can occur while the system is online-without impeding operation by assigning orders to other stations. This is true for both the manual and the automated processing stations. A carrier can be serviced without impacting system operation by commanding it to move to a location at the periphery of the system, where it is accessible to maintenance personnel. If a carrier encounters a fault that renders it inoperable, the system maintains degraded operation by routing other carriers around the disabled carrier until maintenance personnel extract the carrier for service. Automated scanning is expected to be used for IVC and OBC induction. VCP induction is expected to require a manual scanning step by a team member, since vendor labels are not consistently located on VCPs.

Control of each of the systems discussed above may be provided by the one or more computer processing systems 100 that are in communication, e.g., wirelessly, with the programmable motion devices, the carriers, and other equipment. The computer systems also contain the knowledge (continuously updated) of the location and identity of each of the storage bins, and contains the knowledge (also continuously updated) of the location and identity of each of the destination bins. The system therefore, directs the movement of the storage bins and the destination bins, and retrieves objects from the storage bins, and distributes the objects to the destination bins in accordance with an overall manifest that dictates which objects must be provided in which destination boxes for shipment, for example, to distribution or retail locations. In the systems in accordance with various aspects of the present invention, throughput and storage may scale independently, and all inventory SKUs may reach all outbound containers. The systems are robust to failures due to redundancy, and inventory totes (storage bins) and outbound boxes (destination bins) may be handled interchangeably.

Figure 27:
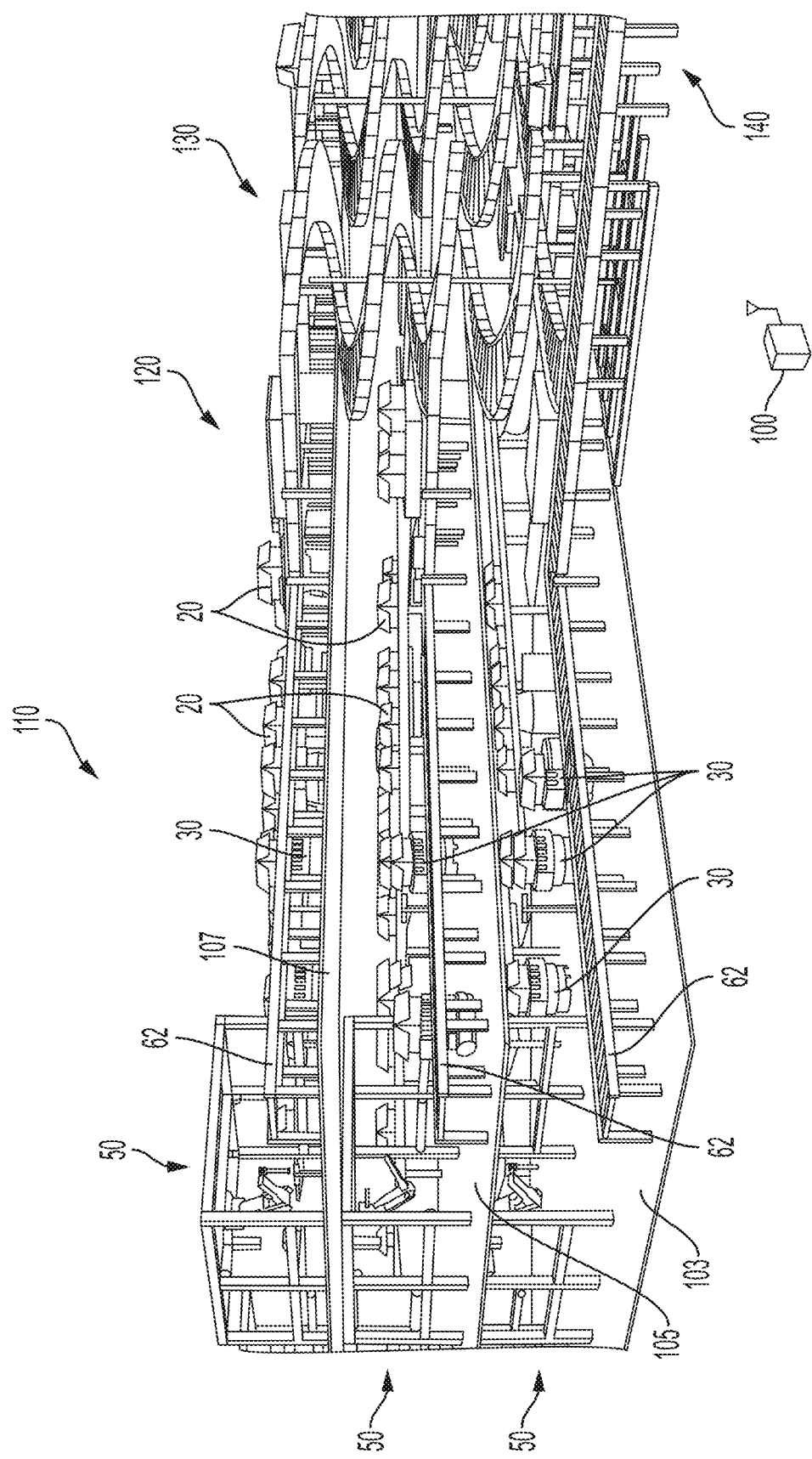
FIG. 27 shows an illustrative diagrammatic isometric side view an object processing system in accordance with a further aspect of the present invention.
Figure 28:
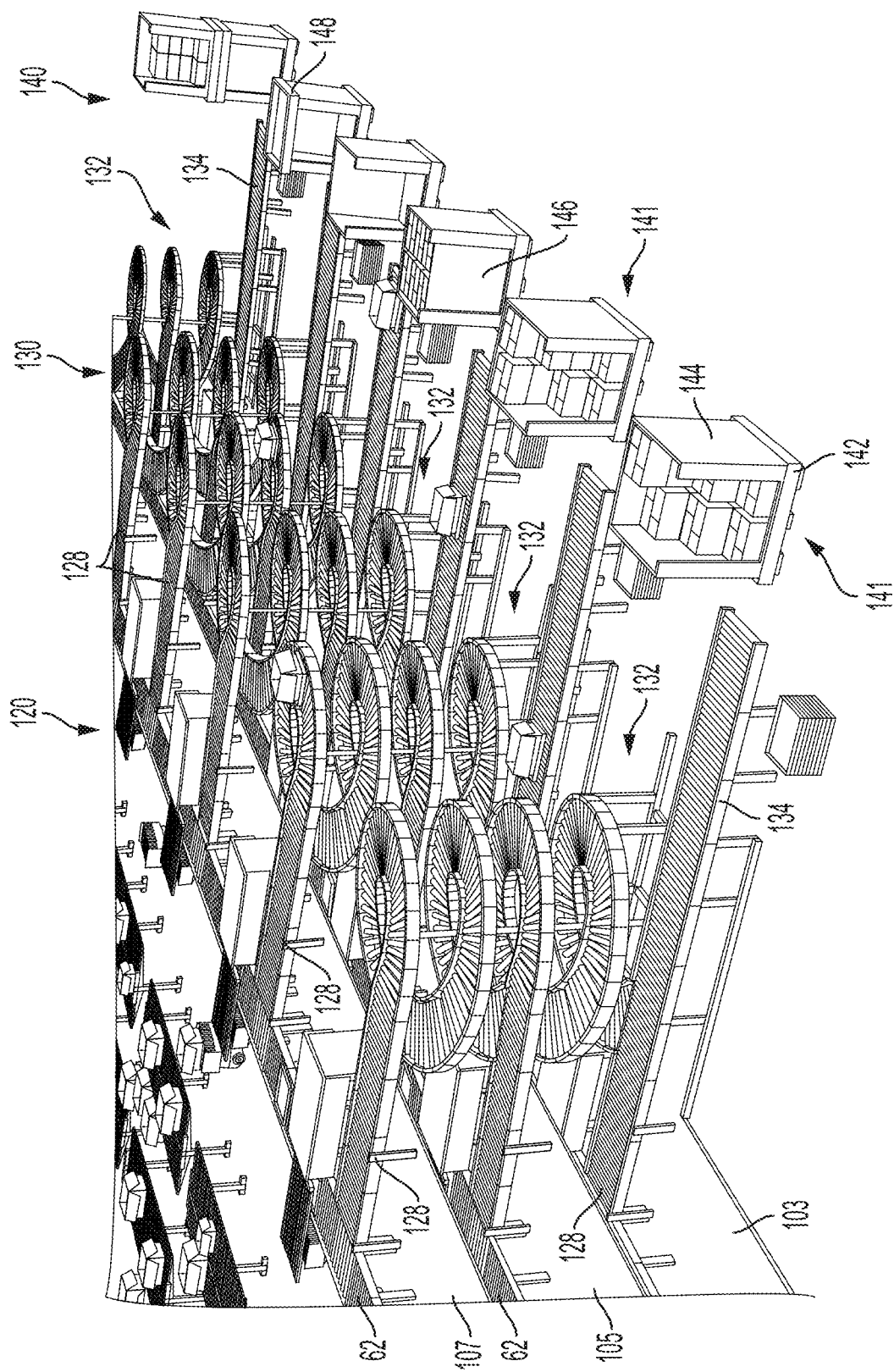
FIG. 28 shows an illustrative diagrammatic isometric enlarged view of a portion of the system of FIG. 27, showing the vertical output sections and an output sequencing system that includes packed shipping containers loaded into shipping vessels.

In accordance with further aspects, the invention provides a system 110 that includes multiple levels 103, 105, 107 of processing systems that each include an input conveyance system 12, automated mobile carriers 30, terminated support structures 22 at input stations 16, intermediated shelf locations 40, and output stations 60 as discussed above as shown in FIG. 27. Further, the system 110 includes an output conveyance system 62 on each level that is coupled to a plurality of container support insertion stations 120, as well as a vertical output section 130 that includes a plurality of vertical conveyors 132 such as helical conveyors, and an output sequencing system 140 as shown in FIG. 28, leading to any of a plurality of types of output sequencing systems 140, 140', 140", 140'" as discussed below. Each of the tray insertion sections 120 provides a completed container 20 on a container support 21 on a conveyor section 128 that travels toward a vertical merging conveyor 132. Each vertical conveyor 132 feeds a vertical output section conveyor 134, where completed containers are provided on supports 21 in a desired order for packing. For example, objects in containers may be provided for packaging (e.g., by human personnel) into shipping vessels 141. The object are scheduled to arrive at specific conveyor sections 134 in a specific order to, for example, facilitate providing organized sets of objects at local sections or further facilities such as aisles or shelves of a storage facility or retail store for more efficient processing such as stocking. Other output systems are discussed below.

Figure 29A:
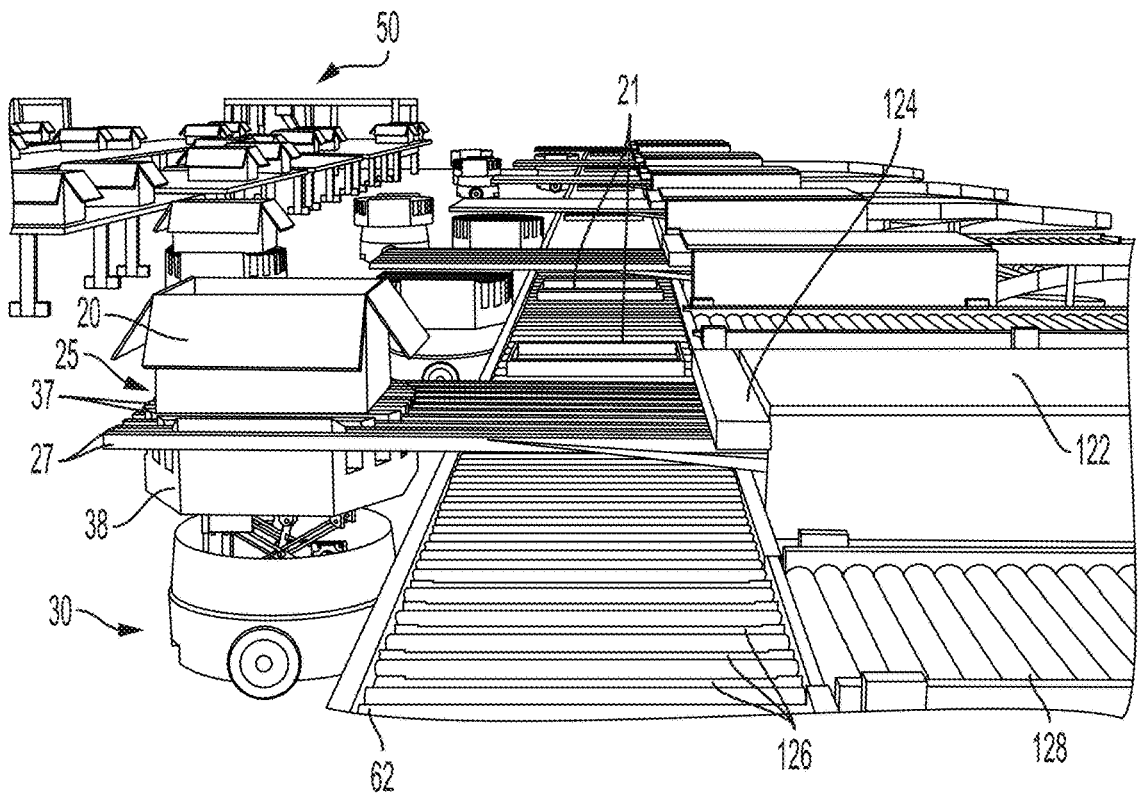
FIGS. 29A-29D show illustrative diagrammatic enlarged views of a shipping container being loaded onto a support tray, showing the shipping container being loaded onto a tongue extension (FIG. 29A), showing the tongue extension partially retracted with the shipping container being over the support tray (FIG. 29B), showing the tongue extension fully retracted dropping the shipping container onto the support tray (FIG. 29C), and showing moving the shipping container and support tray combination away for further processing (FIG. 29D)
Figure 29B:
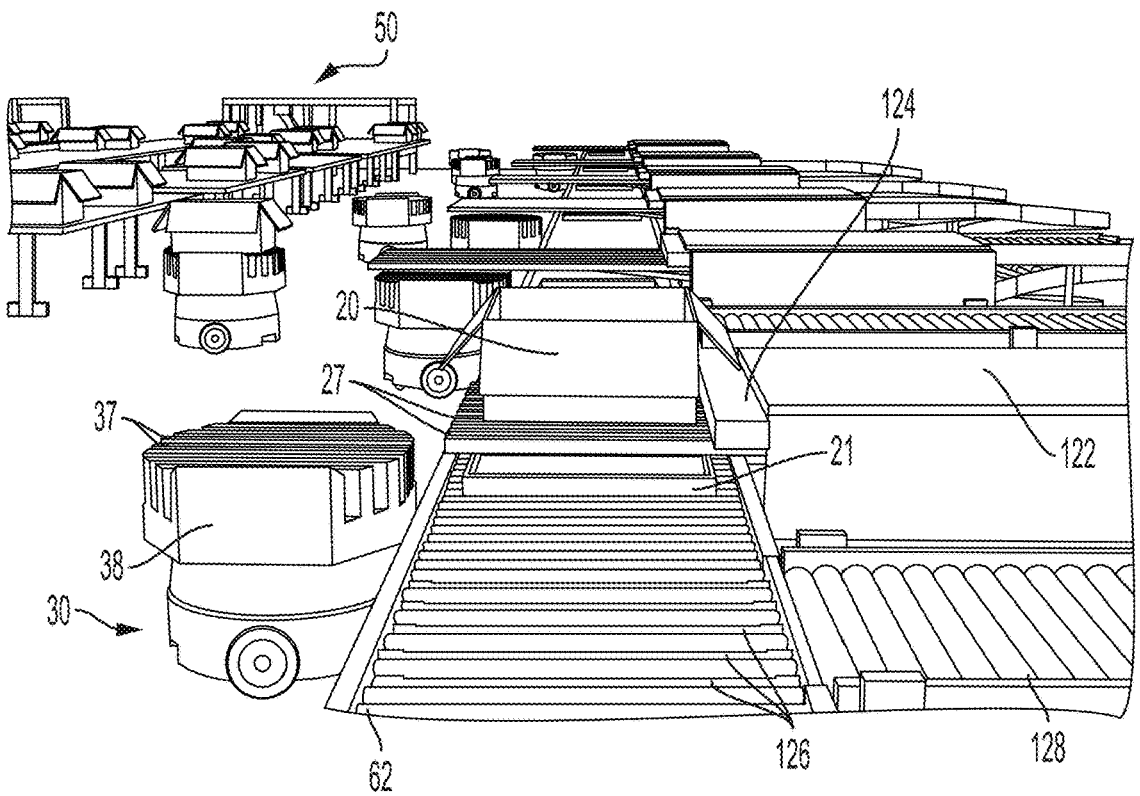
Figure 29C:
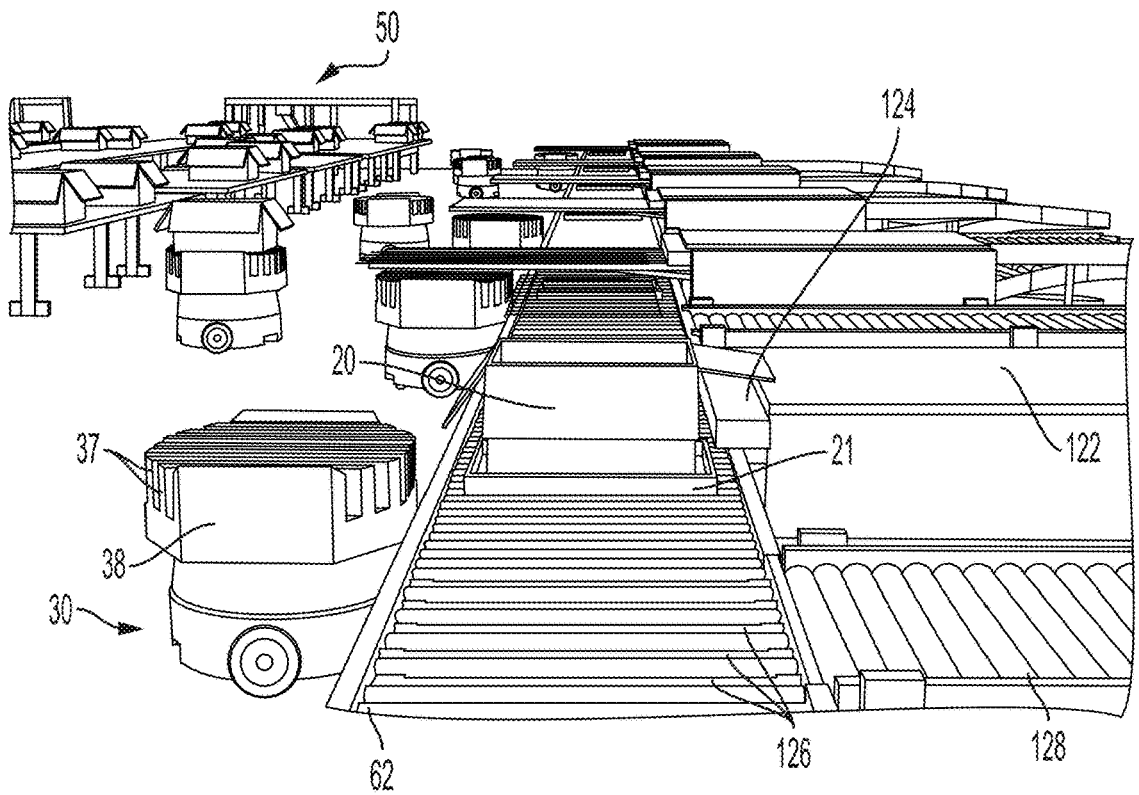
Figure 29D:
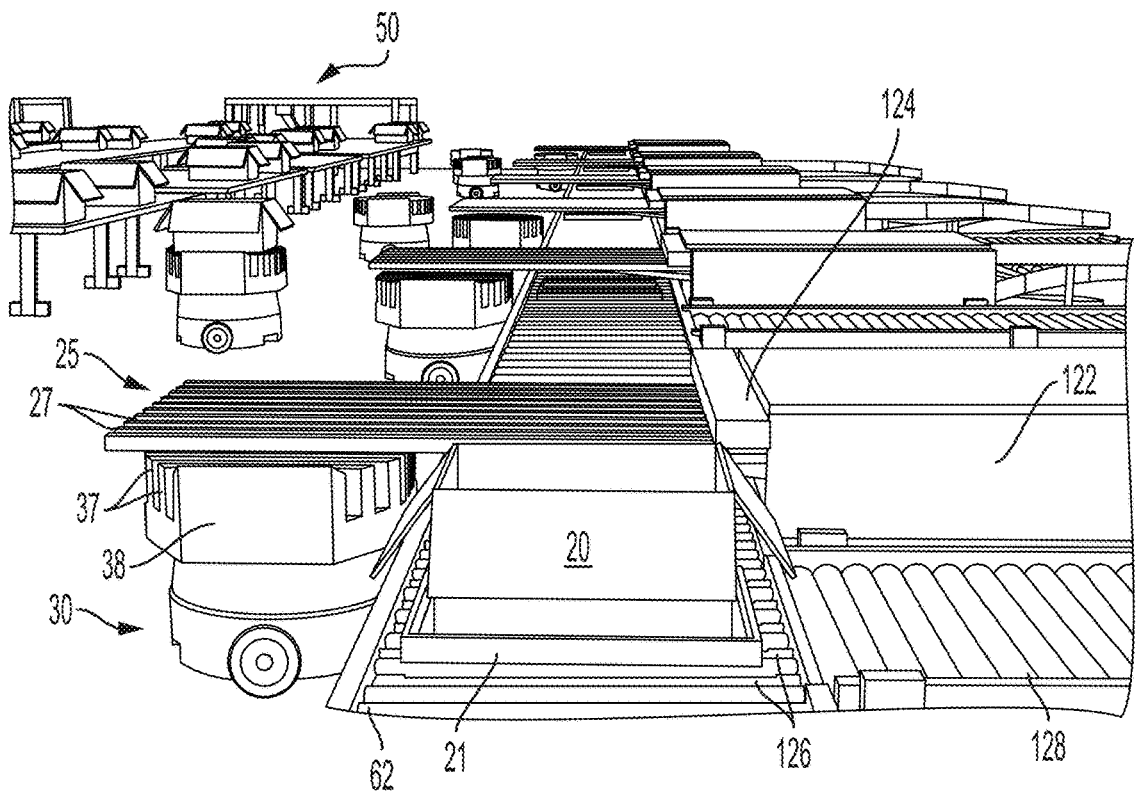

With reference to FIGS. 29A-29D, a completed container 20 on a payload 38 of automated mobile carrier 30 is loaded onto a terminated support structure 25 of the output conveyor 62. Similar to the systems discussed above, the completed container 20 is lifted on the plurality of support ridges 37 of the payload 38 (by raising the payload 38) such that the support ridges 37 pass through the plurality of protrusions 27 of the terminated support structure 25 as shown in FIG. 29A. The payload is then lowered, and the terminated support structure 25 is then withdrawn into the terminated support structure control system 122 such that a support 21 passes along the output conveyor 62 under the completed container 20. At that time (as shown in FIG. 29B), the terminated support structure 25 is then fully withdrawn (as shown in FIG. 29C), dropping the completed container onto the support 21 (as shown in FIG. 29D). The combined completed container 20 and support 21 may then be directed via a bi-directional conveyor section that includes cross-direction belts 126 toward a desired conveyor section 128.

Figure 30:
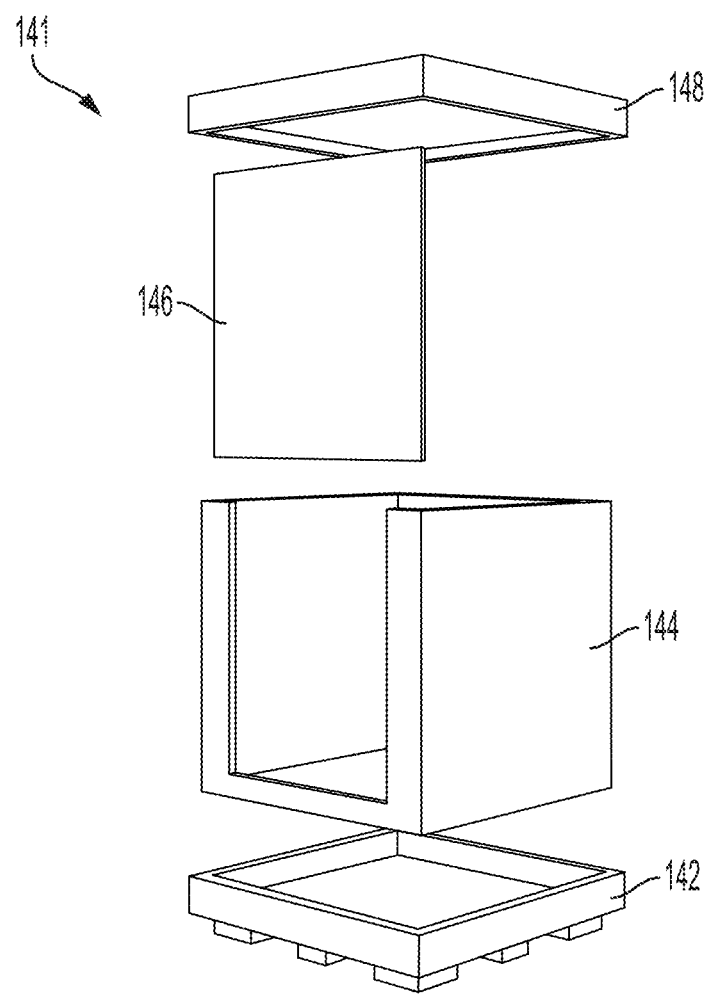
FIG. 30 shows an illustrative diagrammatic exploded view of a shipping vessel of FIG. 27.
Figure 31:
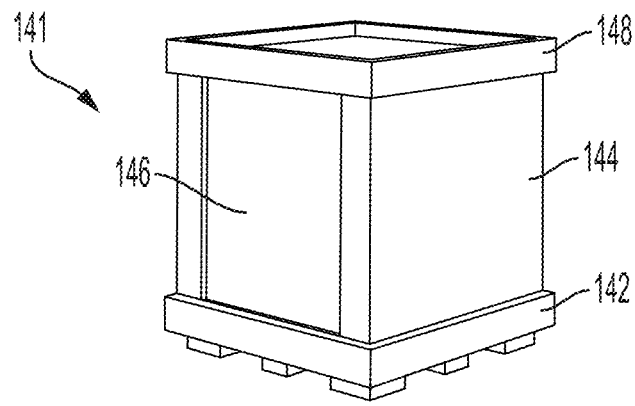
FIG. 31 shows an illustrative diagrammatic view of the shipping vessel of FIG. 30 assembled.
Figure 32:
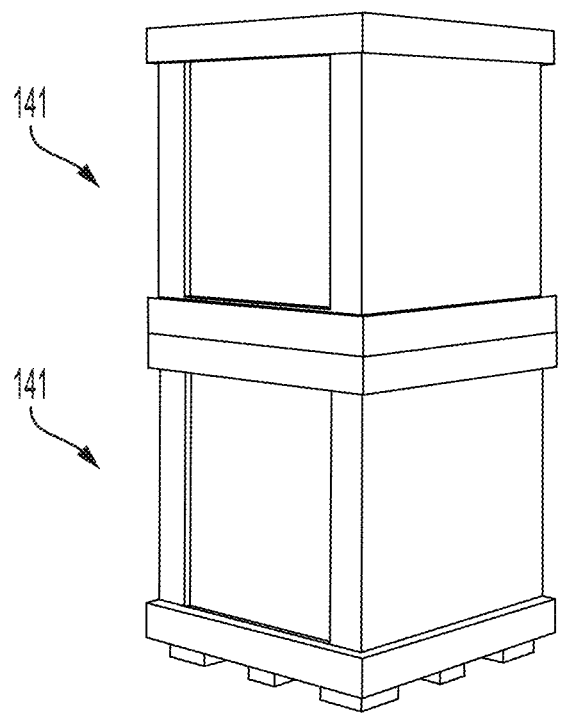
FIG. 32 shows an illustrative diagrammatic view of two shipping vessels of FIG. 30 stacked one on the other for shipment.

As discussed above, the completed containers may be provided in shipping vessels 141, and each shipping vessel 141 includes a pallet contoured bottom 142, a wall section 144 with an opening, a wall insert 146, and a top 148 as shown in FIG. 30. When combined, the vessel 141 may contain containers 20 (or objects as discussed below) within the container in a secured closed condition as shown in FIG. 31. As further shown in FIG. 32, the top 148 is adapted to receive a pallet contoured bottom 142 such that completed vessels 141 may be stacked as shown in FIG. 32.

Figure 33:
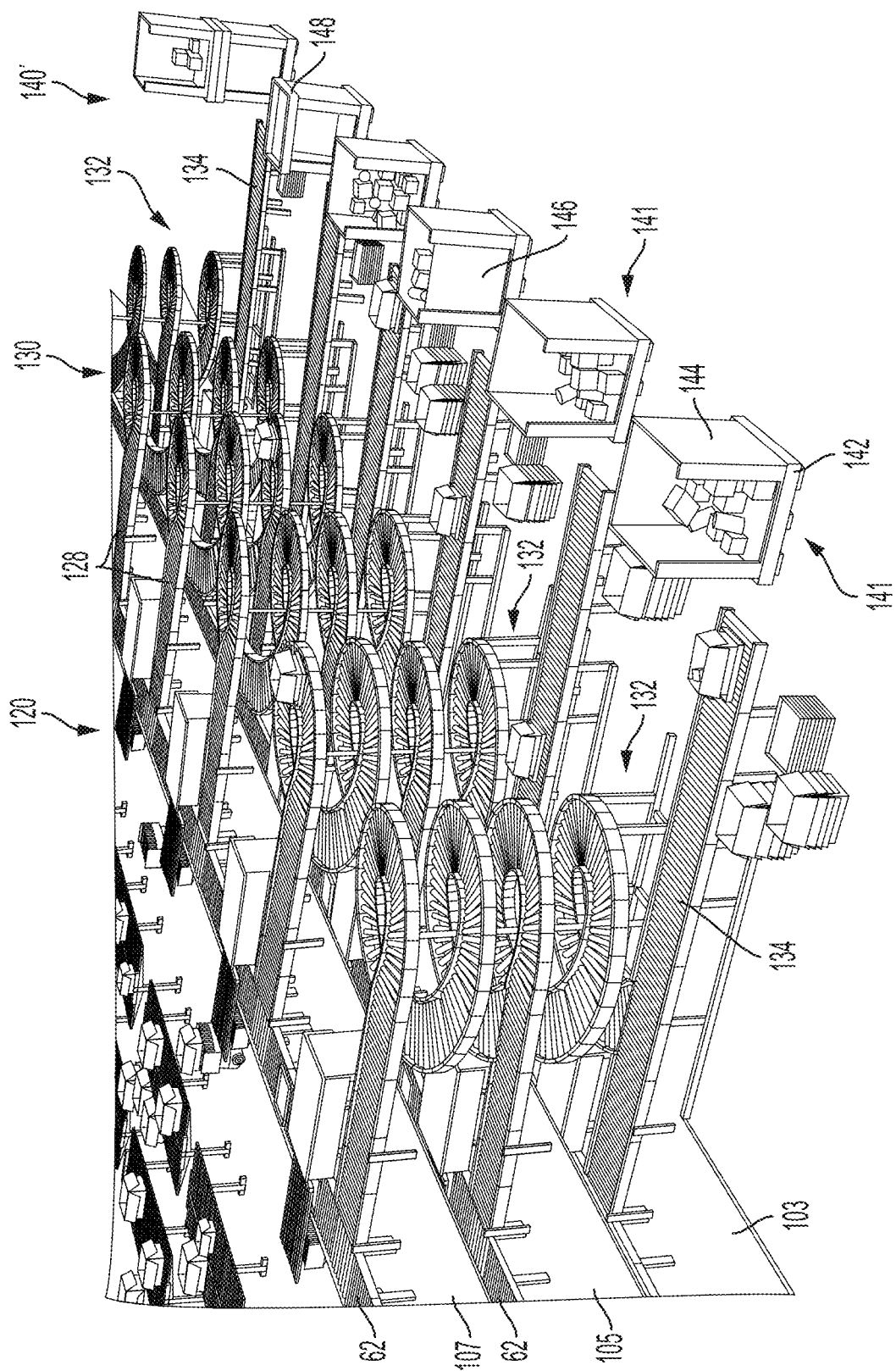
FIG. 33 shows an illustrative diagrammatic isometric enlarged view of a portion of the system of FIG. 27, showing the vertical output sections and an output sequencing system that includes objects loaded into shipping vessels.

In accordance with further aspects, the system includes an output conveyance system 62 on each level that is coupled to a plurality of container support insertion stations 120, as well as a vertical output section 130 that includes a plurality of vertical conveyors 132 such as helical conveyors, and an output sequencing system 140' as shown in FIG. 33. Again, each of the tray insertion sections 120 provides a completed container 20 on a container support 21 on a conveyor section 128 that travels toward a vertical merging conveyor 132. Each vertical merging conveyor 132 feeds a vertical output section conveyor 134, where completed containers are provided on supports 21 in a desired order for packing. For example, objects in containers may be unloaded from the containers 20 (e.g., by human personnel) and loaded into shipping vessels 141. The containers 20 (as well as the supports 21) may be stacked nearby. The objects are scheduled to arrive at specific conveyor sections 134 in a specific order to, for example, facilitate providing organized sets of objects at local sections or further facilities such as aisles or shelves of a storage facility or retail store for more efficient processing such as stocking. Similar to the system discussed above, the system includes an output conveyance system 62 on each level that is coupled to a plurality of container support insertion stations 120, as well as a vertical output section 130 that includes a plurality of vertical conveyors 132 such as helical conveyors as shown in FIG. 33. Again, each of the tray insertion sections 120 provides a completed container 20 on a container support 21 on a conveyor section 128 that travels toward a vertical conveyor 132. Each vertical merging conveyor 132 feeds a vertical output section conveyor 134, where completed containers are provided on supports 21 in a desired order for packing at conveyor sections 134.

Figure 34:
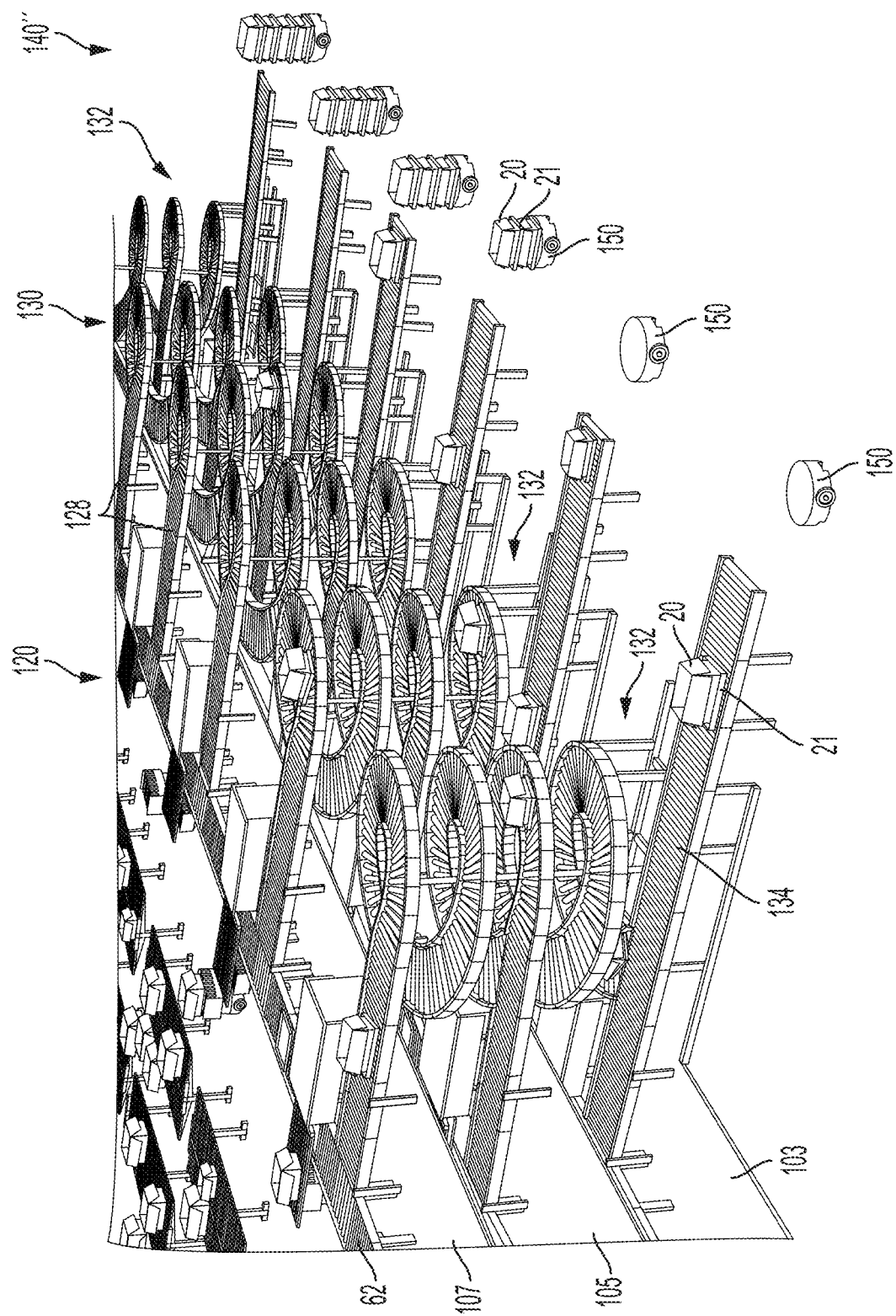
FIG. 34 shows an illustrative diagrammatic isometric enlarged view of a portion of the system of FIG. 27, showing the vertical output sections and an output sequencing system that includes packed boxes loaded by human personnel onto automated mobile carriers.

In accordance with further aspects and with reference to FIG. 34, completed containers may be provided (again in a sequenced order) at conveyor sections 128 for loading onto further automated carriers 150. The completed containers 20, for example, may be stacked with supports 21 in groups for delivery to a further processing location in a desired arrangement. For example, each container may be associated with a different shelf, where the set of containers are all associated with the same aisle region of a storage facility or retail store. Again, the system includes an output conveyance system 62 on each level that is coupled to a plurality of container support insertion stations 120, as well as a vertical output section 130 that includes a plurality of vertical merging conveyors 132 such as helical conveyors, and an output sequencing system 140" as shown in FIG. 34.

Figure 35:
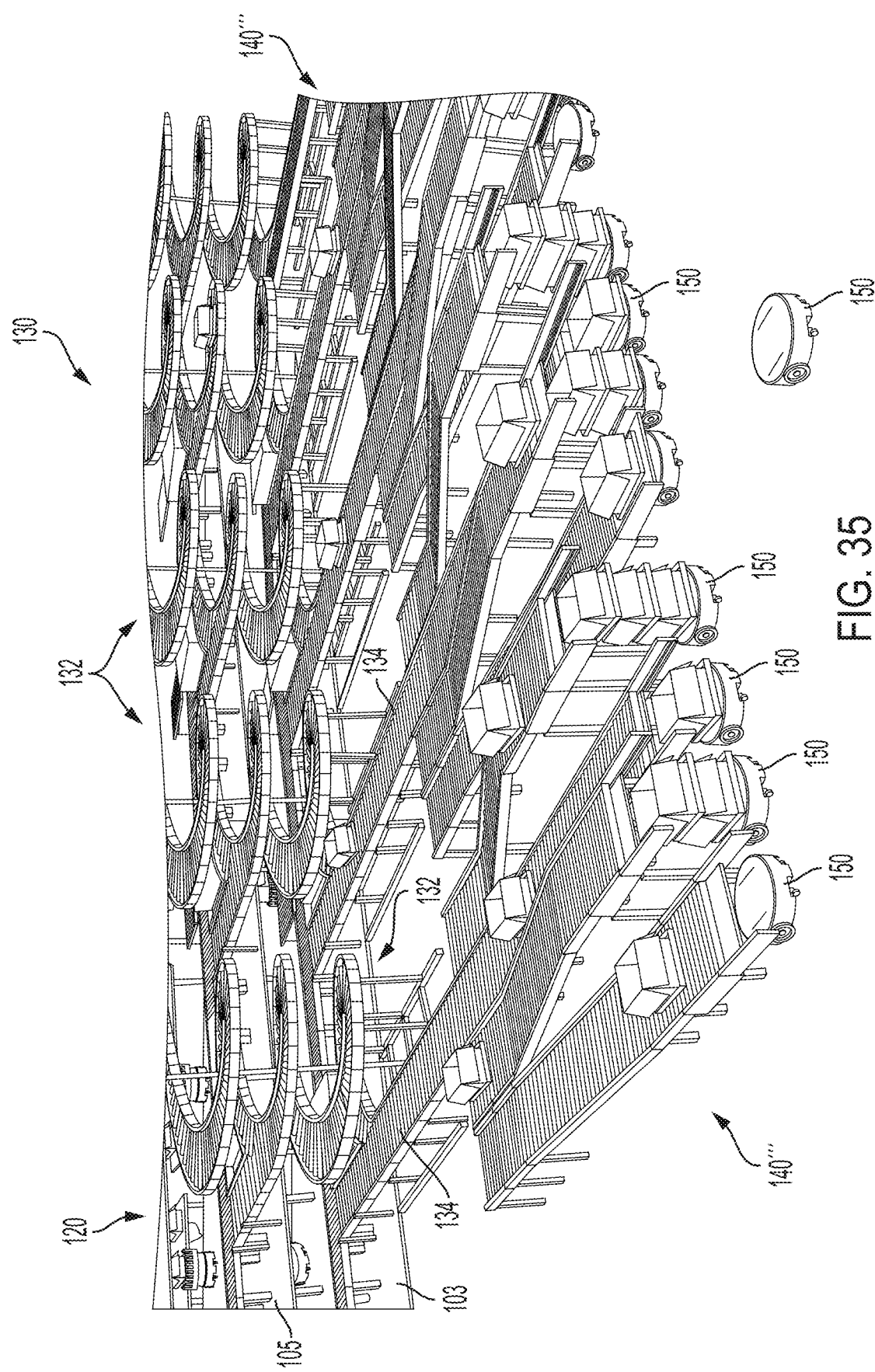
FIG. 35 shows an illustrative diagrammatic isometric enlarged view of a portion of the system of FIG. 27, showing the vertical output sections and an output sequencing system that includes packed boxes automatically loaded onto automated mobile carriers via a multi-level stacking system.

With reference to FIGS. 35-39, completed containers may be provided (again in a sequenced order) at conveyor sections 128 for automated loading onto further automated carriers 150. Again, the completed containers 20, for example, may be stacked with supports 21 in groups for delivery to a further processing location in a desired arrangement. For example, each container may be associated with a different shelf, where the set of containers are all associated with the same aisle region of a storage facility or retail store. Again, the system includes an output conveyance system 62 on each level that is coupled to a plurality of container support insertion stations 120, as well as a vertical output section 130 that includes a plurality of vertical merging conveyors 132 such as helical conveyors as shown in FIG. 35.

Figure 36:
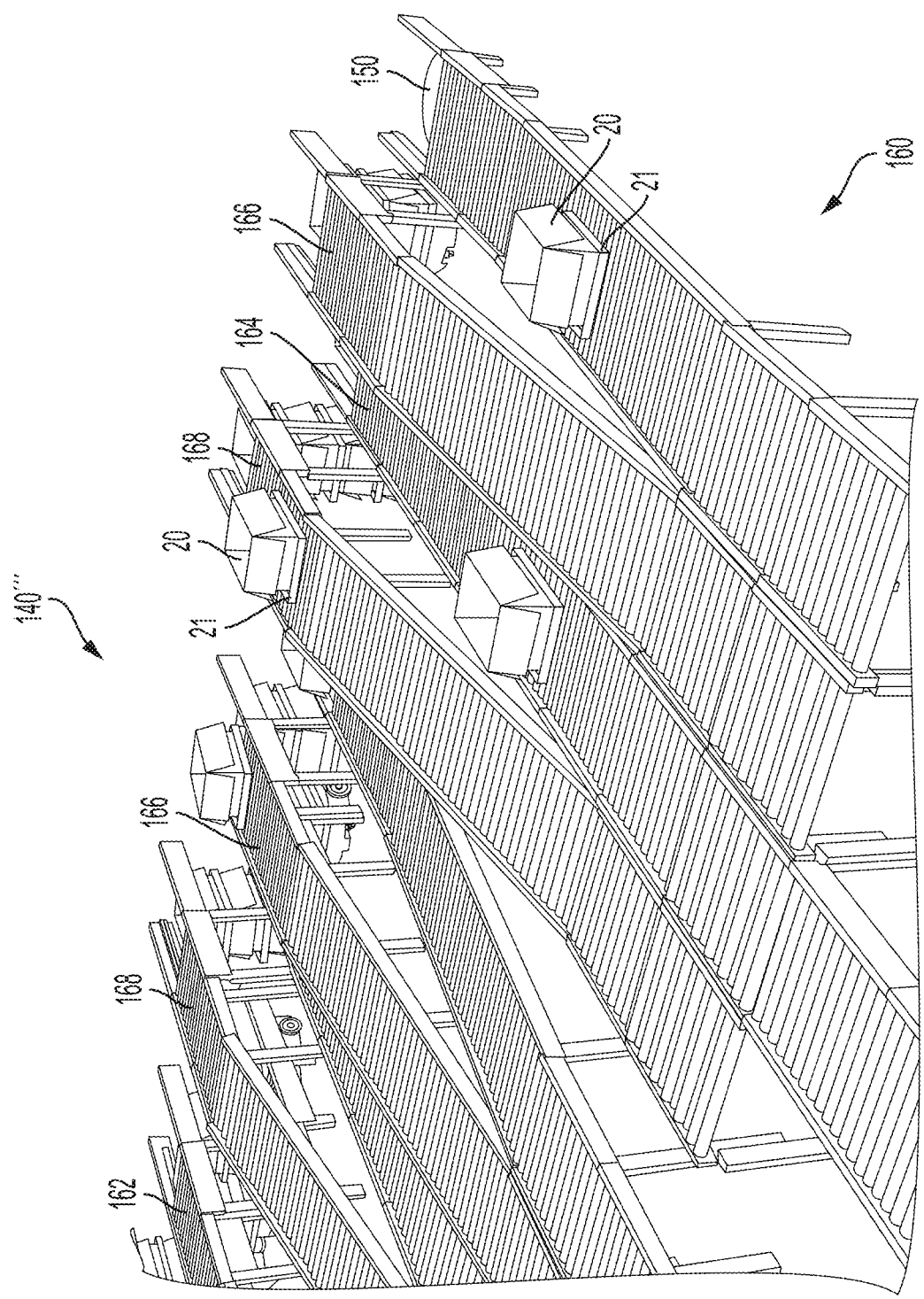
FIG. 36 shows an illustrative diagrammatic rear isometric view of the multi-level stacking system of FIG. 35.

With further reference to FIG. 36, the system may further automatically stack completed containers. The system includes an output conveyance system 62 on each level that is coupled to a plurality of container support insertion stations 120, as well as a vertical output section 130 that includes a plurality of vertical conveyors 132 such as helical conveyors, and an output sequencing system 140''' as shown in FIG. 36. Again, each of the tray insertion sections 120 provides a completed container 20 on a container support 21 on a conveyor section 128 that travels toward a vertical merging conveyor 132. Each vertical merging conveyor 132 feeds a vertical output section conveyor 134, where completed containers are provided on supports 21 in a desired order for packing. In the system of FIGS. 36-39, completed containers may be loaded onto further automated carriers 150 in a desired sequence for delivery to specific locations.

Figure 39:
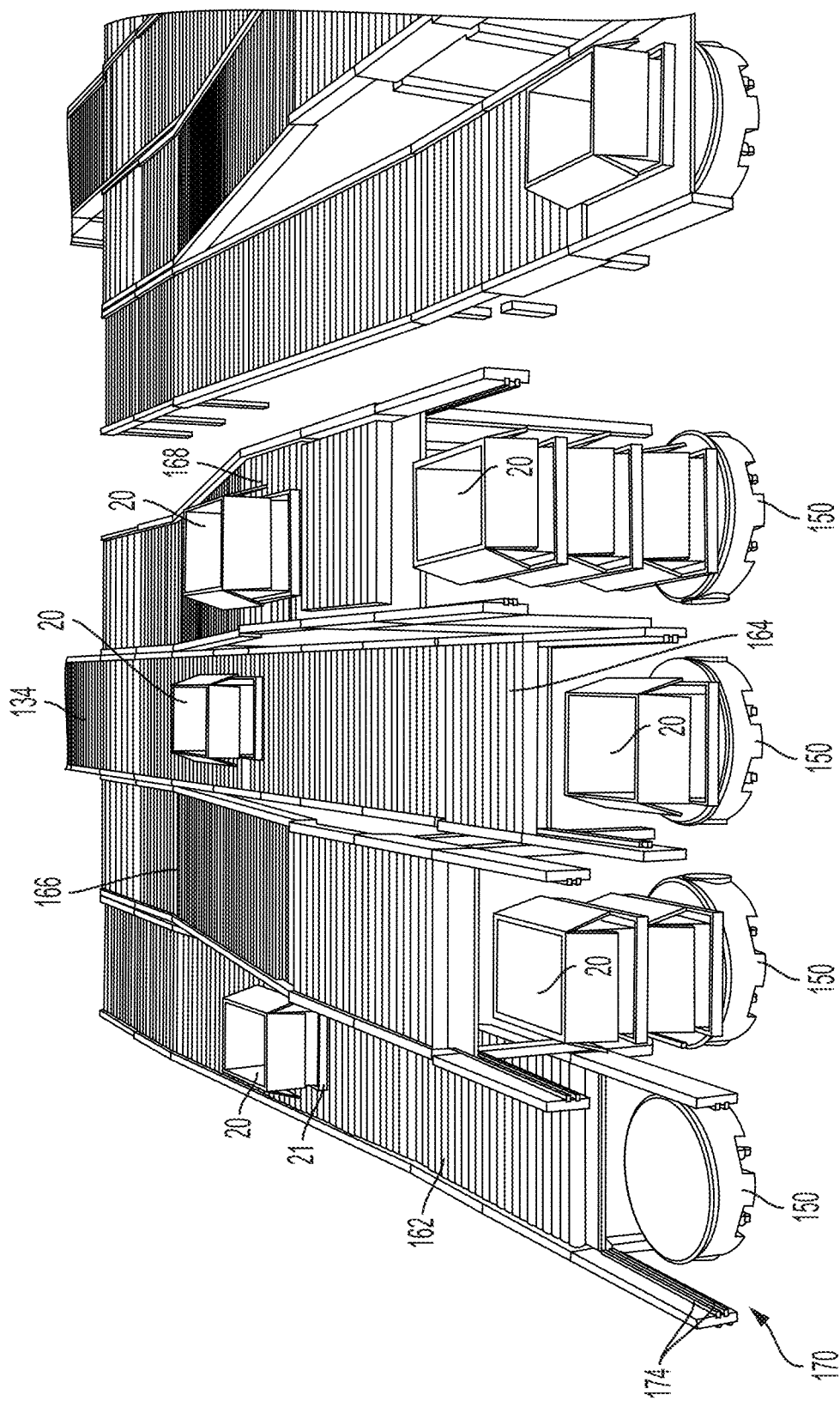
FIG. 39 shows an illustrative diagrammatic front view of the multi-level stacking system of FIG. 35.

In particular, each vertical output conveyor section 134 leads to a multi-level stacking system 160 that includes a lowest level conveyor 162, a first mid-level conveyor 164, a second higher mid-level conveyor 166 and a highest level conveyor 168 as shown in FIGS. 36 and 39. The system may sequence delivery of the completed containers such that not only is a set (of e.g., four) destined for a localized distribution location (such as an aisle and/or shelf area of a storage facility or retail store), but the order of the stacking is further provided to facilitate distribution of the objects, for example, by providing the upper containers for delivery to upper shelves, while providing the lower containers for delivery to lower shelves.

Figure 37A:
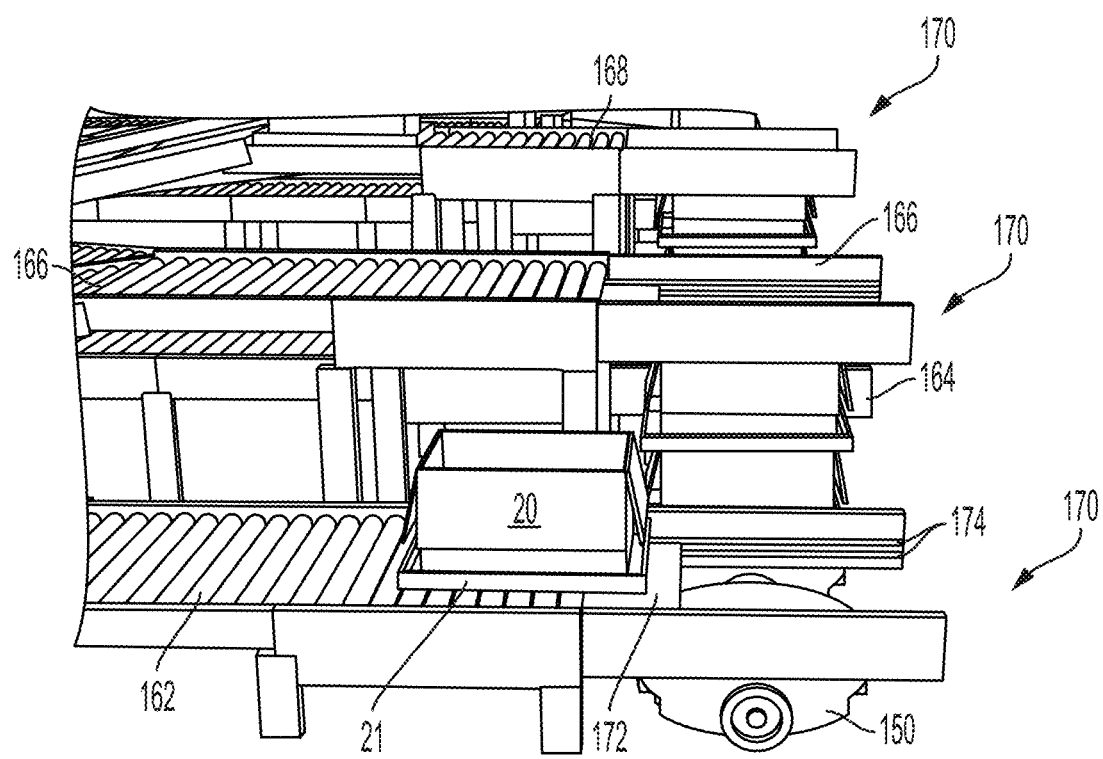
FIGS. 37A-37D show illustrative diagrammatic side views of an enlarged portion of the multi-level stacking system of FIG. 36, showing a shipping container approaching the carrier (FIG. 37A), showing the shipping container being deposited onto a tongue element (FIG. 37B), showing the shipping container moving on the tongue element over a carrier (FIG. 37C), and showing the tongue element retracted and the shipping container deposited onto the carrier (FIG. 37D)
Figure 37B:
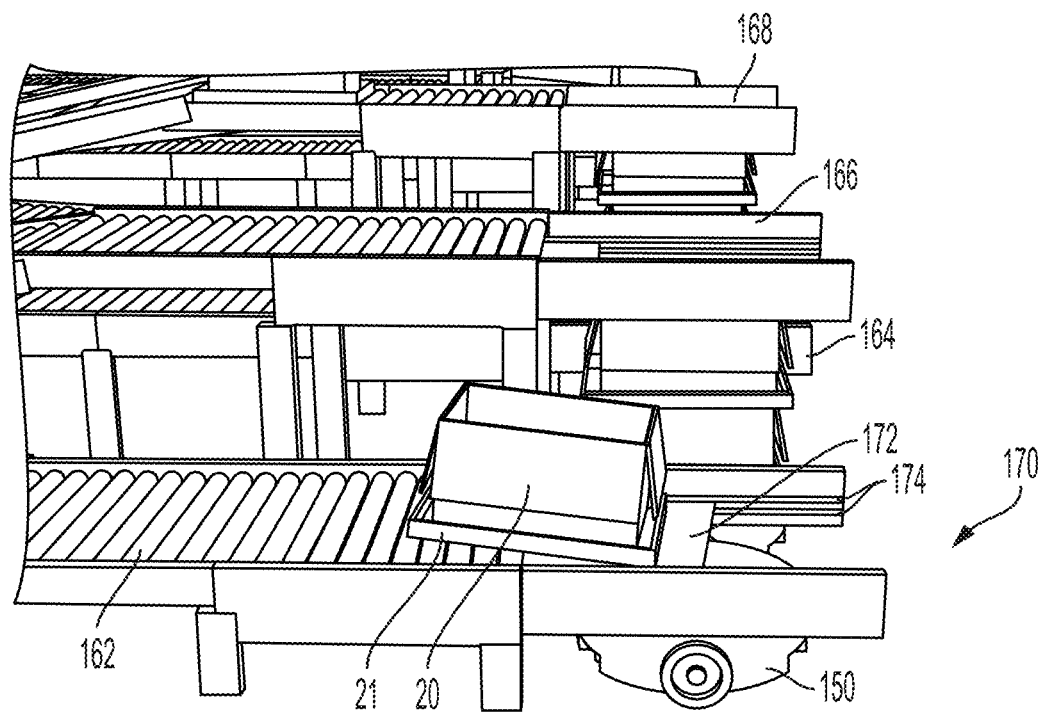
Figure 37C:
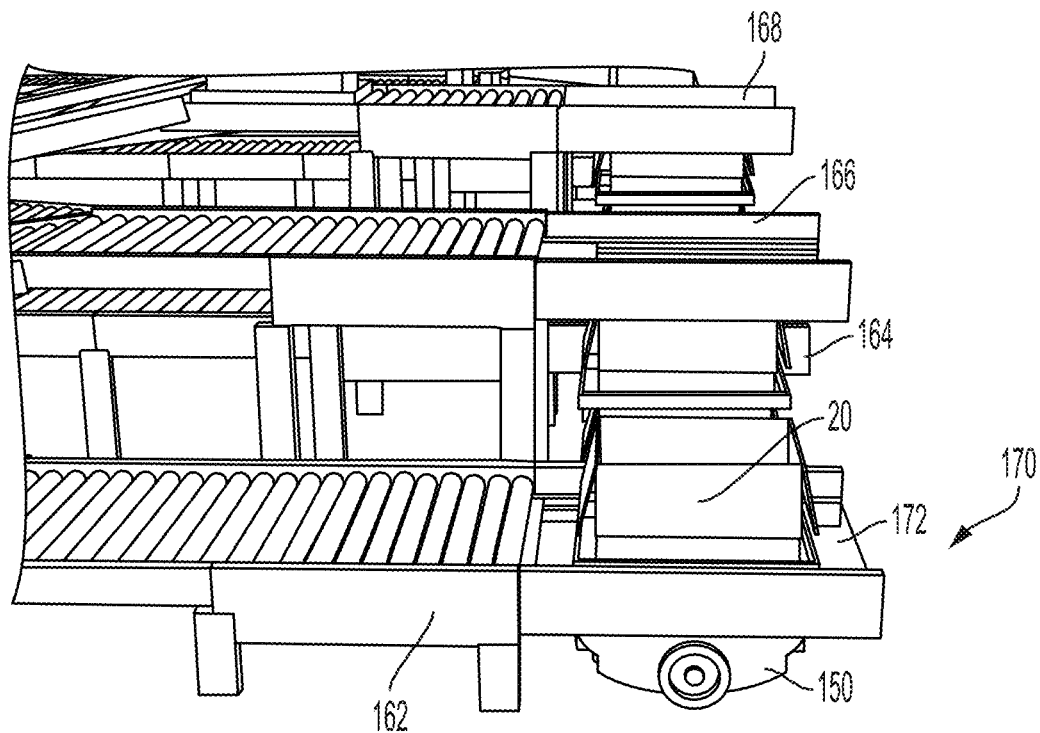
Figure 37D:
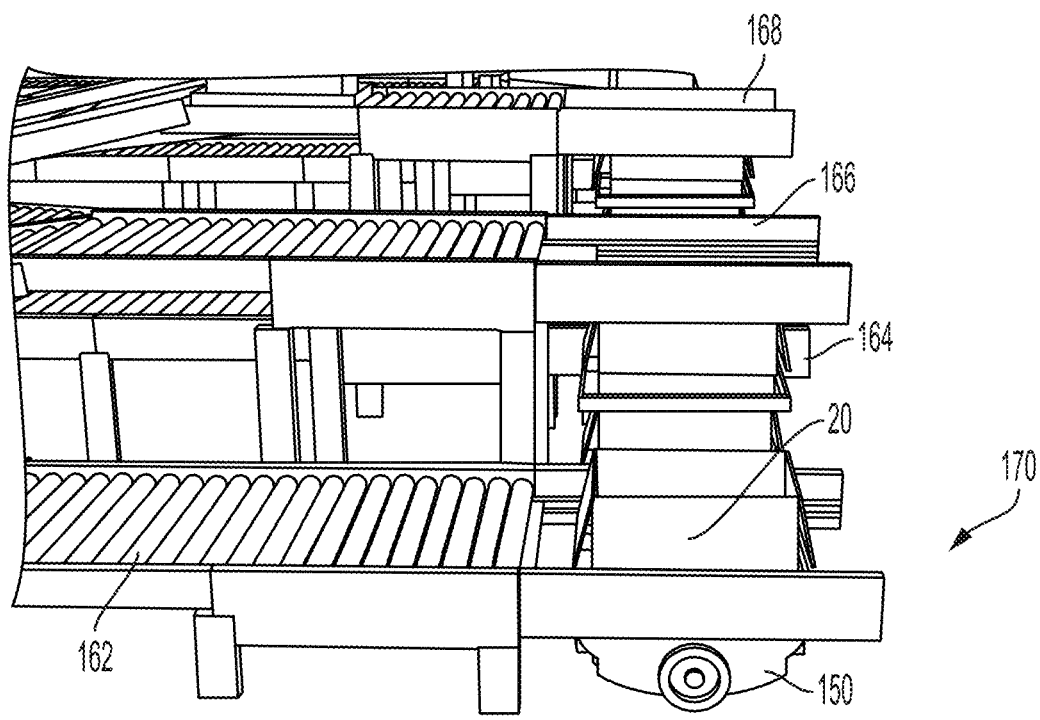
Figure 38A:
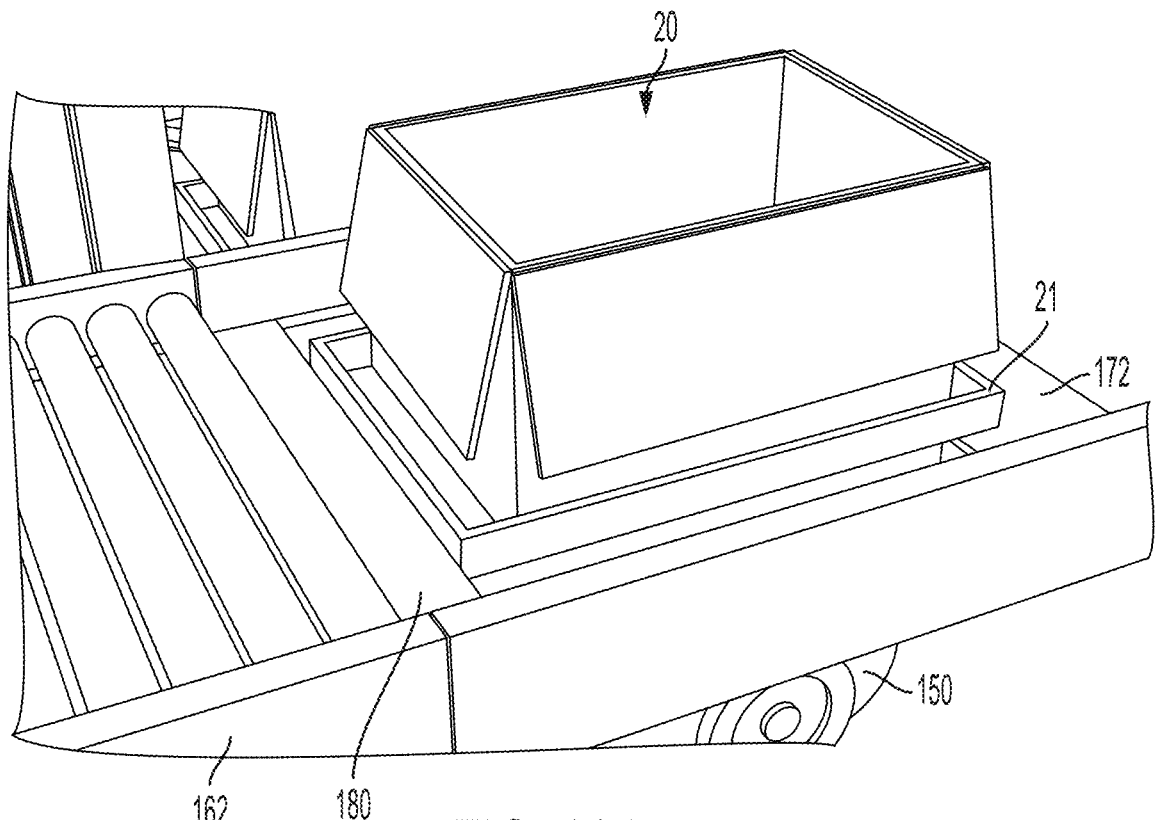
FIGS. 38A and 38B show illustrative diagrammatic enlarged views of the shipping container and support tray on the tongue element over a carrier (FIG. 38A), and showing the tongue element retracted and the shipping container and support tray deposited onto the carrier (FIG. 38B)
Figure 38B:
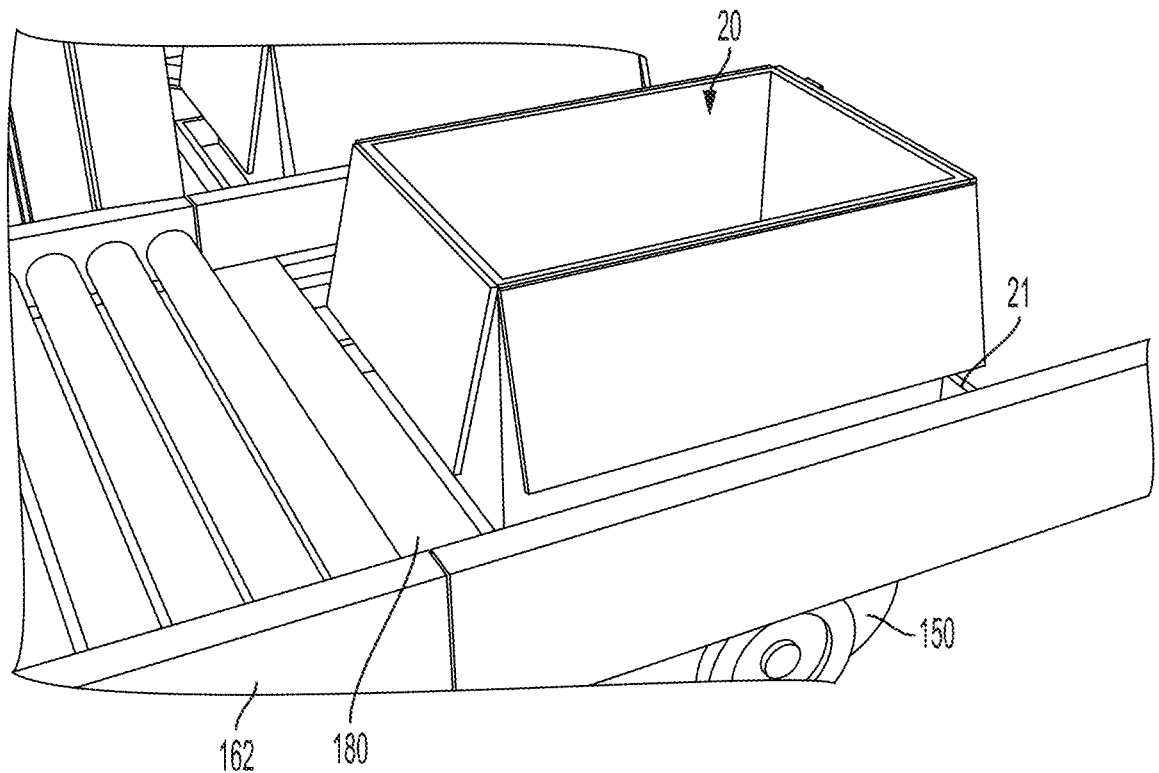

With further reference to FIGS. 37A-37D, each conveyor 162, 164, 166, 168 includes a placement system for placing a container 20 and support 21 onto (directly or indirectly) an automated carrier 150. With reference to FIG. 37A, as a container 20 and support 21 move along a conveyor (e.g., 162), a tongue element 172 of a stacking placement system 170 extends out with the moving container and support. When the end of the conveyor is reached, the carrier and support move onto the moving tongue element 172 (as shown in FIG. 37B), and continue to move together until clear of the conveyor 162 (as shown in FIG. 37C). The tongue element 172 may move along opposing tracks 174. Once resting on the tongue element 172 and stopped above the carrier 150 (again, as shown in FIG. 37C), the tongue element 172 is quickly withdrawn, dropping the container and support onto the automated carrier 150 (or onto another container that is already on the automated carrier 150 as provided at conveyors 164, 166, 168). In accordance with further aspects, and as shown in FIGS. 38A and 38B, the system may also employ a fixed alignment brace 180 over which the support 21 may easily pass moving to the tongue element 172, but against which the support 21 will be braced as the tongue element 172 is withdrawn under the support 21. Systems are therefore provided that facilitate providing objects together that are all associated with the same aisle region of a storage facility or retail store, and even in a particular order to facilitate further processing such as stacking the objects onto shelves.

In accordance with further embodiments, the systems described above may be used with automated carriers that move objects themselves, shelving that accommodates a variety of placements and retrievals of objects near one another, and automated carrier movement in directions that include direction components in both of the mutually orthogonal grid directions.

Figure 40:
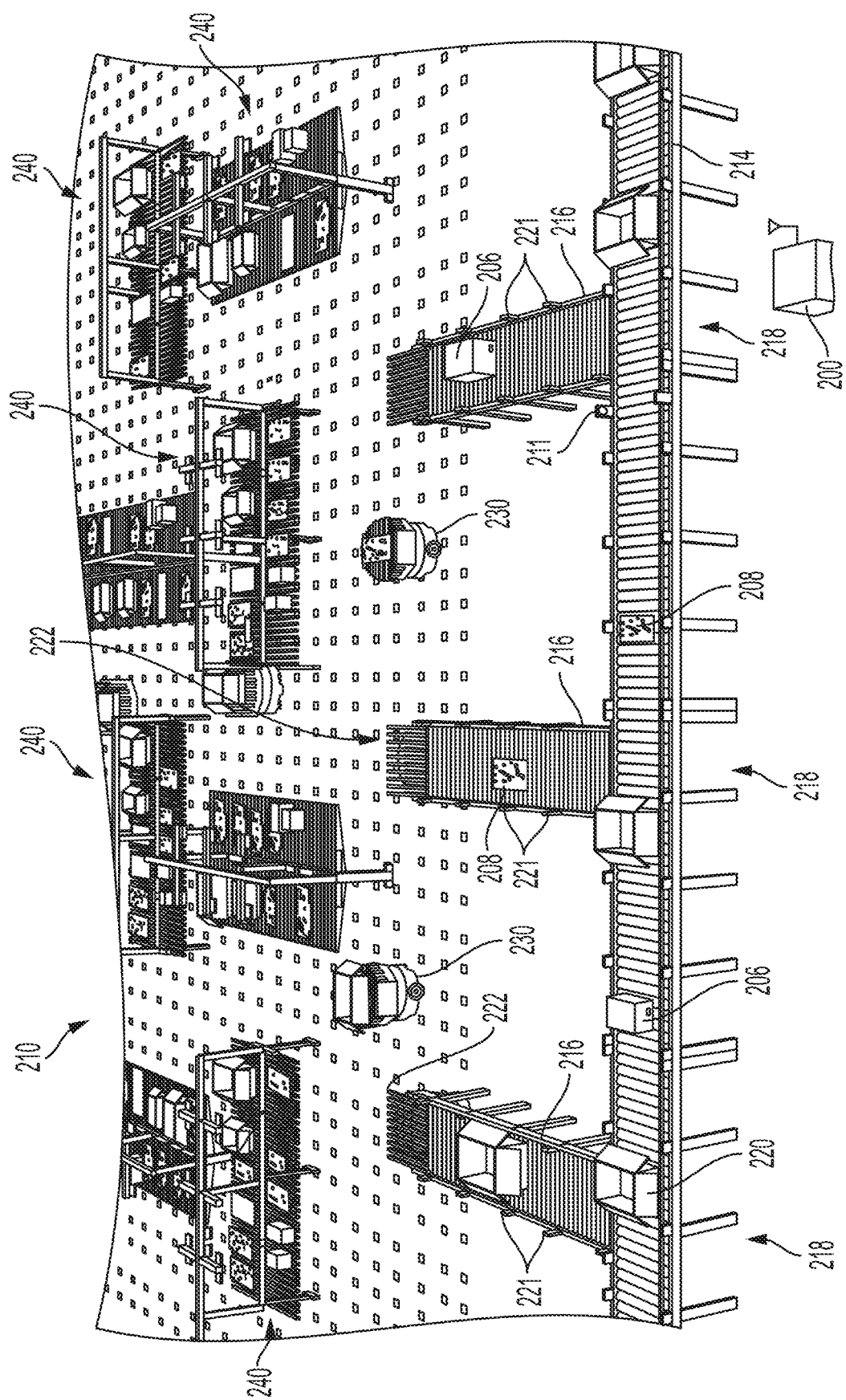
FIG. 40 shows an illustrative diagrammatic view of an object processing system in accordance with another aspect of the present invention that involves processing objects both with and without shipping containers.

FIG. 40, for example, shows a portion of an object processing system 210 that includes an input conveyance system 212 that includes an input conveyor 214 that selectively diverts containers 220 (e.g., boxes, bins, totes or trays) as well as objects themselves such as boxes 206 and bags 208, toward any of a variety of input stations 216 at bi-directional converters 218, which may be of varying sizes. Each input station 216 includes a terminating support structure 222 that includes a plurality of protrusions 224 (discussed above). A plurality of automated mobile carriers 230 may be engaged to move containers and objects from any of a plurality of input stations 216, among any of a plurality of intermediate shelf locations 240, among any of a plurality of object processing locations (e.g., 50 shown in FIG. 1), and ultimately to any of a plurality of output stations (e.g., 60 shown in FIG. 1) of an output conveyance system (e.g., 62 shown in FIG. 1). The system may dynamically move containers 220 and objects 206, 208 along the input conveyor 214 that also include empty containers for processing by the system as discussed above. The system may be used with the object processing locations 50, output stations 60 and output conveyance systems 62 as discussed above.

Again, the objects within a container may be either homogenous (all the same type of objects) or may be heterogeneous (including different types of objects). The system 410 of FIG. 40 moves containers 220 and objects 206, 208 onto any of the plurality of intermediate shelf locations 240, noting where each container is positioned, and permitting any number of objects to be positioned along each shelf location as discussed in more detail below. The system dynamically assigns certain containers to have one or more objects transferred out of the respective containers, and assigns other containers to receive objects, in the end satisfying an object assignment manifest. For example, a container of a set of input objects may include objects that are to be processed by placing each into specific assigned destination containers of the plurality of objects. Assigned destination containers need not be empty when objects begin to be assigned to the respective container. Again, for example, a container that includes one or more objects that are to be included in an assigned destination container, may be assigned the respective destination container assignment such that the one or more objects may simply remain in the container. When the processing of a container is complete, the completed container is moved to an output station of an output conveyance system, where it may be further processed, e.g., for shipping, as discussed above with reference to FIG. 1. In this way, objects may be introduced into the system in the same containers that will ultimately be used for shipping. Each container includes a unique identification marking (e.g., 223 discussed above), and the content of each container may be known at the outset. Similarly, each object may include a unique identification marking 205, 207. The system essentially moves objects and containers, and moves objects among the containers. As each container becomes full or completed for shipping, the container is directed to the output station for further processing.

The movement of each of the containers within the system is monitored, and the movement of each object between the containers is monitored. Each container 220 may be marked with a unique identifying marking 223, and each of the objects (e.g., 206, 208) may be marked with a unique identifying marking (e.g., 205, 207). Each of the input conveyance system 212, the mobile carriages 230, the storage shelves 240, the programmable motion devices (e.g., 50 in FIG. 1), and the output conveyance system (e.g., 62 in FIG. 1) may include respectively associated detection units (e.g., 211, 221, 231, 241) for monitoring locations of all containers and objects by detecting the identifying code 205, 207, 223. The system is controlled by one or more processing systems 200 that communicate (e.g., via wires or wirelessly) with each conveyor, mobile carrier, intermediate shelf location, processing station, and output conveyance system.

Figure 41A:
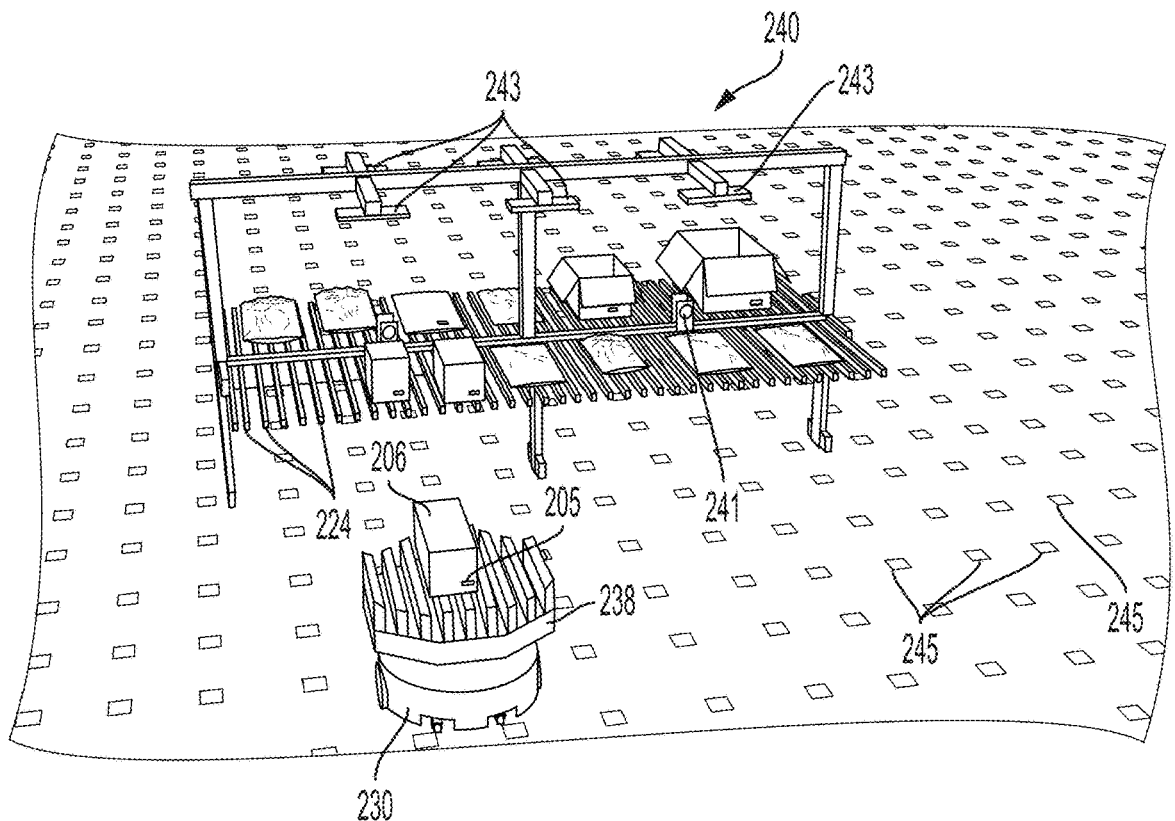
FIGS. 41A and 41B show illustrative diagrammatic views of an enlarged portion of the object processing system of FIG. 40 showing an object on a carrier approaching a support structure storage shelf (FIG. 41A), and having deposited the object onto the support structure storage shelf (FIG. 41B)
Figure 41B:
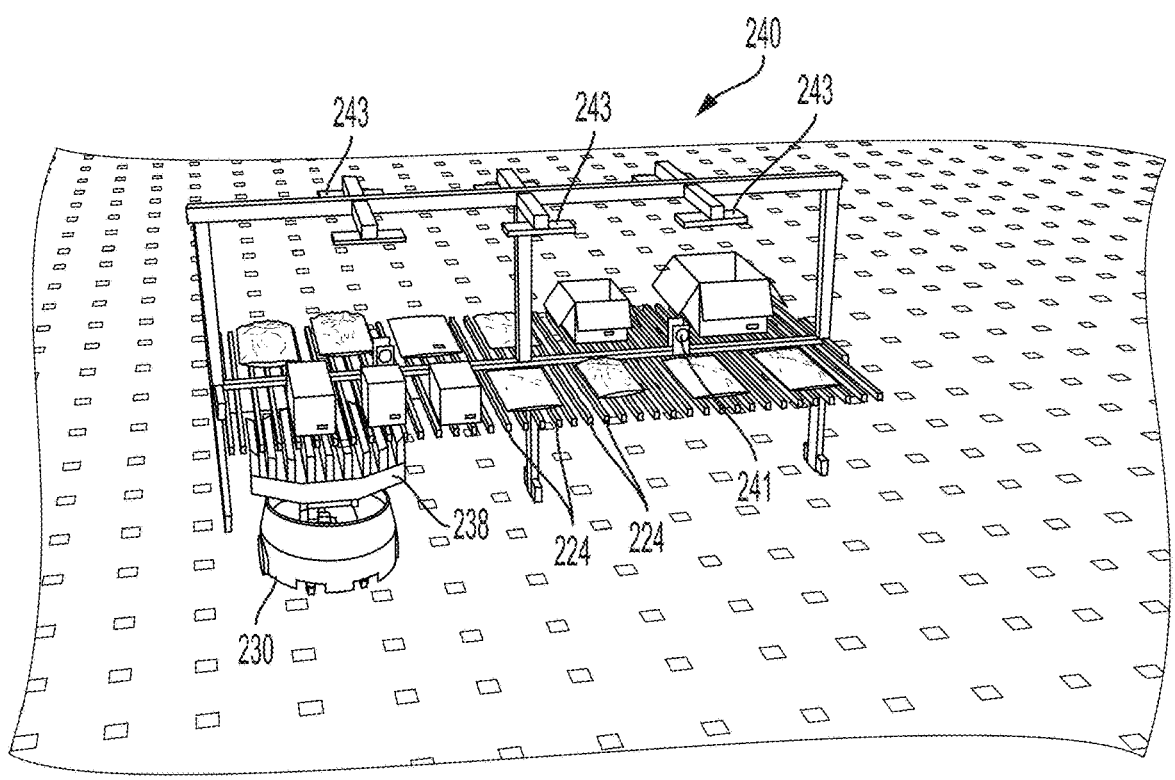
Figure 42A:
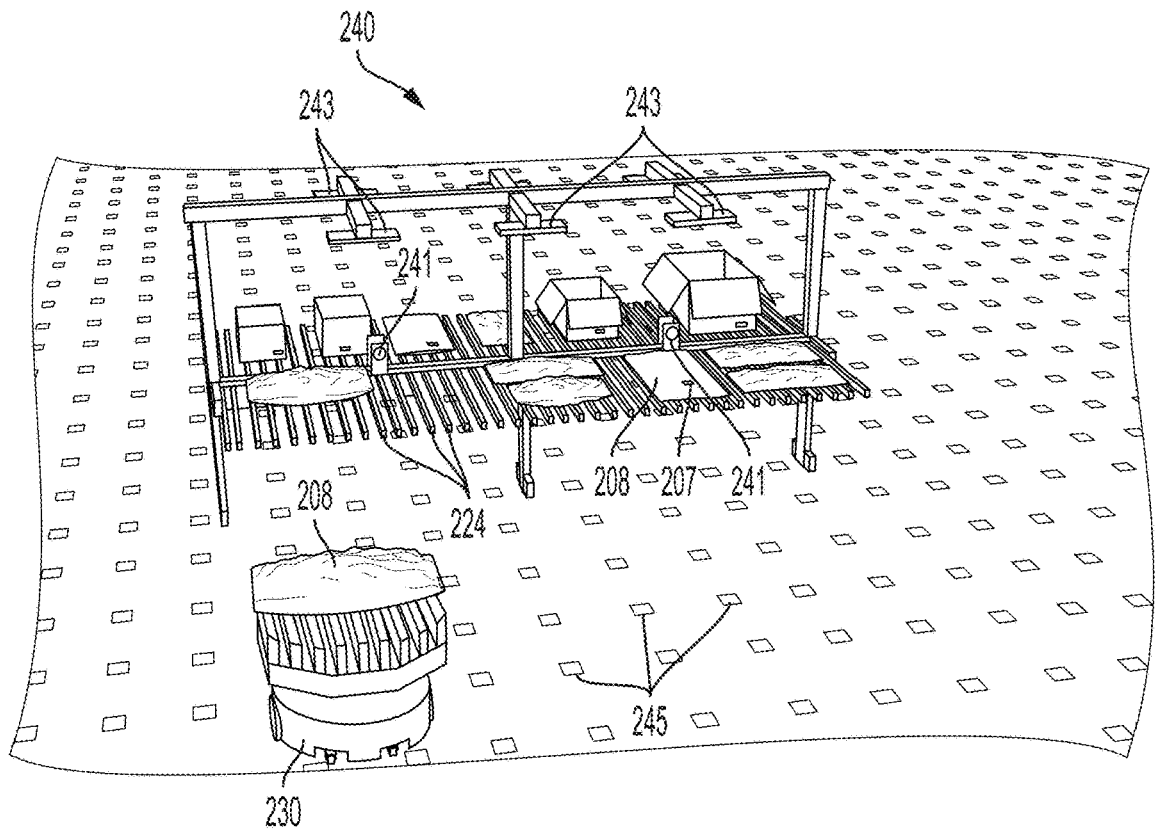
FIGS. 42A and 42B show illustrative diagrammatic views of an enlarged portion of the object processing system of FIG. 40 showing a non-rigid object on a carrier approaching a support structure storage shelf (FIG. 42A), and having deposited the non-rigid object onto the support structure storage shelf in front of a previously placed non-rigid object (FIG. 42B)
Figure 42B:
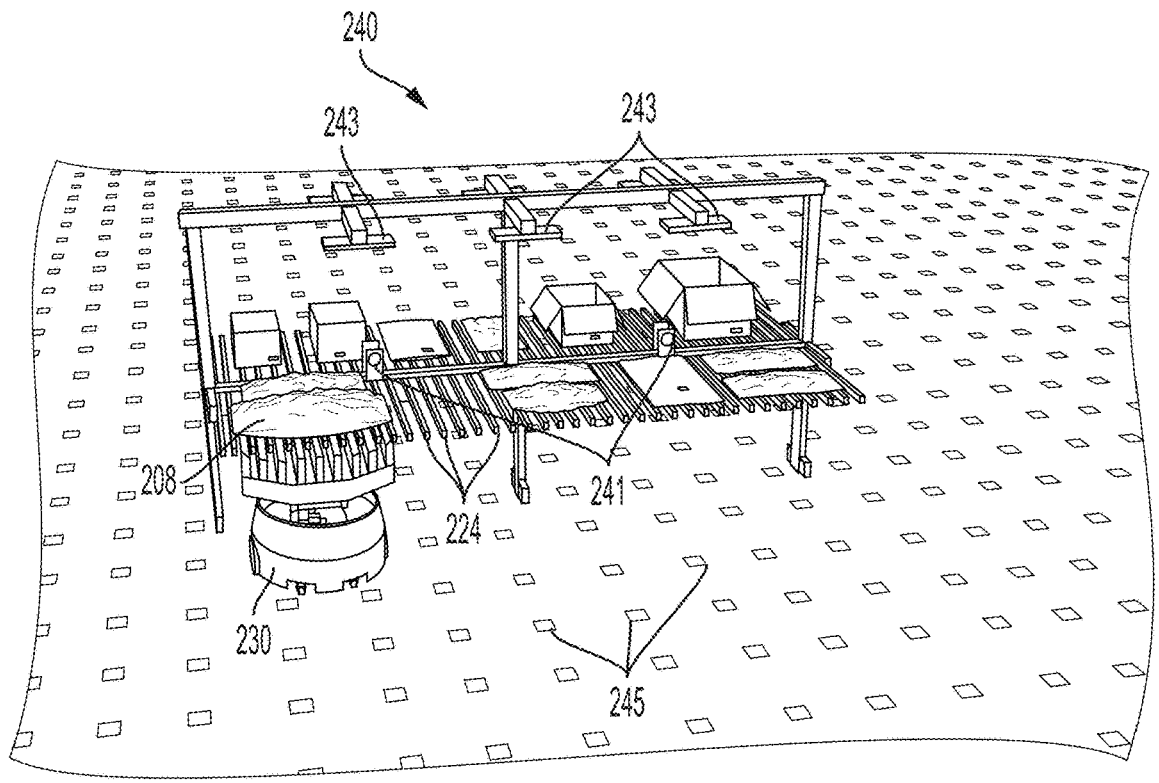

With reference to FIGS. 41A-41B, each of the storage shelves 240 includes perception units 241 as well as overhead perception systems 243. The shelves are formed of protrusions 224 as discussed above with reference to FIGS. 1-4B, and payload support ridges on automated carriers 230 are spaced apart so as to fit between the protrusions 224 as discussed above. In the systems of FIG. 40 however, objects themselves (e.g., boxes, bags etc.) are carried by the carriers, and further the objects are may be placed onto and retrieved from the shelves formed of protrusions at arbitrary locations on the shelves (e.g., at locations smaller in surface dimension than the payload on the carrier). As discussed in further detail below, FIG. 42B shows an object 206 being placed next to another object along a shelf width direction that is already on the shelf protrusions. FIGS. 42A and 42B show an object 408 (in the form of a bag) being placed next to another object (also a bag) along a shelf depth direction that is already on the shelf protrusions. The carriers 230 may also be moved over a system of markers 245 that are closely spaced to each other to provide a high resolution grid. This permits the carriers 230 to move in directions that are not solely aligned with the grid pattern (e.g., X or Y directions), but directions that include X and Y components. This also permits the carriers 230 to move in non-linear directions on the high resolution grid. FIG. 44 shows that each carrier 230 may also include a plurality of perception unit 227 on the underside thereof for detection of markers 245 on the grid pattern, permitting the movement in angular and non-linear directions.

Figure 43:
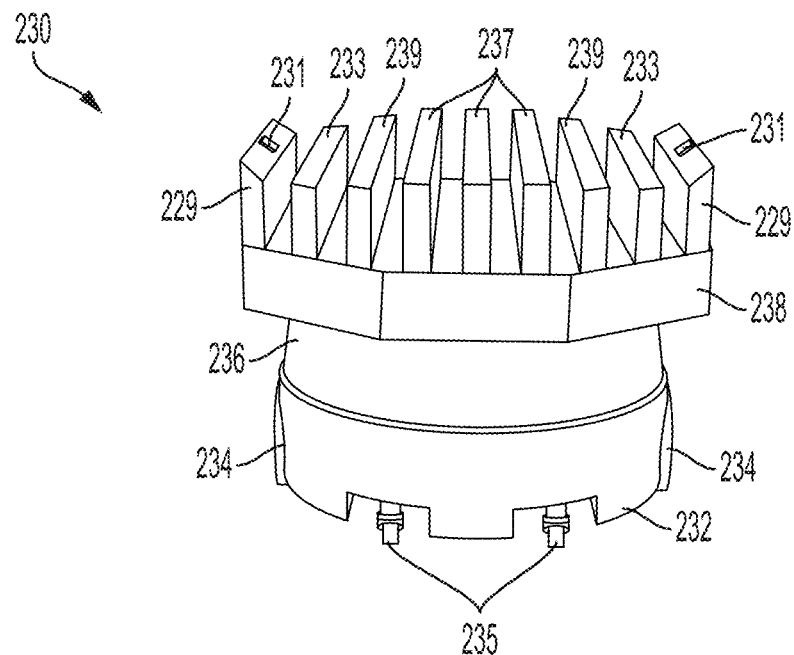
FIG. 43 shows an illustrative diagrammatic enlarged front isometric view of an automated mobile carrier of the system of FIG. 40.

FIG. 43 shows an automated carrier 230 that includes a base 232 with wheels 234 and casters 235, a mid-section 236 and a payload 238. The payload 236 includes a first set of support ridges 237 at a first height that is higher than a second height of a second set of support ridges 239. The second height of the second set of ridges 239 is higher than a third height of a third set of support ridges 233. The profile of the payload 236 is therefore crowned (higher in the center), with the outer support ridges 229 being provided for retaining any object thereon, and optionally also including perception units 231 as discussed above. Again, FIG. 44 shows an underside of the automated carrier 239 with a plurality of tracking perception units 227. The payload 238 is mounted on a position control system (e.g., 39) as disclosed above with reference to FIGS. 17-24B, with providing rotation of the payload 238 with respect to the base 232, as well as incremental elevational control of the payload 238 with respect to the base 232.

Figure 45A:
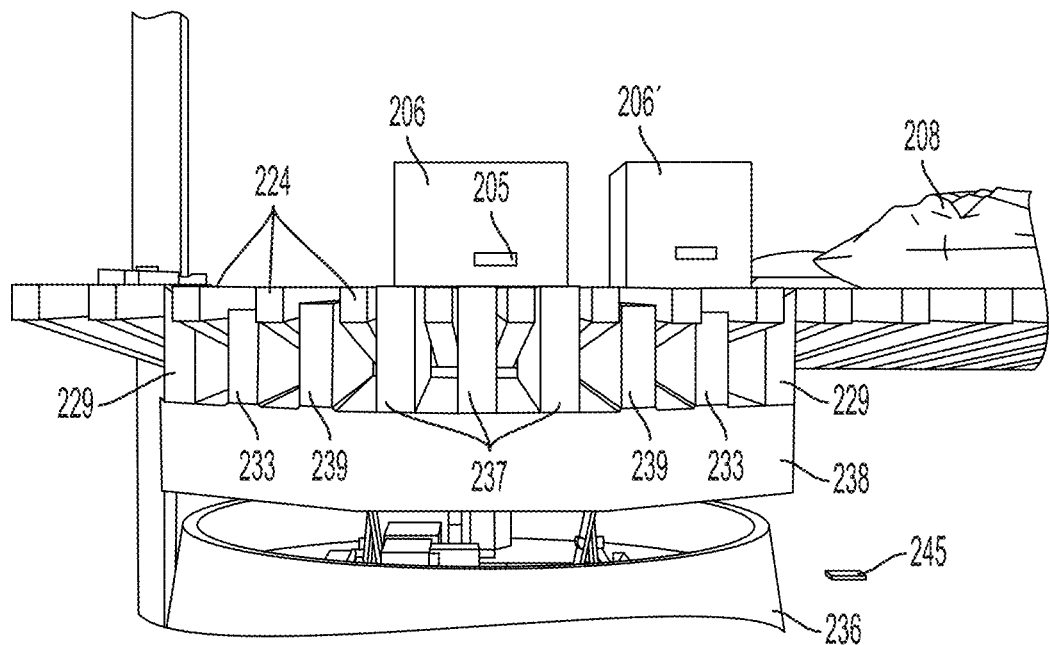
FIGS. 45A and 45B show illustrative diagrammatic enlarged front views of a portion of the mobile carrier of FIG. 40 with the payload below a discrete object to be engaged (FIG. 45A) and engaging the discrete object only (FIG. 45B)
Figure 45B:
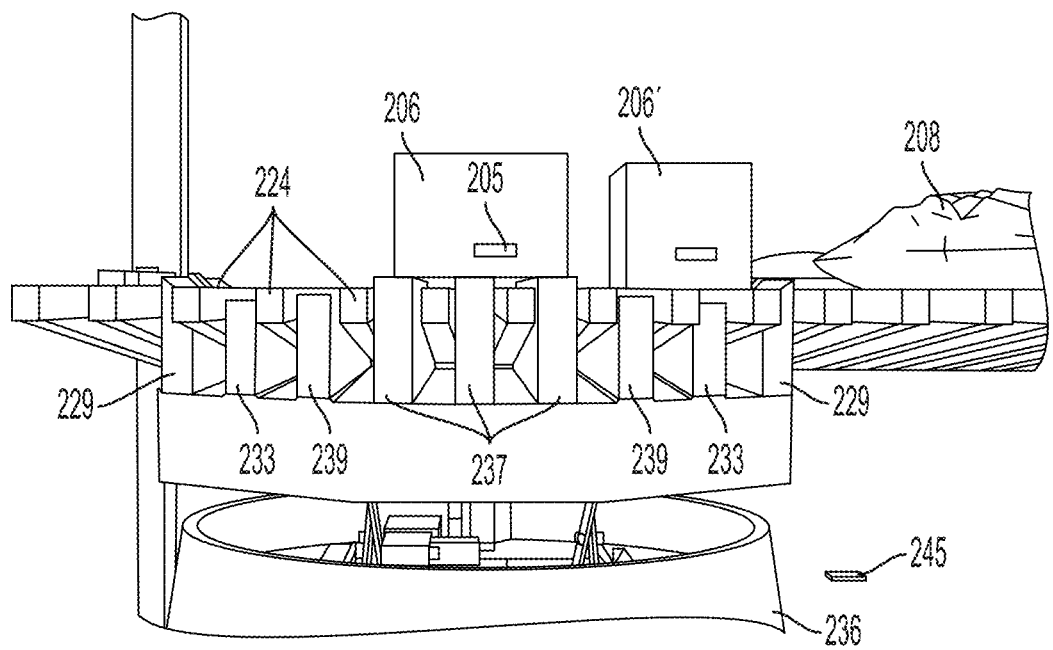
Figure 46:
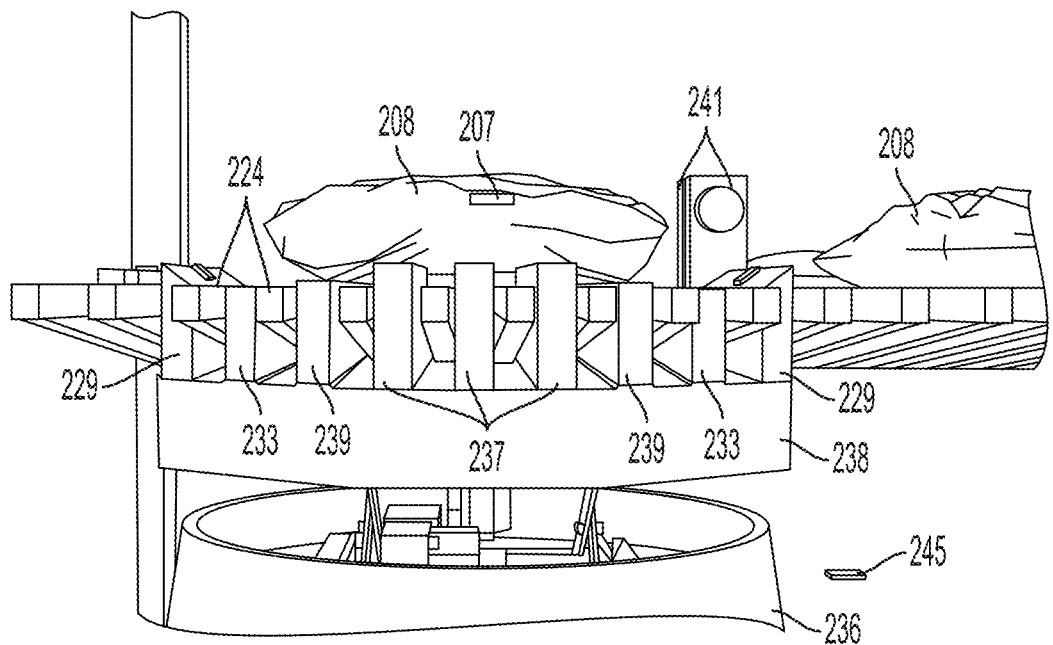
FIG. 46 shows an illustrative diagrammatic front view of the payload of the carrier of the system of FIG. 40 engaging a non-rigid object.
Figure 47:
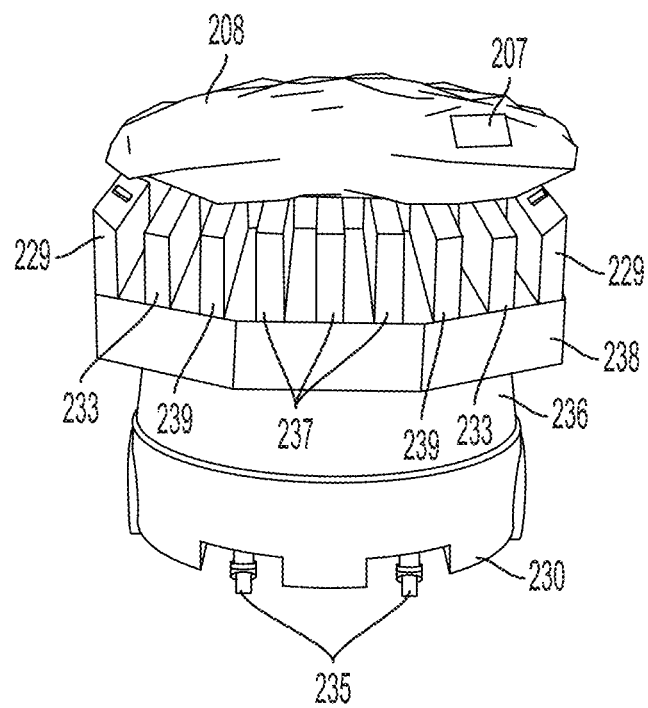
FIG. 47 shows an illustrative diagrammatic elevational view of the payload of the carrier of the system of FIG. 40 engaging a large non-rigid object that extends beyond a width of the payload.

FIG. 45A, for example, shows an object 206 next to another object 206' closely spaced from one another on a set of shelf protrusions 224. The crowned set of support ridges of the payload 238 of the automated carrier 230 may be used to selectively remove the object 206 but not the object 206'. With reference to FIG. 45B, the payload 236 is raised such that only the support ridges 237 rise above the protrusions 224, lifting the object 206. The remaining support ridges 239, 233 do not rise above the protrusions 224, and therefore do not lift the adjacent object. The outer ridges 229 may be of a height below the lowest ridges (e.g., 233) or may be formed of a more intermediate height (as shown) to assist in inhibiting an object from sliding from the payload during movement of the carrier 230. FIG. 46 shows the payload 236 engaging an object 208 in the form of a bag, wherein the support ridges 237 and 239 engage the object. FIG. 47 shows the payload 236 engaging a larger object 208 bearing a label 207, wherein the object 208 extends between the support ridges 229.

Those skilled in the art will appreciate that numerous modifications and variations may be made to the above disclosed embodiments without departing from the spirit and scope of the present invention.

What is claimed is:

1. A method of providing transfer between a remotely actuatable carrier and a container support structure, said method comprising:
providing a remotely actuatable carrier including a plurality of support ridges proximate a container support structure, the container support structure including a plurality of support structure protrusions;
providing sensor output information regarding alignment of the plurality of support ridges of the remotely actuatable carrier and the plurality of support structure protrusions of the container support structure; and
passing the plurality of support ridges of the remotely actuatable carrier between the plurality of support structure protrusions responsive to the sensor output information.

2. The method as claimed in claim 1, wherein the method further includes actuating a pair of independently actuatable wheels of the remotely actuatable carrier.

3. The method as claimed in claim 1, wherein the method further includes moving the plurality of support ridges with respect to a base of the remotely actuatable carrier.

4. The method as claimed in claim 3, wherein moving the plurality of support ridges with respect to the base includes lifting and lowering the plurality of support ridges with respect to the base.

5. The method as claimed in claim 3, wherein passing the plurality of support ridges of the remotely actuatable carrier between the plurality of support structure protrusions includes passing the plurality of support ridges between the plurality of support structure protrusions at different heights.

6. The method as claimed in claim 1, wherein the plurality of container support surface protrusions includes a plurality of conveyor belts.

7. The method as claimed in claim 1, wherein providing the remotely actuatable carrier including the plurality of support ridges proximate the container support structure includes providing the remotely actuatable carrier including the plurality of support ridges under the container support structure.

8. The method as claimed in claim 1, wherein providing the remotely actuatable carrier including the plurality of support ridges proximate the container support structure includes providing the remotely actuatable carrier including the plurality of support ridges next to the container support structure.

9. The method as claimed in claim 1, wherein passing the plurality of support ridges of the remotely actuatable carrier between the plurality of support structure protrusions includes passing the plurality of support ridges of the remotely actuatable carrier upward between the plurality of support structure protrusions to engage a load.

10. The method as claimed in claim 1, wherein passing the plurality of support ridges of the remotely actuatable carrier between the plurality of support structure protrusions includes passing the plurality of support ridges of the remotely actuatable carrier horizontally between the plurality of support structure protrusions to deliver a load to the container support structure.

11. The method of claim 1, wherein the sensor output information is provided by a sensor on at least one of the plurality of support ridges of the remotely actuatable carrier, and wherein the sensor output information indicates that the remotely actuatable carrier is aligned with the container support structure when the sensor is positioned between a pair of markers on an underside of a respective pair of the plurality of support protrusions of the container support structure.

12. A method of providing transfer between a remotely actuatable carrier and a container support structure, said method comprising:
providing a remotely actuatable carrier that includes a plurality of support ridges proximate a container support structure, the container support structure including a plurality of support structure protrusions;
providing at least one sensor on the remotely actuatable carrier that provides sensor output information indicating whether the plurality of support ridges of the remotely actuatable carrier and the plurality of support structure protrusions of the container support structure are aligned; and
passing the plurality of support ridges of the remotely actuatable carrier between the plurality of support structure protrusions of the container support structure responsive to the sensor output information indicating that the plurality of support ridges and the plurality of support structure protrusions are aligned.

13. The method as claimed in claim 12, wherein the method further includes actuating a pair of independently actuatable wheels of the remotely actuatable carrier.

14. The method as claimed in claim 12, wherein the method further includes moving the plurality of support ridges with respect to a base of the remotely actuatable carrier.

15. The method as claimed in claim 14, wherein moving the plurality of support ridges with respect to the base includes lifting and lowering the plurality of support ridges with respect to the base.

16. The method as claimed in claim 14, wherein passing the plurality of support ridges of the remotely actuatable carrier between the plurality of support structure protrusions includes passing the plurality of support ridges between the plurality of support structure protrusions at different heights.

17. The method as claimed in claim 12, wherein the plurality of container support surface protrusions includes a plurality of conveyor belts.

18. The method as claimed in claim 12, wherein providing the remotely actuatable carrier including the plurality of support ridges proximate the container support structure includes providing the remotely actuatable carrier including the plurality of support ridges under the container support structure.

19. The method as claimed in claim 12, wherein providing the remotely actuatable carrier including the plurality of support ridges proximate the container support structure includes providing the remotely actuatable carrier including the plurality of support ridges next to the container support structure.

20. The method as claimed in claim 12, wherein passing the plurality of support ridges of the remotely actuatable carrier between the plurality of support structure protrusions includes passing the plurality of support ridges of the remotely actuatable carrier upward between the plurality of support structure protrusions to engage a load.

21. The method as claimed in claim 12, wherein passing the plurality of support ridges of the remotely actuatable carrier between the plurality of support structure protrusions includes passing the plurality of support ridges of the remotely actuatable carrier horizontally between the plurality of support structure protrusions to deliver a load to the container support structure.

22. The method of claim 12, wherein the at least one sensor is provided on at least one of the plurality of support ridges of the remotely actuatable carrier, and wherein the sensor output information indicates that the remotely actuatable carrier is aligned with the container support structure when the at least one sensor is positioned between a pair of markers on an underside of a respective pair of the plurality of support protrusions of the container support structure.

23. A method of providing transfer between a remotely actuatable carrier and a container support structure, said method comprising:
providing a remotely actuatable carrier that includes a plurality of support ridges proximate a container support structure, the container support structure including a plurality of support structure protrusions;
providing at least one sensor on the remotely actuatable carrier that provides sensor output information indicating whether the plurality of support ridges of the remotely actuatable carrier and the plurality of support structure protrusions of the container support structure are aligned, wherein the at least one sensor detects markers on an underside of one or more of the plurality of support structure protrusions; and
passing the plurality of support ridges of the remotely actuatable carrier between the plurality of support structure protrusions responsive to the sensor output information indicating that the plurality of support ridges and the plurality of support structure protrusions are aligned.

24. The method as claimed in claim 23, wherein the method further includes actuating a pair of independently actuatable wheels of the remotely actuatable carrier.

25. The method as claimed in claim 23, wherein the method further includes moving the plurality of support ridges with respect to a base of the remotely actuatable carrier.

26. The method as claimed in claim 25, wherein moving the plurality of support ridges with respect to the base includes lifting and lowering the plurality of support ridges with respect to the base.

27. The method as claimed in claim 25, wherein passing the plurality of support ridges of the remotely actuatable carrier between the plurality of support structure protrusions includes passing the plurality of support ridges between the plurality of support structure protrusions at different heights.

28. The method as claimed in claim 23, wherein the plurality of container support surface protrusions includes a plurality of conveyor belts.

29. The method as claimed in claim 23, wherein providing the remotely actuatable carrier including the plurality of support ridges proximate the container support structure includes providing the remotely actuatable carrier including the plurality of support ridges under the container support structure.

30. The method as claimed in claim 23, wherein providing the remotely actuatable carrier including the plurality of support ridges proximate the container support structure includes providing the remotely actuatable carrier including the plurality of support ridges next to the container support structure.

31. The method as claimed in claim 23, wherein passing the plurality of support ridges of the remotely actuatable carrier between the plurality of support structure protrusions includes passing the plurality of support ridges of the remotely actuatable carrier upward between the plurality of support structure protrusions to engage a load.

32. The method as claimed in claim 23, wherein passing the plurality of support ridges of the remotely actuatable carrier between the plurality of support structure protrusions includes passing the plurality of support ridges of the remotely actuatable carrier horizontally between the plurality of support structure protrusions to deliver a load to the support structure.

33. The method of claim 23, the at least one sensor is provided on at least one of the plurality of support ridges of the remotely actuatable carrier, and wherein the sensor output information indicates that the plurality of support ridges of the remotely actuatable carrier and the plurality of support structure protrusions of the container support structure are aligned when the at least one sensor on the remotely actuatable carrier is positioned between a pair of the markers on an underside of a respective pair of the plurality of support protrusions of the container support structure.

34. A processing system for providing transfer between a remotely actuatable carrier and a container support structure, said system comprising:
a remotely actuatable carrier including a plurality of support ridges proximate a container support structure and a sensor, the container support structure including a plurality of support structure protrusions,
wherein the sensor provides sensor output information indicating whether the plurality of support ridges of the remotely actuatable carrier are aligned with the plurality of support structure protrusions of the container support structure, and
wherein the plurality of support ridges of the remotely actuatable carrier are passed between the plurality of support structure protrusions responsive to the sensor output information indicating that the plurality of support ridges and the plurality of support structure protrusions are aligned.

35. The processing system as claimed in claim 34, wherein the remotely actuatable carrier includes a pair of independently actuatable wheels of the remotely actuatable carrier.

36. The processing system as claimed in claim 34, wherein the plurality of support ridges are movable with respect to a base of the remotely actuatable carrier.

37. The processing system as claimed in claim 36, wherein the plurality of support ridges are movable with respect to the base in elevational and rotation directions.

38. The processing system as claimed in claim 36, wherein the plurality of support ridges of the remotely actuatable carrier fit between the plurality of support structure protrusions when aligned.

39. The processing system as claimed in claim 34, wherein the plurality of container support surface protrusions includes a plurality of conveyor belts.

40. The method of claim 34, wherein the sensor output information indicates that the plurality of support ridges of the remotely actuatable carrier and the plurality of support structure protrusions of the container support structure are aligned when the sensor on the remotely actuatable carrier is positioned between a pair of markers on an underside of a respective pair of the plurality of support protrusions of the container support structure.

* * * * *